(12) United States Patent
Ngan

(10) Patent No.: US 9,082,122 B2
(45) Date of Patent: Jul. 14, 2015

(54) SYSTEMS AND METHODS FOR TRANSACTION AUTHORIZATION AND DYNAMIC MEMBERHIPS TO FACILITATE E-COMMERCE

(75) Inventor: Lam Yan Ngan, Everett, WA (US)

(73) Assignee: Bindo Labs, Inc., New York, NY (US)

( * ) Notice: Subject to any disclaimer, the term of this patent is extended or adjusted under 35 U.S.C. 154(b) by 569 days.

(21) Appl. No.: 13/090,351

(22) Filed: Apr. 20, 2011

(65) Prior Publication Data

US 2011/0258079 A1    Oct. 20, 2011

Related U.S. Application Data

(60) Provisional application No. 61/326,025, filed on Apr. 20, 2010.

(51) Int. Cl.
    *G06Q 30/00* (2012.01)
    *G06Q 20/12* (2012.01)
    *G06Q 30/06* (2012.01)
(52) U.S. Cl.
    CPC ............ *G06Q 30/00* (2013.01); *G06Q 20/12* (2013.01); *G06Q 30/0619* (2013.01)

(58) Field of Classification Search
    CPC ...................................................... G06Q 30/00
    USPC ....................................................... 705/26.44
    See application file for complete search history.

(56) References Cited

U.S. PATENT DOCUMENTS

| 2002/0072349 A1* | 6/2002 | Geiselman et al. ........... 455/411 |
| 2003/0040947 A1* | 2/2003 | Alie et al. .......................... 705/7 |
| 2009/0012901 A1* | 1/2009 | Singh et al. ...................... 705/67 |

* cited by examiner

*Primary Examiner* — Michelle L Le
(74) *Attorney, Agent, or Firm* — Foley and Larnder LLP; Christopher J. McKenna

(57) ABSTRACT

A method for managing an e-commerce system comprising: accepting an order to sell one or more goods or services from a seller to a buyer; charging the buyer an amount according to the order; holding the amount in an intermediary; receiving a first signal from the buyer upon the seller's delivery of said one or more goods or services; retrieving a second signal; verifying the first signal against the second signal; and making at least a portion of the amount available to the seller if the first signal and the second signal satisfy a predetermined relationship.

21 Claims, 57 Drawing Sheets

(prior art)

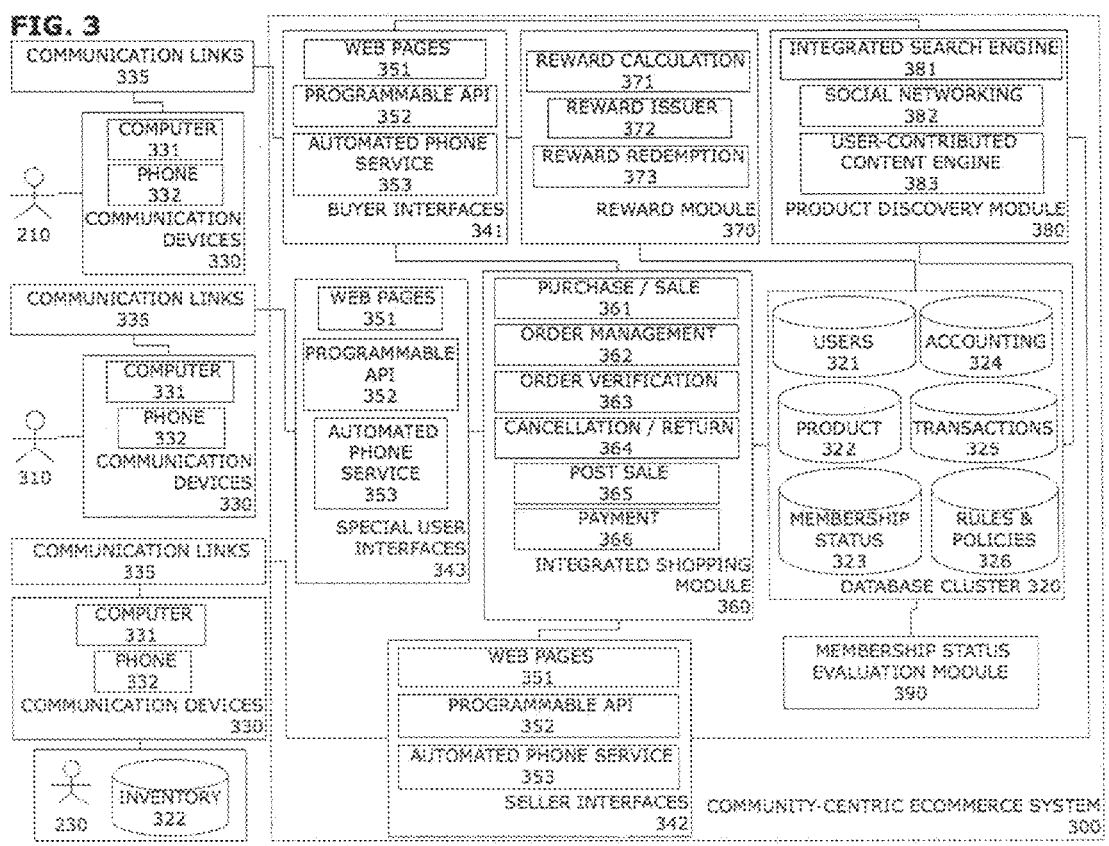

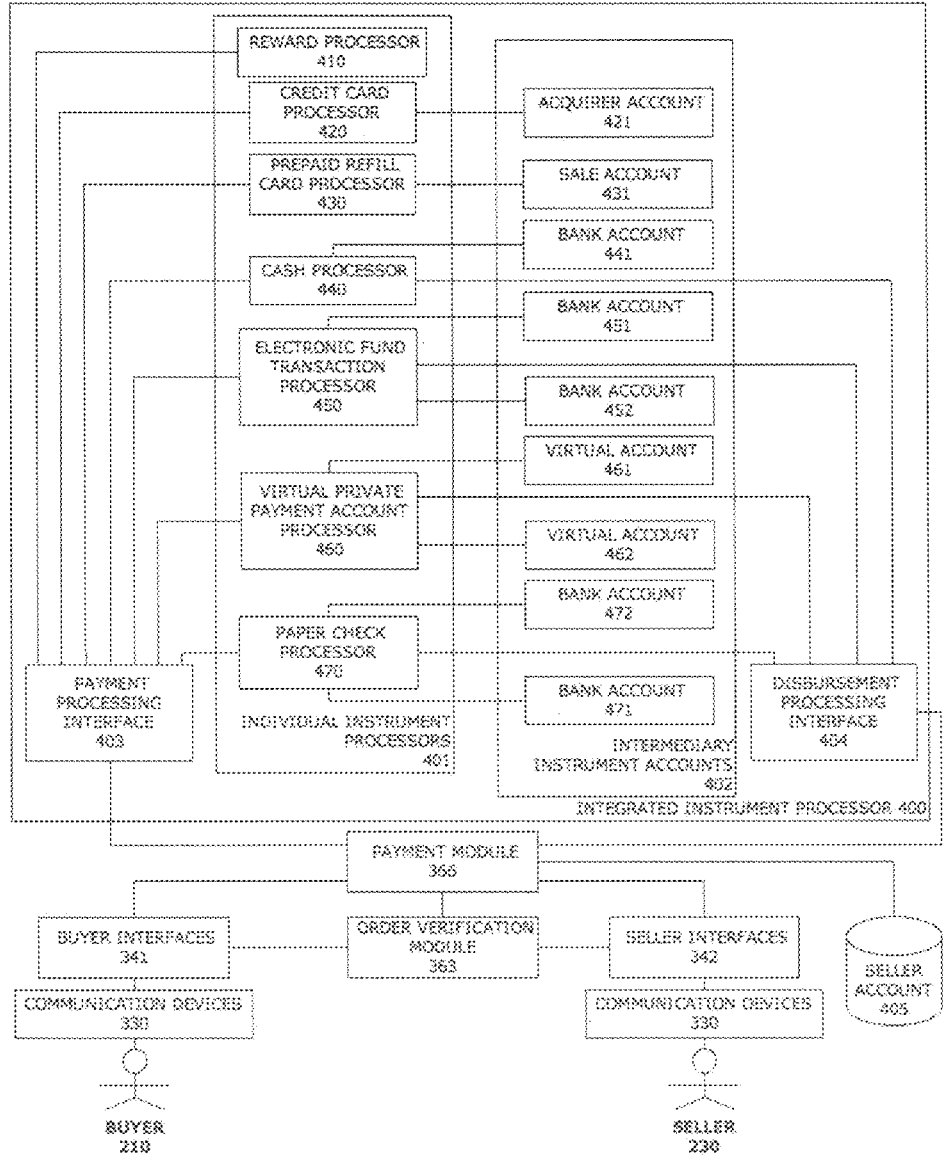

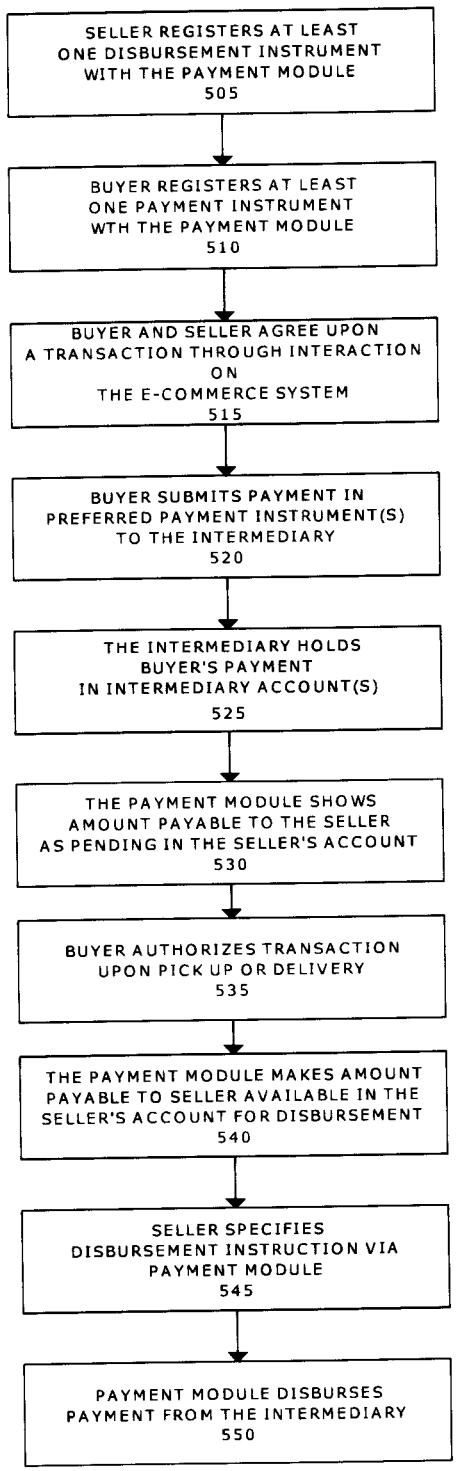

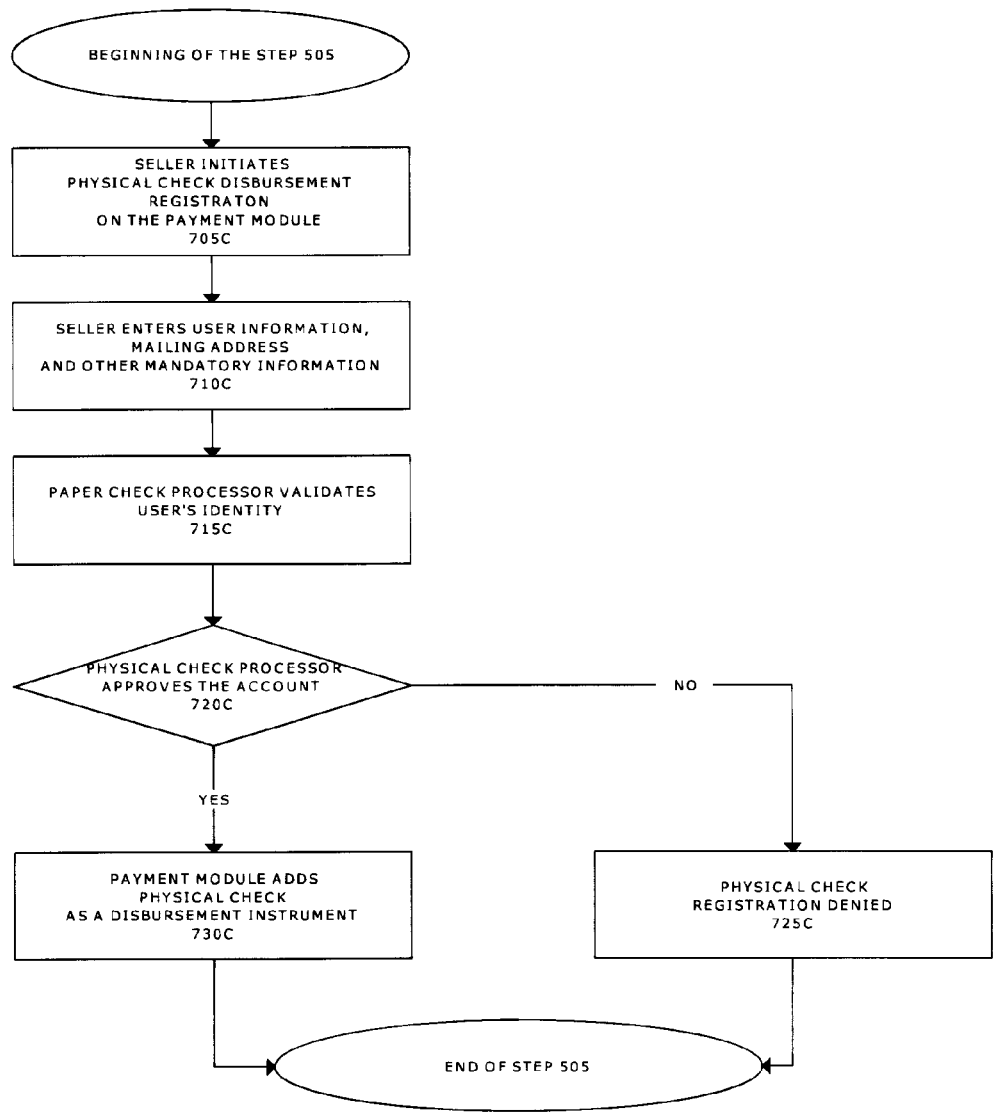

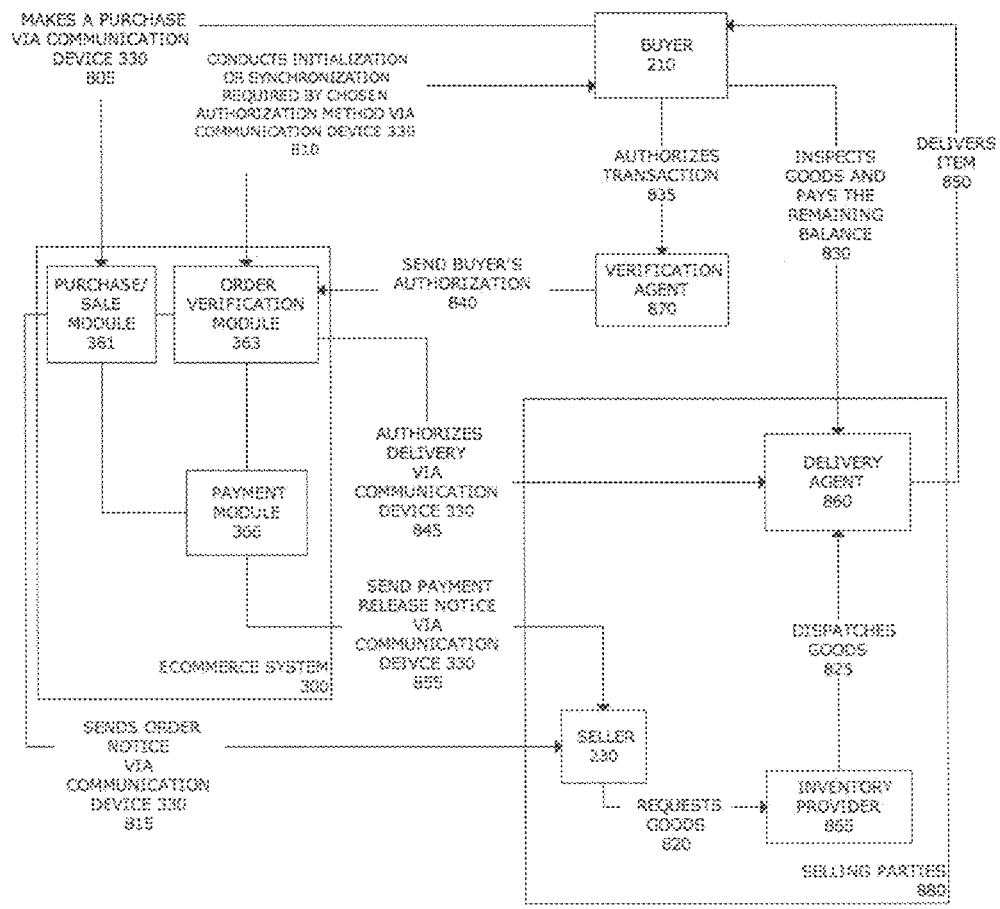

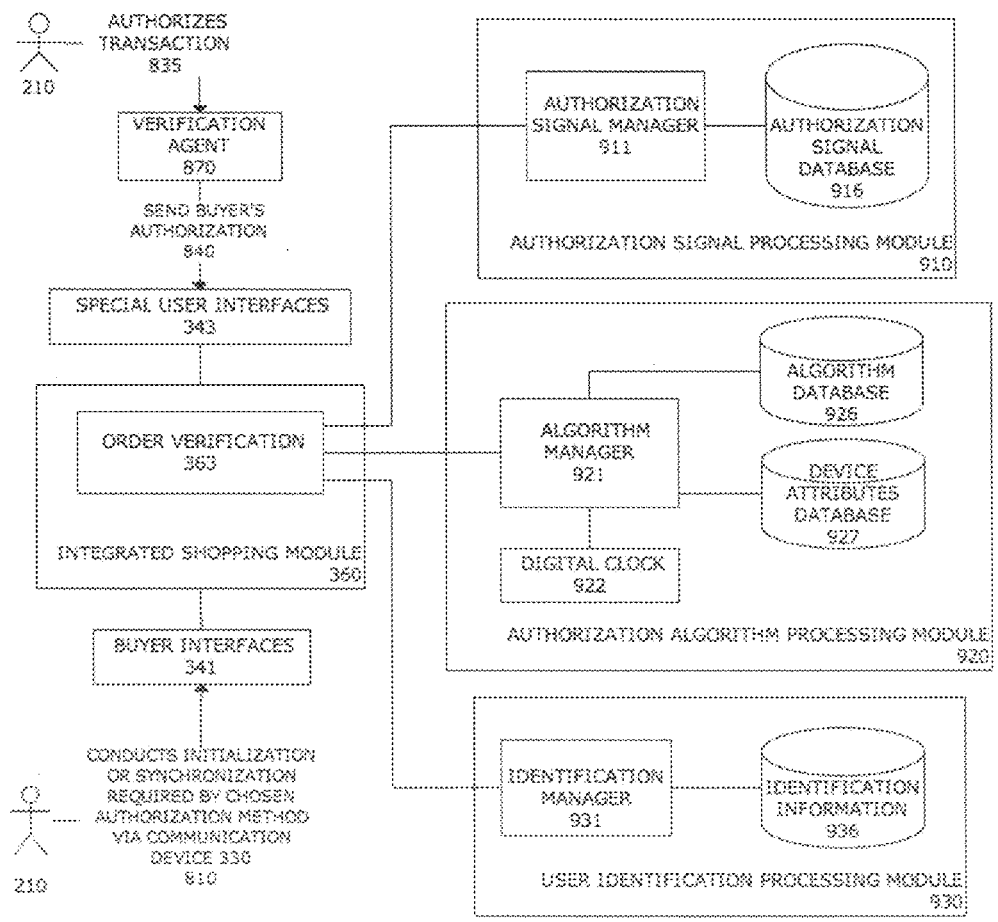

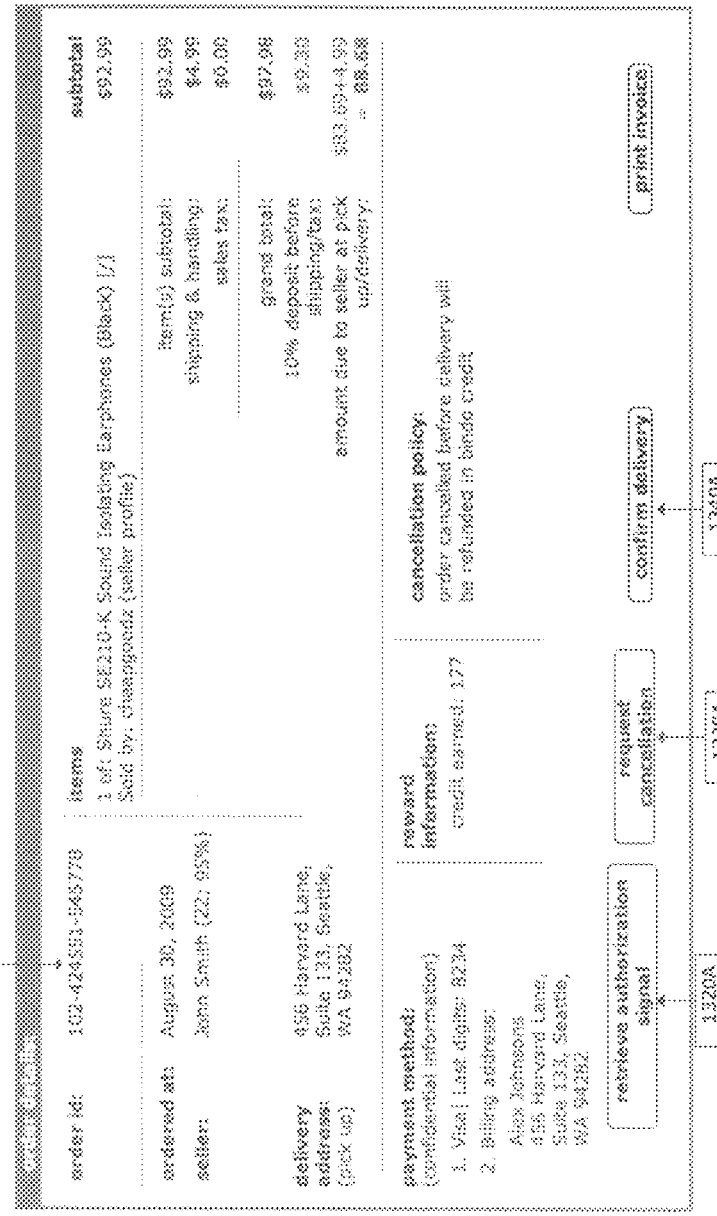

| | AB123D | AB34DL | AB658K | your current status - DF298G |
|---|---|---|---|---|
| requirement - fulfillment count | 0 | 10 | 100 | 2X24 |
| fulfillment rate | 50% | 80% | 95% | 91.4% |
| benefit - cancellation period | within 24 hours | within 48 hours | within 72 hours | within 48 hours |
| refund method | credit | credit | original form of payment | credit |
| other benefits | n/a | ... | ... | ... |
| remarks | Lorem ipsum dolor sit amet, consectetur adipisicing elit, sed do eiusmod tempor incididunt ut labore et dolore magna aliqua. | Lorem ipsum dolor sit amet, consectetur adipisicing elit, sed do eiusmod tempor incididunt ut labore et dolore magna aliqua. | Lorem ipsum dolor sit amet, consectetur adipisicing elit, sed do eiusmod tempor incididunt ut labore et dolore magna aliqua. | Lorem ipsum dolor sit amet, consectetur adipisicing elit, sed do eiusmod tempor incididunt ut labore et dolore magna aliqua. |

Introduction:
bindo employs a dynamic membership system. your membership privilege varies as your level of participation and contribution.

SYSTEMS AND METHODS FOR TRANSACTION AUTHORIZATION AND DYNAMIC MEMBERHIPS TO FACILITATE E-COMMERCE

CROSS REFERENCE TO RELATED APPLICATION

The application claims the benefit of U.S. Provisional Application No. 61/326,025, filed Apr. 20, 2010, which is incorporated by reference herein in its entirety.

FIELD OF INVENTION

The present invention is related to a system and method for managing e-commerce transactions, in particular, to a system and method for enabling transaction authorization and dynamic membership to facilitate e-commerce transaction.

BACKGROUND OF THE INVENTION

E-commerce has exploded over the past decade, as more and more merchants move from having physical brick and mortar stores to having online stores to increase their sales.

Method presently available generally include a transaction involving a buyer and a seller, wherein the buyer agrees to make a payment to seller in exchange for certain goods or services from the seller. There are drawbacks that can be associated with such transactions, such as vulnerability to counter-party issues. For example there is likely no guarantee that the buyer will receive the goods or services ordered. Or, after receiving the goods or services, the goods or services may be different from what was described or expected. In addition, in accordance with many methods currently available, when the buyer pays the seller, sensitive payment information about the buyer is passed on to the seller 104 and the buyer must rely on the seller to charge the correct amount and protect the buyer's sensitive payment information.

In accordance with another example of methods presently available, a buyer may attempt to repudiate online purchases claiming that the goods or services were not received or that the goods or services are unsatisfactory. It can be difficult for the seller to prove otherwise even with a tracking number from a shipping company.

Accordingly, it is desirable to provide an improved e-commerce method and system that overcomes drawbacks and inadequacies of known methods and systems.

SUMMARY OF THE INVENTIONS

Generally speaking, the present invention is aimed at improving the management and increase security of an e-commerce system. In accordance with the invention, a method for managing an e-commerce system is provided, comprising the steps of accepting an order to sell one or more goods or services from a seller to a buyer; charging the buyer an amount according to the order; holding the amount in an intermediary; receiving a first signal from the buyer upon the seller's delivery of said one or more goods or services; retrieving a second signal; verifying the first signal against the second signal; and making at least a portion of the amount available to the seller if the first signal and the second signal satisfy a predetermined relationship.

Another object of the invention is to provide an improved computer system for managing an e-commerce system, the computer system comprising: a data processor; a memory storage device comprising a plurality of modules, wherein the plurality of modules comprise: a first module comprising a first computer code executable by the data processor, wherein upon execution of the first computer code, the first module accepts an order to sell one or more goods or services from a seller to a buyer; a second module comprising a second computer code executable by the data processor, wherein upon execution of the second computer code, the second module charges the buyer an amount according to the order; a third module comprising a third computer code executable by the data processor, wherein upon execution of the third computer code, the third module synchronizes an algorithm for generating signals with the buyer; a fourth module comprising a fourth computer code executable by the data processor, wherein upon execution of the fourth computer code, the fourth module receives a first signal from the buyer upon seller's delivery of said goods or services; a fifth module comprising a fifth computer code executable by the data processor, wherein upon execution of the fifth computer code, the fifth module retrieves a second signal; a sixth module comprising sixth computer code executable by the data processor, wherein upon execution of the sixth computer code, the sixth module verifies the first signal against the second signal; and a seventh module comprising seventh computer code executable by the data processor, wherein upon execution of the seventh computer code, the seventh module makes at least a portion of the amount available to seller if the first signal and the second signal satisfy a predetermined relationship.

Yet another object of the invention is to provide an improved system for managing an e-commerce transactions comprising: a shopping module; an order verification module; and a payment module; wherein the shopping module accepts an order from a buyer for a purchase of a product or service, charges the buyer an amount according to the order and holds the amount in an intermediary; wherein the order verification module verifies the buyer's receipt and acceptance of the purchase; and wherein the payment module makes at least a portion of the amount available to the seller.

Still other objects of the invention will in part be obvious and will, in part, be apparent from the specification.

BRIEF DESCRIPTION OF THE DRAWINGS

For a fuller understanding of the invention, reference is had to the following description taken in connection with the accompanying drawing, in which:

FIG. 3 is a block diagram illustrating a computer network architecture of an e-commerce system in accordance with an embodiment of the present invention.

FIG. 4 is a block diagram illustrating an exemplary computer network architecture that facilitates and secures payment from one party to another via an intermediary in accordance with an embodiment of the present invention.

FIG. 5 is a flowchart illustrating how payment is submitted by the buyer and released to the seller via an intermediary in accordance with an embodiment of the present invention.

FIG. 7C is a flowchart illustrating an exemplary procedure for using physical check as a disbursement instrument in accordance with an embodiment of the present invention.

FIG. 8 is a block diagram illustrating a sale method with various agents in accordance with an embodiment of the present invention.

FIG. 9 is a block diagram illustrating three processing modules each for handling a specific transaction authorization method in accordance with an embodiment of the present invention.

FIG. 12A illustrates an exemplary graphical user interface for retrieving an authorization signal in accordance with the first authorization methodology of an embodiment of the present invention.

FIG. 22A is an exemplary graphical user interface showing order information and a button that triggers the input of an authorization signal in accordance with the second authorization methodology of an embodiment of the present invention.

FIG. 32 is an exemplary graphical user interface displaying current membership status along with other membership statuses in accordance with the present disclosure.

DETAILED DESCRIPTION OF THE PREFERRED EMBODIMENTS

Certain exemplary embodiments of the present invention will now be described with reference to the drawings. In general, such embodiments relate to a system or a method of managing an e-commerce system.

As used herein, a buyer includes any entity placing or attempting to place an order for example, for a purchase of goods or services, or seeking information about goods or services, regardless of whether the transaction ultimately takes place. Said information may include but is not limited to product/service descriptions, prices, seller reputation, pickup/delivery options, payment options and any user-contributed content. In addition, a buyer may also include a buying agent that makes a purchase on another entity's behalf.

A seller includes any entity that offers products and/or services to be acquired with or without any web or physical presence. A seller may include any selling agent regardless of the existence of inventory or delivery service.

A special user includes any entity using an e-commerce system with a purpose other than purchase or sale. A special user may be but is not necessarily a registered user. By way of non-limiting example, a special user may be an entity that wishes to track the status of a specific transaction.

A user includes any entity using a platform regardless of said entity's actual intent. A user may also be a member of an e-commerce platform. A user may have more than one role in one or more transactions using the e-commerce platform. Each user may have a user profile in a user database, wherein the user profile may contain user-contributed content, public information and system data.

A network includes a collection of members who are user(s), the network having at least one member. A network can be created for any purpose. Some nonexclusive examples of networks are personal networks comprising users who are friends to one party, geographical networks comprising users within a specific area and product user networks comprising users that use a particular product.

Figure 1:
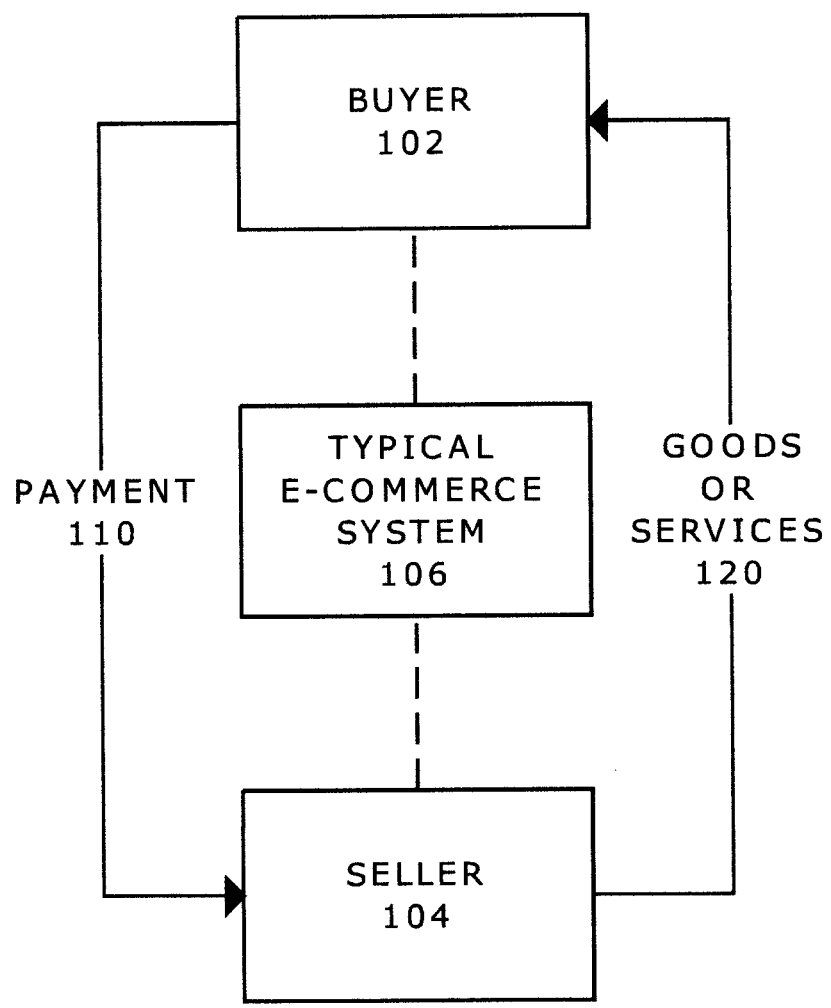
FIG. 1 is a block diagram illustrating a transaction in an ecommerce system presently available.
Figure 2:
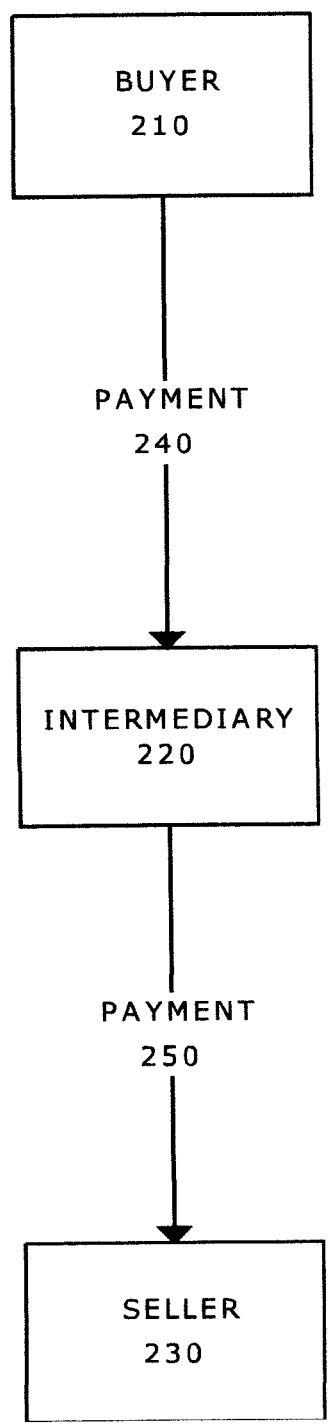
FIG. 2 is a block diagram illustrating the transfer of payment from a buyer to a seller via an intermediary in accordance with an embodiment of the present invention.

An example of a method presently available is illustrated in FIG. 1, wherein generally, a transaction 106 involves a buyer 102 and a seller 104. In accordance with the method shown, transaction 106 begins when buyer 102 agrees to make a payment 110 to seller 104 in exchange for a goods or services 120 from seller 104. The method does not provide a guarantee that buyer 102 will receive goods or services 120 and if received, that they will be satisfactory. In addition, as buyer 102 pays seller 104, sensitive payment information about buyer 102 is passed on to seller 104 and buyer 102 must rely on seller 104 to charge the correct amount and to protect sensitive payment information of buyer 102. Reference is made to FIG. 2, wherein an e-commerce transaction in accordance with an embodiment of the present invention includes an order is placed by a buyer 210 for goods or services from a seller 230, and a payment 240 is made from buyer 210 to seller 230 using a payment instrument through an intermediary 220. The payment instruments may include one or more of credit card, prepaid refill card, cash deposit, electronic fund transaction, virtual private payment account, physical check, or other instruments suitable for transferring funds from buyer 210 to seller 230.

In the embodiment shown, intermediary 220 receives payment 240 from buyer 210 and intermediary 220 temporarily holds payment 240, for example, while buyer 210 and seller 230 make efforts to complete the transaction. If buyer 210 is satisfied with the goods or services from seller 230, buyer 210 may cause payment 250 to be transferred from intermediary 220 to seller 230, such as by sending an authorization signal to intermediately 220.

The authorization signal may include a code generated based on the transaction number, buyer 210's identification or biometric character, or a combination of parameters. The authorization signal may also include a signal with embedded identification information, and may be in any form or presentation that can be recognized directly or indirectly by intermediary 220. Examples of authorization signal may include simple random code, such as 3242, or it may a more complex code, such as DFS32S213-SD20-3FFD, which may embed optional transaction or security information. Authorization signals may be, but not limited to numerical, alphabetical, visual, audio signals or combinations thereof.

Once intermediary 220 receives the authorization signal from buyer 210, intermediary 220 may forward payment 250 to seller 230 through one or a combination of acceptable disbursement instruments. An exemplary embodiment of disbursement instruments may include an electronic fund transaction, a credit to a bank account, a virtual private payment account, or the issuance of a physical check, as a matter of application specific to design choice.

Intermediary 220 may charge a transaction fee for facilitating the receipt of payment 240 and the transfer of payment 250. This fee may be billed to buyer 210, seller 230, or both. Intermediary 220 may also collect this fee by charging an additional amount from buyer 210, deducting an amount payable to seller 230 or in any other way contemplated by one of ordinary skill in the art.

In accordance with an embodiment of the invention illustrated in FIG. 3, an e-commerce system 300 resides on a network of computers accessible by a plurality of clients such as buyers 210, sellers 230 and/or special users 310. E-commerce system 300 may be implemented through the use of a centralized database or one or more individual databases for each module or sub-module, or a combination thereof.

As shown, E-Commerce system 300 may include one or more interfaces 341, 342, 343 which may facilitate communication between parties, between parties and devices, between parties and modules, and between devices and modules between various parties, devices and media, and various interfaces, via one or more communication devices 330.

Communication devices 330 may include, but not limited to, computers 331, phones 332 and any device or means capable of receiving information from e-commerce system 300 and/or sending instruction to e-commerce system 300.

Users may interact with e-commerce system 300 through one or more user interfaces, such as a buyer interface 341, a seller interface 342 or a special user interface 343, over one or more communication links 335 to engage in activities. Communication links 335 may be any media supported by the user interfaces 3411, 342, 343, including but not limited to one which enables the connection of computers, such as the Internet, a phone service network or which allows communication over phones, and satellites on which GPS-capable devices can operate.

User interfaces may include one or more web pages 351, programmable Application Programming Interfaces (API) 352, automated phone services 353 or combinations thereof. Web pages 351 may enable the users to interact using a browser. Programmable APIs 352 may enable interaction via custom application, such as a custom application for a specific portable device. Automated phone services 353 may enable users to interact via voice or Short Message Service (SMS) phone service. Through these interfaces, users may be able to manage sales, purchases, transaction logistics and related activities.

In an exemplary embodiment of the present invention, e-commerce system 300 may include user interfaces for three groups of users, namely buyer interface 341, seller interface 343 and special user interface 342 for buyers 210, sellers 230 and special users 310, respectively, and a database cluster 320 and a network of modules. These modules may include, by way of non-limiting example, an integrated shopping module 360, a reward module 370, a product discovery module 380 and a membership status evaluation module 390. These modules may be connected to a database cluster 320. These modules may be implemented in a single data processor or in a plurality of data processors. It is to be understood that the number of modules and sub-modules may vary without deviating from the scope of the invention, as a matter of application specific design choice.

Integrated Shopping Module 360

In accordance with an exemplary embodiment, integrated shopping module 360 may facilitate all the shopping activities within e-commerce system 300. Integrated shopping module 360 may be the central processing module that preferably facilitates buyers 210 and sellers 230 in trading, reaching a final agreement and completing the transaction. Integrated shopping module 360 may interact with reward module 370, product discovery module 380, membership status evaluation module 390 and central database cluster 320.

In an exemplary embodiment of the present invention, integrated shopping module 360 preferably includes six sub-modules, a purchase/sale sub-module 361, an order management sub-module 362, an order verification sub-module 363, a cancellation/return sub-module 364, a post sale sub-module 365 and a payment sub-module 366, each one specializing in handling one aspect of a typical purchase/sale routine. Preferably, purchase/sale sub-module 316 enables seller 230 to create new listings or modify an existing listing and enables buyer 210 to make a purchase. Purchase/sale sub-module 316 may also accept an order to sell goods from seller 230 to buyer 210. Preferably, order management sub-module 362 enables buyer 210 and seller 230 to manage pending orders, completed orders and canceled orders. Order verification sub-module 363 preferably ensures that buyer 210 is satisfied with the order before releasing payment to seller 230. Cancellation/return module 364 preferably facilitates buyers 210 and sellers 230 initiate, manage and complete order cancellations. Post sale sub module 365 preferably enables both buyers 210 and sellers 230 to carry out post-sale activities, such as leaving feedback for each other. Payment sub module 366 preferably handles the payment and refund related activities and issues.

In addition, special users 310 may also communicate with integrated shopping module 360 via special user interfaces 343 for special purposes, which will be discussed in further detail below with respect to FIG. 8.

Reward Module:

In accordance with an exemplary embodiment, reward module 370 may calculate and issue reward points based on users' activities. The reward may be part of either or both of a royalty system and a payment instrument for buyers to purchase goods or services. Reward module 370 preferably includes a reward calculation sub-module 371, a reward issuer sub-module 372, a reward redemption sub-module 373 and other supplemental sub-modules to manage reward activities in accordance with application specific design choice.

Reward calculation sub-module 371 preferably calculates the amount of reward for one or more activities by buyer 210 and issues the reward. By way of nonlimiting example, when buyer 210 attempts to redeem a reward, reward redemption sub-module 373 validates the reward redemption request.

Reward module 370 is preferably connected to buyer interfaces 341, through which buyers 210 can manage handle certain aspects of the rewards, such as crediting an user's account for rewards earned from purchases made.

Product Discovery Module:

In accordance with an exemplary embodiment, both buyers 210 and sellers 230 may interact with product discovery module 380, which preferably enhances the shopping experience, for example, by facilitating both parties in locating products/services, recommending products and managing user-contributed contents for the products/services.

In accordance with an exemplary embodiment of the present invention, product discovery module 380 may include an integrated search engine sub-module 381, a social networking sub-module 382 and a user-contributed content engine sub-module 383.

Integrated search engine sub-module 381 preferably allows a user to search for product/service offering in a vast database of product inventory/description, user profile/reputation, user contributed content, manufacturer information and the like. Integrated search engine 381 can preferably find the closest match if nothing matching all the criteria is found. It preferably makes recommendations for products and services that may interests the user based on one or more parameters, such as the user's purchase/sale patterns, occupation, geographical location and other information available.

Social networking sub-module 382 preferably allows a user to connect with other users within different kinds of networks, such as personal networks, geographical networks or product user networks. It also may allow buyers 210 to subscribe to updates (such as new listings, user contributed contents) from fellow users and research about product usability information within a specified network. User-contributed content engine 383 preferably allows users to submit reviews, pictures, videos or any other user-contributed content regarding one or more products/services. These contents may ultimately help other users in making decisions regarding selling and purchasing the products/services.

Membership Status Evaluation Module 390:

In accordance with an exemplary embodiment, membership status evaluation module 390 calculates membership status based on external parameters from other modules, such as integrated shopping module 360. It preferably enables the implementation of a dynamic membership and policy system. Whereas membership status evaluation module 390 may be directly connected to user interfaces 341, 342, 343, such a direct connection is not necessary. Rather, membership status evaluation module 390 may be networked with other modules whose activities are contributing parameters to membership status evaluation module 390 that effectively influence the membership status.

It is to be appreciated that the embodiments of the modules and sub-modules in the aforementioned example are merely a logical organization of different features offered by e-commerce system 300. Although the present disclosure has been illustrated with respect to a particular sample module organization and architecture, it is to be appreciated that various module organization and/or architecture suitable for carrying out the present disclosure may be employed and are intended to fall within the scope of the hereto-appended claims.

Figure 6A:
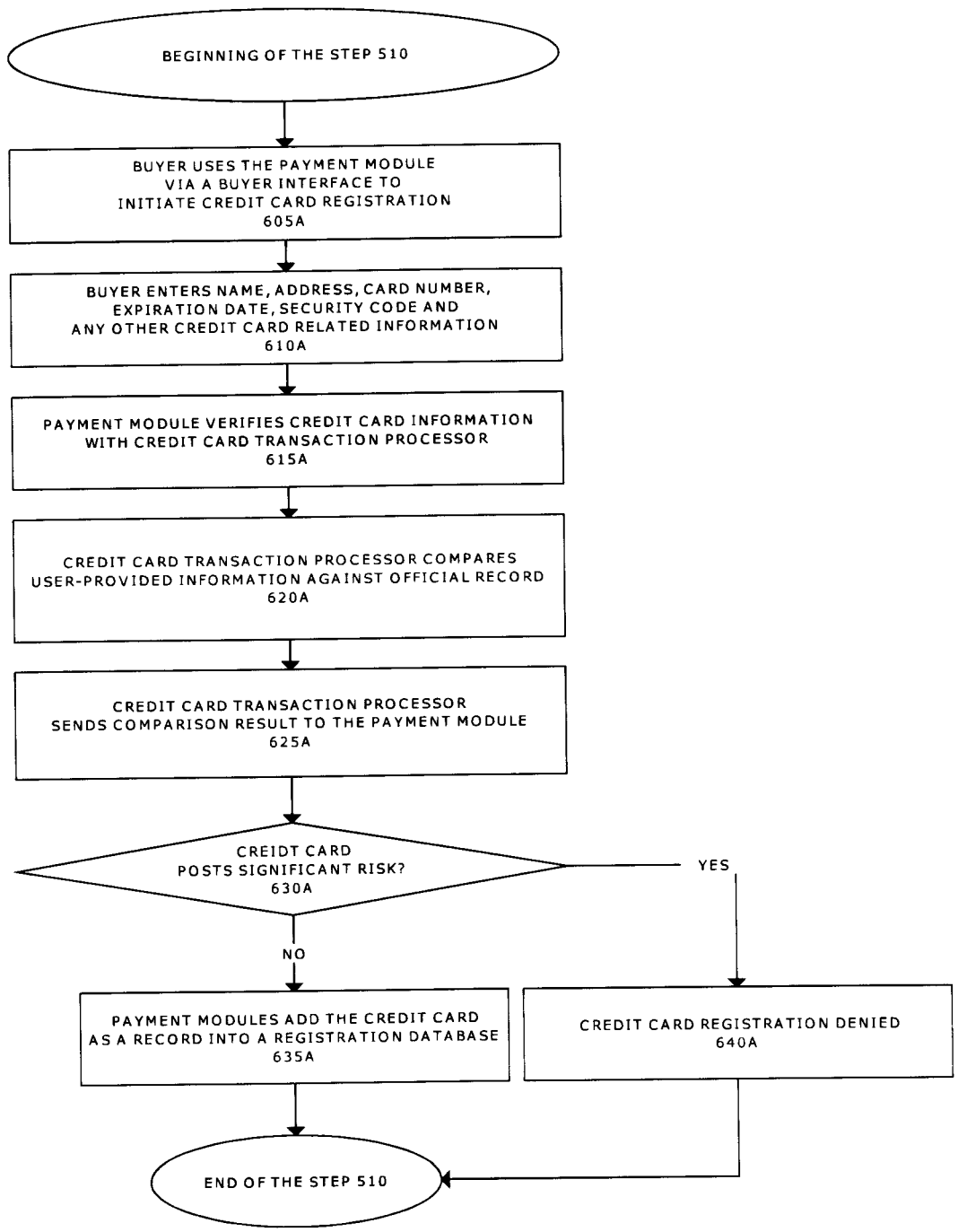
FIG. 6A is a flowchart illustrating an exemplary procedure for registration of credit card as a payment instrument in accordance with an embodiment of the present invention.
Figure 6B:
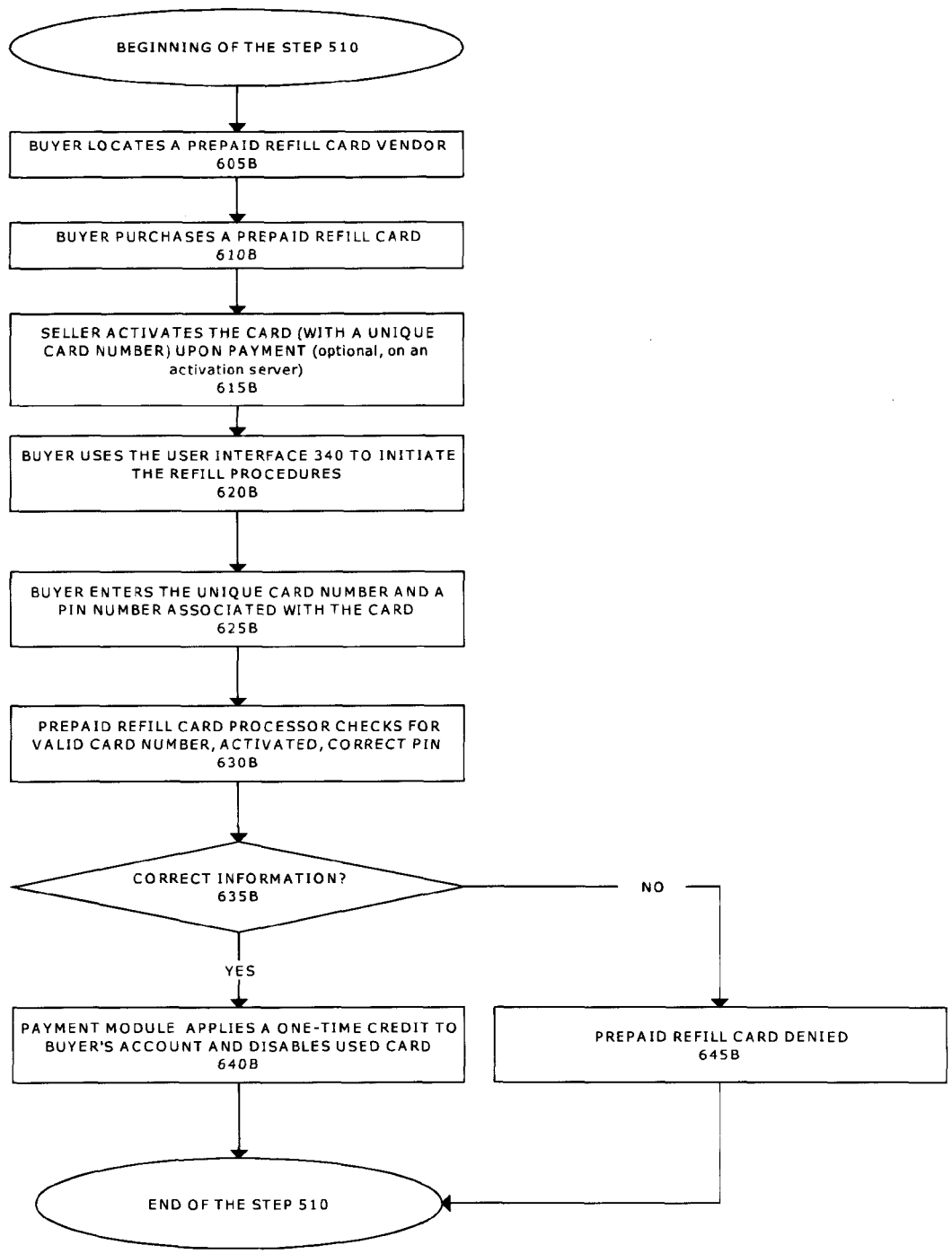
FIG. 6B is a flowchart illustrating an exemplary procedure for using a prepaid refill card as a payment instrument in accordance with an embodiment of the present invention.
Figure 6C:
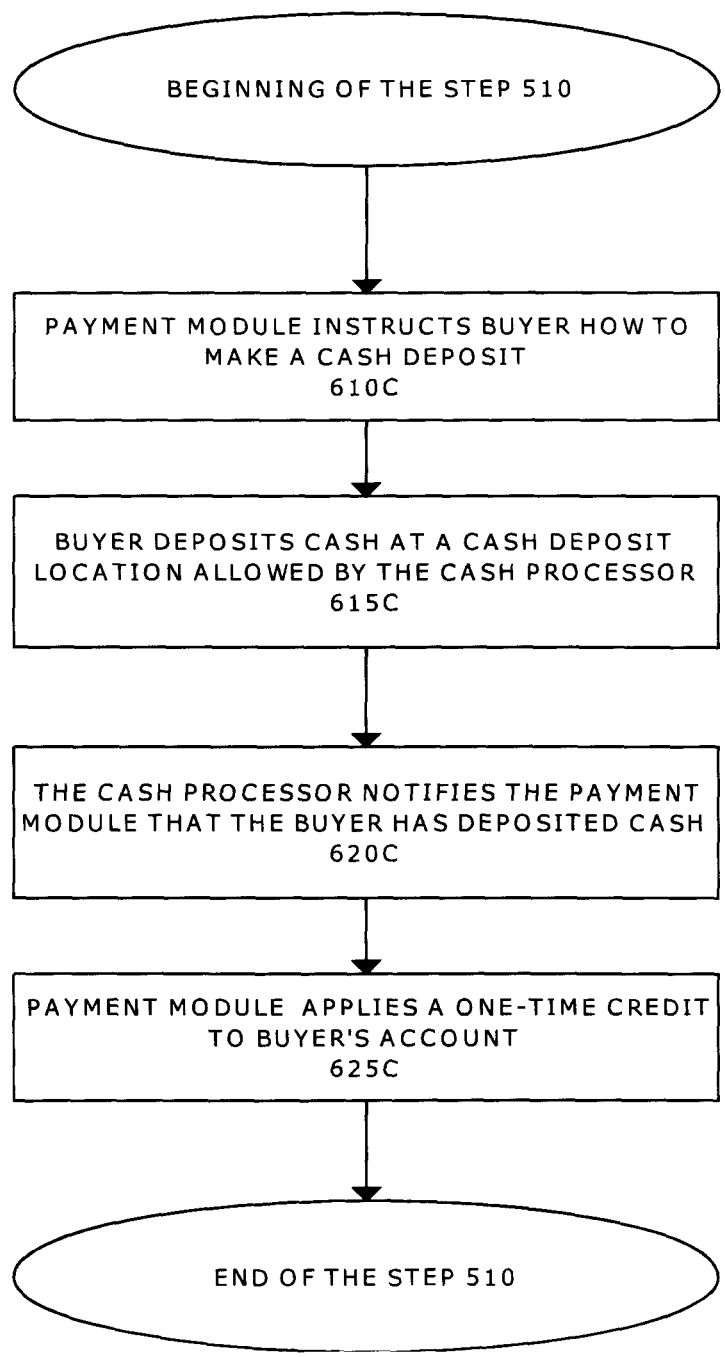
FIG. 6C is a flowchart illustrating an exemplary procedure for using cash deposit as a payment instrument in accordance with an embodiment of the present invention.
Figure 6D:
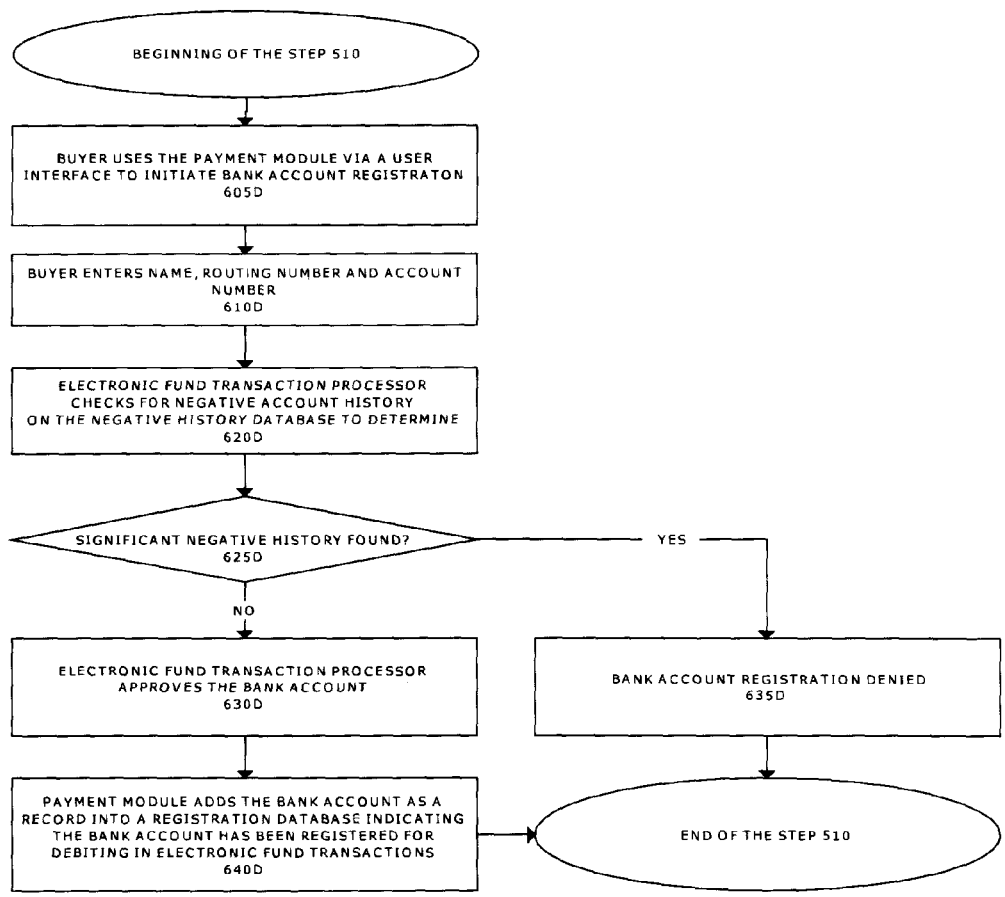
FIG. 6D is a flowchart illustrating an exemplary procedure for registration of bank account as a payment instrument via electronic fund transactions in accordance with an embodiment of the present invention.
Figure 6E:
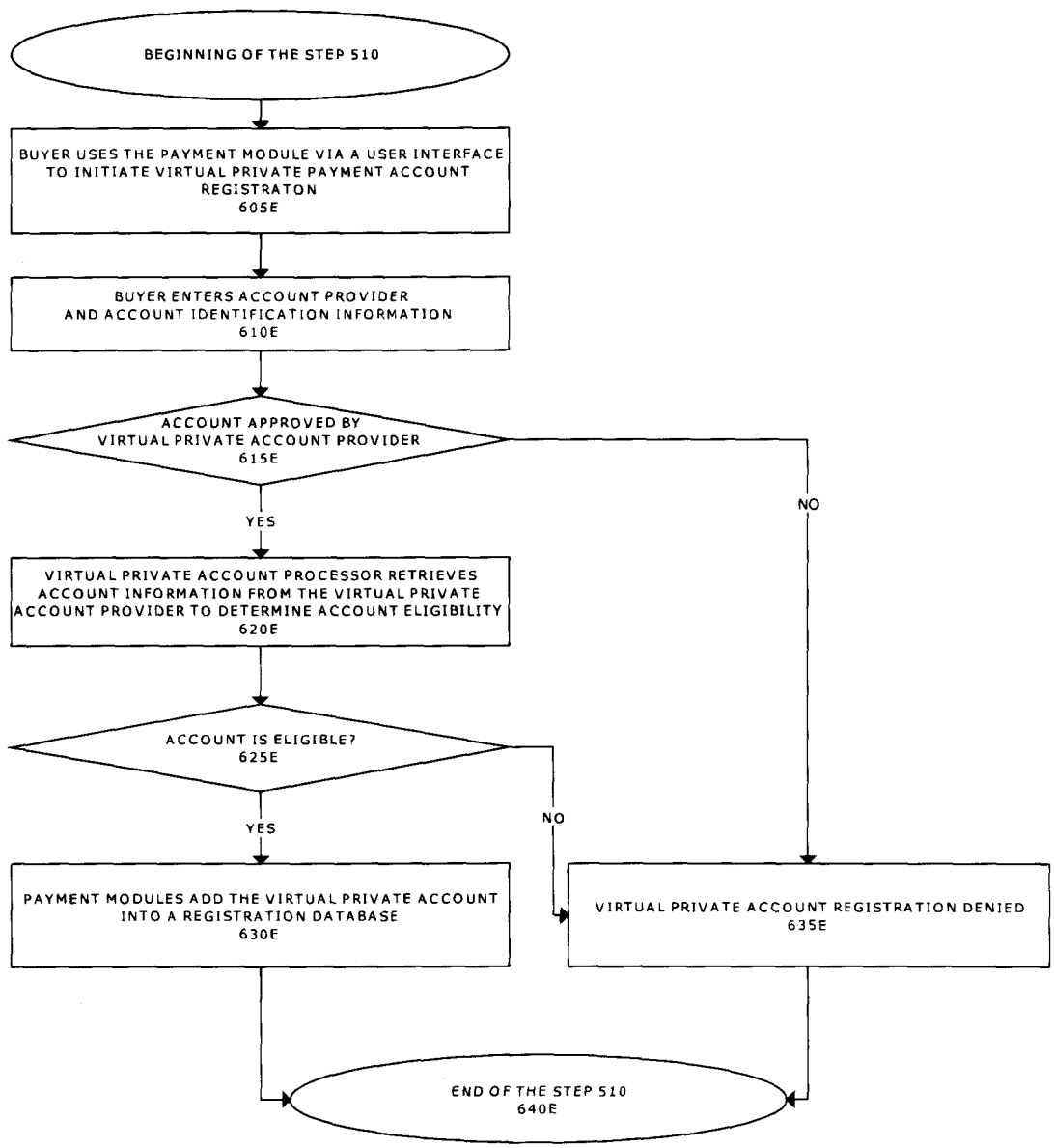
FIG. 6E is a flowchart illustrating an exemplary procedure for registration of virtual private payment account as a payment instrument in accordance with an embodiment of the present invention.
Figure 6F:
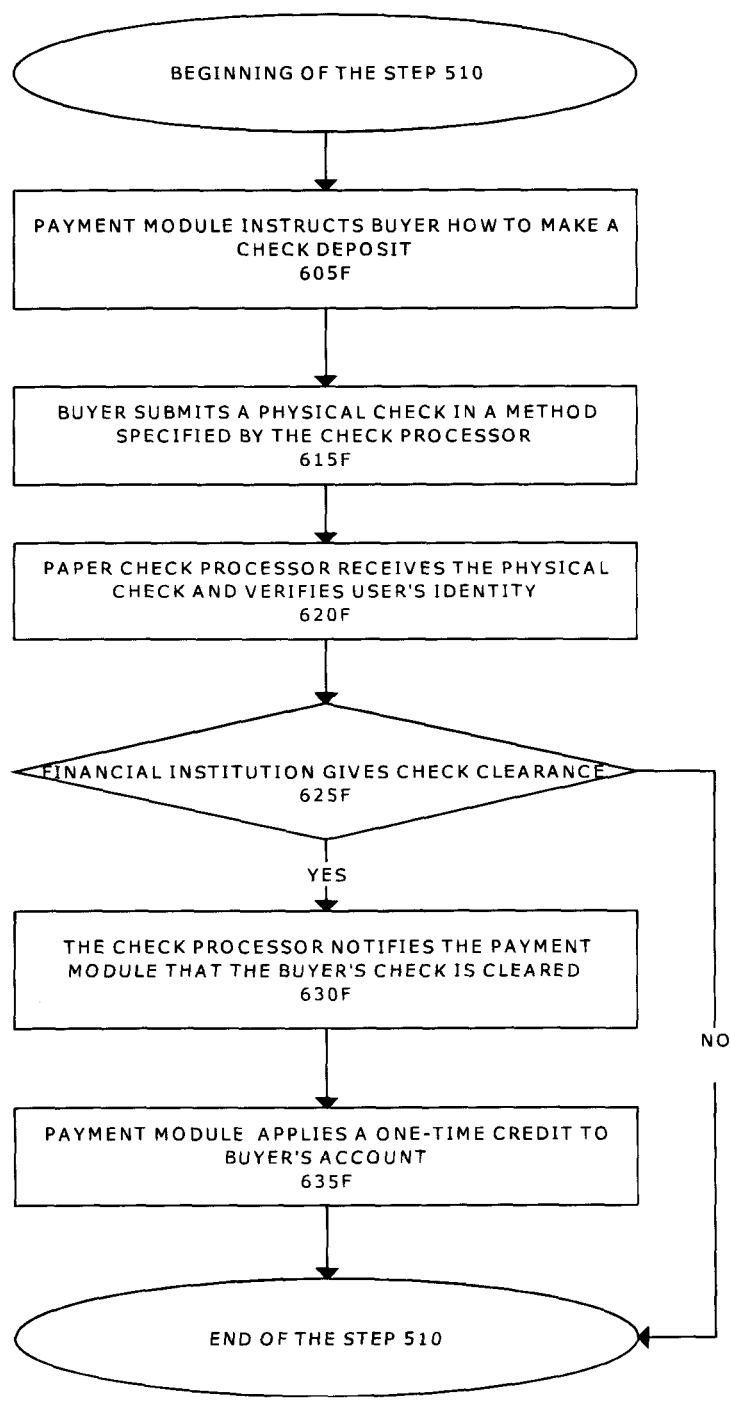
FIG. 6F is a flowchart illustrating an exemplary procedure for registration of a physical check as a payment instrument in accordance with an embodiment of the present invention.
Figure 7A:
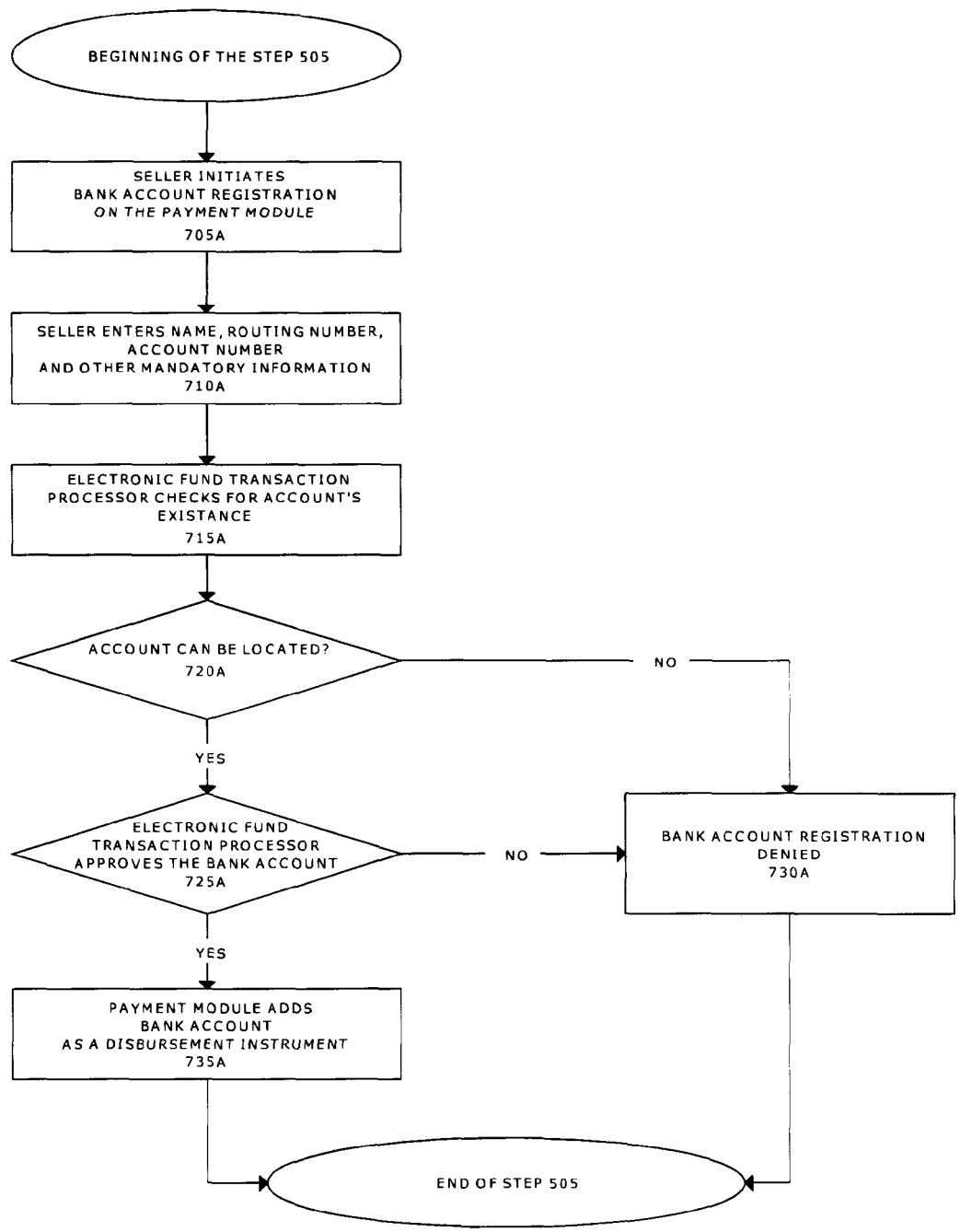
FIG. 7A is a flowchart illustrating an exemplary procedure for registering a bank account as a disbursement instrument in accordance with an embodiment of the present invention.
Figure 7B:
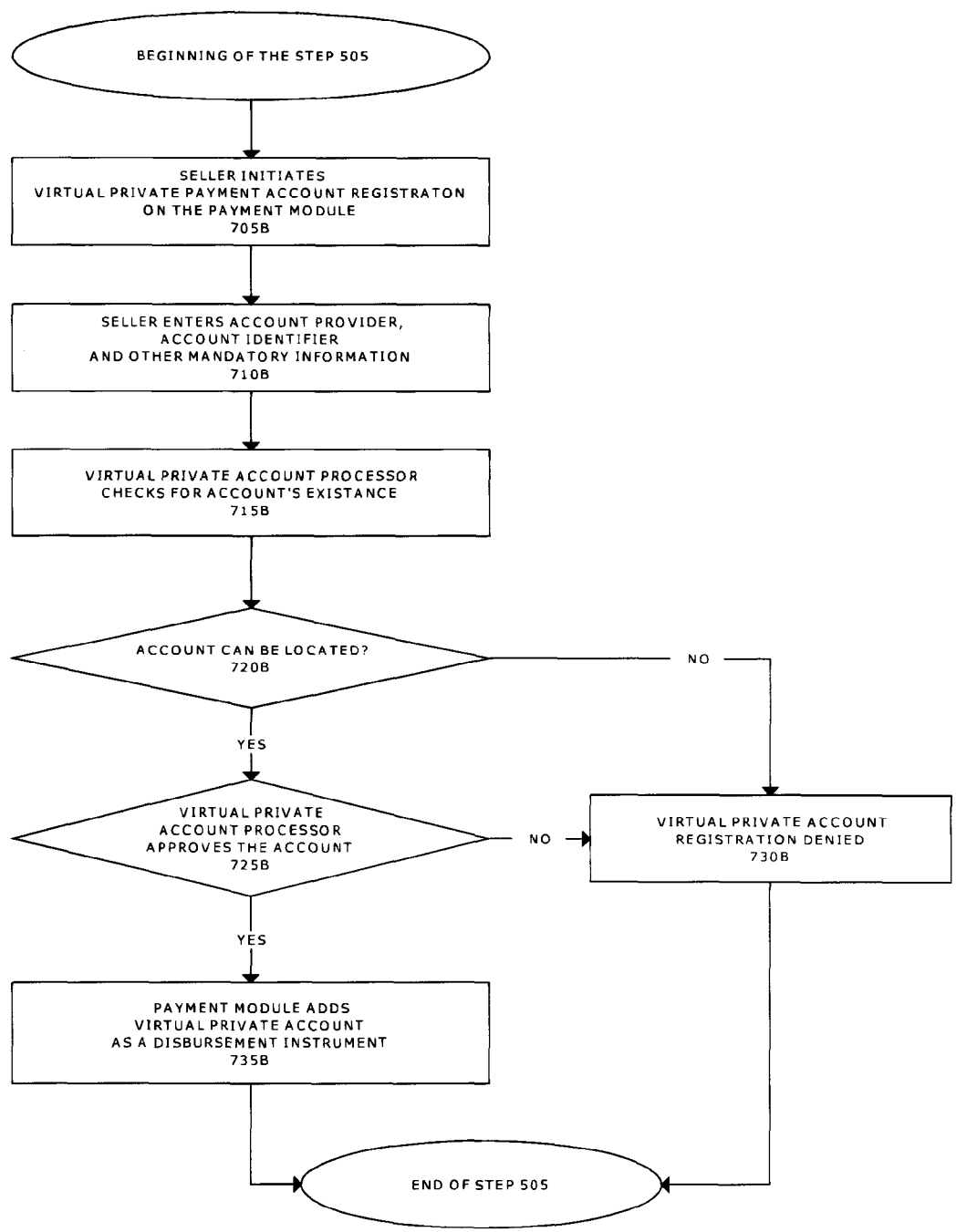
FIG. 7B is a flowchart illustrating an exemplary procedure for registering a virtual private account as a disbursement instrument in accordance with an embodiment of the present invention.

FIG. 4 illustrates an embodiment of an integrated instrument processor 400, which includes a payment processing interface 403 and a disbursement processing interface 404. These two interfaces may be connected to one or more individual instrument processors 401, which may be linked to one or more corresponding intermediary instrument accounts 402. Integrated instrument processor 400 may be linked to a payment sub module 366, which allows buyer 210 and seller 230 to set up preferred payment and distribution instruments. Exemplary embodiments of registration processes for the various payment instruments available to buyer 210 are illustrated in FIGS. 6A-6F. Exemplary embodiments of registration processes for the various disbursement instruments available to seller 230 are illustrated in FIGS. 7A, 7B and 7C.

In accordance with an embodiment, payment sub module 366 delegates the responsibility for processing each payment instrument to individual instrument processors 401 via payment processing interface 403 and delegates the responsibility for processing disbursement through disbursement processing interface 404.

Referring to FIG. 4, the links between individual instrument processors 401 and interfaces 403, 404 represent communication between processors 401 and their corresponding interfaces 403, 404. These links may be a wired or wireless connection regardless of communication protocol. One skilled in the art will appreciate that the network practicing an embodiment of the present invention may take various forms. Accordingly, one may use other types of networks and combinations of network connections in a given embodiment of the present invention without deviating from the scope of the invention.

Each individual instrument processor 401 may be implemented as a module within a computer system, a stand-alone system, a group of networked computers, or other systems as contemplated by one of ordinary skill in the art. Individual instrument processors 401 within the integrated instrument processor 400 may have individual database and/or a centralized database cluster for storing information related to the payment and disbursement process.

Individual instrument processors 401 may specialize in processing one form of instrument. These instrument processors 401 may include a reward processor 410, a credit card processor 420, a prepaid refill card processor 430, a cash processor 440, an electronic fund transaction processor 450, a virtual private payment account processor 460 and a physical check processor 470.

Furthermore, certain individual processors 401 may be connected to one or more corresponding intermediary accounts 402. In the embodiment illustrated in FIG. 4, when payment is received by one of the individual instrument processors 401, the corresponding intermediary account 402 is credited. For example, payment received by credit card processor 420 is credited to an acquirer account 421; payment received by prepaid refill card processor 430 is credited to a sale account 431; payment received by cash processor 440 is credited to a bank account 441; payment and disbursement received by electronic fund transaction processor 450 is credited and debited from a payment bank account 451 and a disbursement bank account 452 respectively; payment and disbursement via virtual private payment account processor 460 are credited to and debited from two virtual accounts 461 and 462 respectively; payment and disbursement via physical check processor 470 are credited to and debited from two bank accounts 471 and 472 respectively.

Referring to the embodiment shown in FIG. 4, the links between the individual instrument processors 401 and corresponding instrument accounts 402 represent association between processors and accounts. Although there are separate accounts for different cash flow activities of different processors in this exemplary embodiment of the present invention, it is to be appreciated that the association of the processors and bank accounts can be re-organized. Multiple processors may share compatible accounts. Alternatively, cash flow activities within an instrument processor may be further broken down to use more accounts for categorization. Although not illustrated here, the fund within intermediary 220 instrument accounts may be transferred from one to another to optimize the operation of the payment system.

In accordance with an exemplary embodiment, payment sub module 366 is linked to a seller account database 405 and an order verification module 363. Seller account database preferably stores seller account information, such as balance, disbursement history, etc. Order verification module 363 preferably continuously monitors the status of pending transactions and notifies payment sub module 366 as transaction status changes. For example, order verification module 363 may notify payment sub module 366 if a cancellation of a pending transaction occurs. Payment sub module 366 may post pending credit to seller 230 account and make the credit available for disbursement after order verification module 363 confirms the satisfactory delivery of goods to buyer 210. Seller 230 may also request disbursement of the available fund in the preferred disbursement instrument(s). The instrument processors may fulfill the disbursement request by transferring the fund from the intermediary's account(s) to the seller's account(s).

For reasons of security control, fund transfer execution or any other reason, it may be preferred to require payment sub module 366 to collect identification information, conduct preliminary background checks and extract historical user information (e.g. transaction history) prior to the registration and execution of payment and disbursement instruments. With the user's authorization, payment sub module 366 may also make use of information that was previously provided by the user along with newly gathered data and payment sub module 366 may pass on such information to the appropriate processor, for example, to complete payment or disbursement registration or execution. By way of non-limiting example, reward processor 410 may require buyer 210's transaction history from e-commerce system 300 to calculate the available reward that buyer 210 may redeem; electronic fund transaction processor 450 may request account information from the bank authority.

One skilled in the art will appreciate that the present disclosure is not limited to computer network architecture 400. Specifically, various instrument processors and their functions as illustrated above may be distributed differently. It is to be appreciated that payment module 363 along with all the individual instrument processors 401 and their components may be broken down and managed by intermediary 220 or any other third-party systems. Payment sub module 366 may incorporate functions of certain instrument processors, such as reward processor 410, and process internal rewards.

Reference is made to FIG. 5, which illustrates how payment is submitted by buyer 210 and released to seller 230 via an intermediary 220 in accordance with an aspect of the present invention. In the embodiment illustrated, in step 505, seller 230 registers at least one disbursement instrument with payment sub module 366. In step 510, buyer 210 registers at least one payment instrument with payment sub module 366. Alternative, buyer 210 may register at least one payment instrument with payment sub module 366 prior to seller 230 registering at least one disbursement instrument with payment sub module 366. In step 515, buyer 210 and seller 230 agree upon a transaction through interaction in e-commerce system 300. The transaction may involve seller 230 listing goods for sale and buyer 210 committing to make a purchase. Alternatively, buyer 210 may list what is wanted and seller 230 may commit to fulfilling providing what is in the buyer's listing. However, the mutually agreed upon transaction is not limited to the aforementioned examples. For example, Steps 510 may precede step 505 without deviating from the scope of the invention.

In accordance with the embodiment illustrated, in step 520, if payment is necessary, buyer 210 is prompted to make a payment to intermediary 220. Buyer 210 may use one or more payment instruments such as one or a combination of the previously registered payment instruments. Buyer 210 submits payment to intermediary 220 with the preferred instruments via payment sub module 366. In step 525, intermediary 220 charges and receives the payment from buyer 210 and holds the payment in one or more intermediary instrument account(s) 402. In step 530, payment sub module 366 shows the amount payable to the seller 230 as pending in seller's account. At this time, seller 230 is not yet authorized to access the fund. In step 535, buyer 210 authorizes the transaction to the seller 230. Seller 230 proves delivery to order verification module 363. Once the transaction is verified, payment sub module 366 makes the amount payable to seller 230 available in seller's account for disbursement in step 540. In step 545, seller 230 selects a previously registered disbursement instruments or registers for a disbursement instruments then instructs payment sub module 366 to disburse the available fund from seller 230's account. Alternatively, seller 230 may instruct payment sub module 366 to disburse available balance from seller 230's account to external bank account periodically. In step 550, payment sub module 366 disburses the available balance in seller's account according to predetermined rules, if any.

Payment Instrument Registrations

Reference is made to FIGS. 6A-6F, wherein certain embodiments of the buyer registration of at least one payment instrument with the payment module of step 510 are illustrated. More specifically, FIGS. 6A, 6B, 6C, 6D, 6E and 6F illustrate embodiments of the process of step 510 wherein the payment instrument is a credit card, pre-paid card, cash, bank account, virtual private payment account and physical check, respectively.

1. Credit card: In accordance with the embodiment illustrated in FIG. 6A, the routine preferably begins with step 605A, in which payment sub module 366 presents buyer 210 with a user interface enabling buyer 210 to enter credit card registration information. In step 610A, buyer 210 preferably enters name, address, card association, card number, and card expiration date and/or other credit card related information through a user interface. In step 615A, payment sub module 366 may send user-provided information to credit card transaction processor 420 for comparison and registration processing. In step 620A, credit card transaction processor 420 may compare the user-provided information against the official record on file. Alternatively, credit card transaction processor 420 may delegate the data comparison task to the credit card issuer. Upon completing the comparison, a metric indicating the degree to which the provided information match with the official record is preferably returned. This metric may be a score indicating the risk associated with the transaction. In step 625A of the embodiment illustrated, credit card transaction processor 420 sends payment sub module 366 a metric indicating such risk. In step 630A, payment sub module 366, based on the returned metric, determines whether the risk metric poses significant risk, wherein the metric is greater or lower than the predetermined threshold metric value in accordance with an embodiment of the invention. If the metric indicate a significant risk, the "YES" branch is followed to step 640A, wherein credit card registration is denied, and the routine returns to the end of step 510. If the metric indicates that the credit card registration does not pose significant risk, the "NO" branch is followed to step 635A, wherein payment sub module 366 creates a registration record for the credit card. The registration record may then be stored in a registration database at payment sub module 366. Preferably, the routine then proceeds to the end step 510.

2. Pre-paid card: As illustrated in FIG. 6B, an embodiment of the routine may begin at step 605B, in which buyer 210 locates a prepaid refill card vendor. In step 610B, buyer 210 may purchase a prepaid refill card with a specified card value. The prepaid refill card may have a visible card number and a covered pin number. Each card number for the prepaid refill card can be unique and accompanied with a pin number. In step 615B of the embodiment illustrated, seller 230 activates the prepaid refill card upon purchase by sending the card number to prepaid refill card processor 430. The activation process may involve an activation server. The value of the card may be stored on the card, a remote server, both, or on another suitable device. In step 620B in the illustrated embodiment, buyer 210 uses buyer interface 341 to initiate the refill procedures via payment sub module 366. In step 625B, buyer 210 preferably enters the unique card number and the accompanied pin number using buyer interface 341. In step 630B, prepaid refill card processor 430 may enter the user-provided information (e.g. card number and pin number with the card numbers) in the system to validate the card. In step 635B, prepaid refill card processor 430 preferably determines whether or not the user-provided information is correct. Preferably, if prepaid refill card processor 430 determines that the user-provided information is incorrect, the "NO" branch is followed to step 645B, wherein refill of the buyer's account is denied, and the routine returns in the end of 510. If the information is determined to be correct, then the "YES" branch is preferably followed to step 640B, wherein payment sub module 366 applies a one-time credit to buyer 210's account and disables the used card. The routine then may proceed to the end of step 510.

3. Cash: An embodiment of the invention is illustrated in FIG. 6D, wherein in step 610C, payment sub module 366 instructs buyer how to make a cash deposit. In step 615C, buyer 210 may deposit cash at an acceptable cash deposit location which is registered with cash processor 406. In step 620C, cash processor 406 may notify payment sub module 366 that buyer 210 has deposited prearranged amount of cash. Upon the notification that buyer 210 has made a cash deposit, payment sub module 366 preferably updates buyer's account and applies a one-time credit to indicate that buyer 210 has completed the deposit.

4. Bank Account: Referring to FIG. 6D, an embodiment of the routine begins with step 605D. Payment sub module 366 preferably presents buyer 210 with a user interface enabling buyer 210 to enter bank account registration information, such that in step 610D, buyer 210 may enter name, routing number, account number and other relevant information through the user interface. In step 620D, payment sub module 366 may provide user-provided information to electronic fund transaction processor 450 to retrieve account information, wherein electronic fund transaction processor 450 may review a negative history database to determine if there is negative history related to the account. One may use any negative history review known to those skilled in the art without deviating from the scope of the invention. If negative history is found to an extent surpassing a preferably predetermined threshold and determined to be significant negative history, the "YES" branch may be followed to step 635D, and registration of the bank account as a payment instrument is denied. If significant negative history is not found, then the "NO" branch is preferably followed to step 630D wherein electronic fund transaction processor 450 notifies payment sub module 366 that transaction requests will be accepted for the bank account. Payment sub module 366 may then create a registration record indicating that the bank account has been registered for debiting in electronic fund transactions. This registration record is preferably stored in a registration database at payment sub module 366.

5. Virtual private payment account: Reference is made to FIG. 6E, wherein an embodiment of the invention is illustrated. The routine preferably begins in step 605E, in which payment sub module 366 presents buyer 210 with a buyer interface 341 enabling buyer 210 to enter the virtual private payment account registration information. In step 610E, buyer 210 may enter the account provider and the account number for the virtual private payment account. In step 615E, payment sub module 366 may provide user-provided information to virtual private account processor 460 for validation. If the account validation process fails, the "NO" branch may be followed to the step 635E where the virtual private account registration is denied. If account validation succeeds, the "YES" branch may be followed to step 620E where virtual private account processor 460 retrieves the account information from the virtual private account provider. In step 625E, virtual private account processor 460 may determine the account's eligibility for being accepted as a payment instrument based on the information previously retrieved. The grounds for determining the account's eligibility may vary according to the virtual private account. In step 630E, payment sub module 366 may add the virtual private account into a registration database if the account is determined to be eligible in step 625E. Preferably, the routine then proceeds to the end of step 510. If the account is determined to be ineligible in step 625E, then in step 635E, the virtual private account registration may be denied and the routine may return to the end of step 510.

6. Physical check: In accordance with the embodiment illustrated in FIG. 6F, in step 605F, payment sub module 366 instructs buyer 210 to submit a physical check, such as a paper check or other physical check as contemplated by those of ordinary skill in the art. In step 615F, buyer 210 may submit a physical check in a method specified by check processor 470. As illustrated, in step 620F, check processor 470 receives a physical check and verifies buyer 210's identity and in step 625F, check processor 470 processes the check and obtains the payment specified by the check. Preferably, if the check is cleared, the routine proceeds to step 625F, otherwise the routine proceeds to the end of step 510. In step 630F, check processor 470 may electronically notify payment sub module 366 that the buyer's check has been cleared. In step 635F, payment sub module 366 may receive notification from check processor 470 and update buyer's account with a onetime credit to indicate that buyer 210 has completed the check deposit. The routine then preferably proceeds to the end of step 510.

Disbursement Instrument Registrations

Reference is made to FIGS. 7A-7F, wherein certain embodiments of the disbursement instrument registration of at least one disbursement instrument with the payment module of step 505 are illustrated. More specifically, FIGS. 7A, 7B and 7C illustrate embodiments of the process of step 505 wherein the payment instrument is a bank account, virtual private payment account and physical check disbursement, respectively. As illustrated in FIGS. 7A, 7B, and 7C, registration may begin when seller 230 initiates registration on payment sub module 366. See Steps 705A, 705B and 705C. Seller may enter necessary information, such as user information, account identifier and other information. Using information provided by payment sub module 366, individual instrument processors 401 preferably validates the account's existence and/or the user's identity. For example, in the embodiment of step 715A illustrated, payment sub module 366 provides the information entered by seller 230 to electronic fund transaction processor 450 to check if the account information matches with an existing account; in step 715B, payment sub module 366 provides the information entered by seller 230 to virtual private account processor 460 to check if the account information matches with an existing account; and in step 715C, payment sub module 366 provides the information entered by seller 230 to physical check processor 470 for validation.

In the case of bank account registration and virtual private payment account registration, if the account exists, then the "YES" branch may be followed after which, preferably, individual instrument processor approves the account in steps 725A and 725B and payment sub module 366 adds the bank account under seller approved disbursement instruments in 735A or adds the virtual private account as a disbursement instrument in 735B. The routine may then return to the end of step 505. If the account does not exist, the "NO" branch is preferably followed to step 730A or 730B. The registration of the bank account or the virtual private account as a disbursement instrument is preferably denied, and the routine may then proceed to the end of step 505.

In situations involving a physical check, payment sub module 366 or physical check processor 470 may require another existing valid disbursement method, credit history check and/or pending payment period to reduce security risk, in additional to seller 230 entering basic identification information. In step 720C, physical check processor 470 preferably determines whether the provided information can be used towards check disbursement. If yes, then the "YES" branch may be followed to step 730C and payment sub module 366 may add physical check under seller's approved disbursement instruments. Otherwise, the "NO" branch is preferably followed to step 725C wherein the registration of the physical check as a disbursement instrument is denied. The routine may then returns to the end of step 505.

Authorization of Transactions

Reference is made to FIG. 8, wherein an embodiment of the authorization of transactions is illustrated. In the embodiment shown, buyer 210 uses communication device 330 to make a purchase with purchase/sale module 361. Buyer 210 preferably also interacts with order verification module 363 to conduct initialization or synchronization required by one or more chosen authorization methods in step 810. Order verification module 363 may delegate the initial set up and verification process of these methodologies to different system modules, as illustrated in FIG. 9.

If a payment (deposit or full payment) is required for the transaction, buyer 210 may be prompted to specify payment information, which is preferably forwarded to payment sub module 366 for approval before order is accepted and notice is sent to seller 230. The required payment amount may be arbitrarily determined based on the seller's preference or buyer's selection. For example, the required amount may be a specified percentage as a deposit or full payment. Because payment sub module 366 may act as an escrow agent in this transaction, buyer 210's payment information may not be disclosed to seller 230 and payment may not be released to seller 230 until buyer 210 authorizes the transaction during pick up or delivery.

In step 815, purchase/sale module 361 may send an order notice to seller 230 after the transaction is finalized or seller 230 may check for new orders. This order notice may include order and buyer information. After receiving the order notice, in step 820, seller 230 may request goods from an inventory provider 865, who then may dispatch requested goods to a designated delivery agent 860.

It is to be appreciated that step 820 and step 825 exemplify communications between seller 230, inventory provider 865 and delivery agent 860. Such communication may be conducted within or outside the e-commerce platform 300 or a combination thereof, without deviating from the scope of the invention.

Depending on the offering of seller 230 and the preference of buyer 210, buyer 210 may have the option to pick up the goods or have the goods delivered to a specified address. Upon buyer's satisfaction after inspection in step 830, buyer 210 may pay the remaining balance, if any. Buy 210 may pay delivery agent 860 or any party authorized by seller 230.

Alternatively, buyer 210 may authorize the transaction by submitting an authorization signal to a verification agent 870. Verification agent 870 may be any entity that accepts the authorization signal from buyer 210 for transaction authorization. In one embodiment, verification agent 870 may also be the same entity as delivery agent 860 that accepts a code as the authorization signal from buyer 210 and enters such code into special user interface 343 that links to order verification module 363. In another embodiment, verification agent 870 may be any communication device, with which buyer 210 may authenticate himself and authorize the transaction. A non-exclusive list of potential communication devices as verification agents 870 includes phone, fax, smart-card read or biometric input device which takes biometric sample upon buyer's authorization.

Upon receiving the authorization signal from buyer 210, verification agent 870 may send the signal to order verification module 363 for verification and to authorize delivery. Order verification module 363 may be a server as part of e-commerce system 300, a separate entity that belongs to a different organization or a combination thereof. For security purposes, it may be preferred for order verification module 363 to block excessive authorization attempts. If the authorization signal is verified and the order is still valid, order verification module 363 may notify delivery agent 860 to transfer the goods/services to buyer 210. Alternatively, delivery agent 860 may check the transaction authorization status with order verification module 363. Upon successful authorization, order verification module 363 may notify payment sub module 366 that the delivery has been authorized and payment may be released. In step 855, payment sub module 366 preferably makes payment available to seller 230 within a predetermined amount of time.

It is to be appreciated that even though seller 230, inventory provider 865 and delivery agent 860 are illustrated herein as different entities, one entity may take on one or more roles across different transactions. In one embodiment, seller 230 may also be the inventory provider 865 and delivery agent 860 if seller 230 holds an inventory of goods for sale and handles all the delivery and pick up. In another embodiment, seller 230 may be inventory provider 865 for some of the merchandizes but also cooperate with other third party inventory providers and hire third-party delivery agents 860. Accordingly, various arrangements are contemplated within the scope of the invention.

Authorization Methodologies

In accordance with an embodiment of the invention as shown in FIG. 9, order verification module 363 is connected to three different specialized modules: an authorization signal processing module 910, an authorization algorithm processing module 920 and a user identification processing module 930. It is to be appreciated that these processing modules may be internal entities, external entities that are maintained by a separate organization or a combination thereof. Order verification module 363 may delegate the initial setup and synchronization procedures to each of these processing modules before any transaction authorization takes place. Order verification module 363 may also delegate the verification procedures to one of these three specialized processing modules when transaction authorization is requested. It is to be appreciated that these processing modules may be used independently or in combination thereof to authorize transactions.

1. Authorization Signal Processing Module 910: An embodiment of this module utilizes an authorization signal that may be generated by either buyer or seller. Each transaction may be associated with its corresponding authorization signal that is kept by buyer 210 as a secret signal.

Authorization signal processing module 910 may include authorization signal manager 911 and authorization signal database 916. Upon placing an order in step 1005, buyer 210 and order verification module 363 preferably interacts to create an authorization signal. Order verification module 363 may delegate this process to authorization signal processing module 910 for associating the authorization signal to a specific transaction. Authorization signal processing module 910 preferably synchronizes the authorization signal and the synchronized authorization signal may be stored in authorization signal database 916.

Figure 10A:
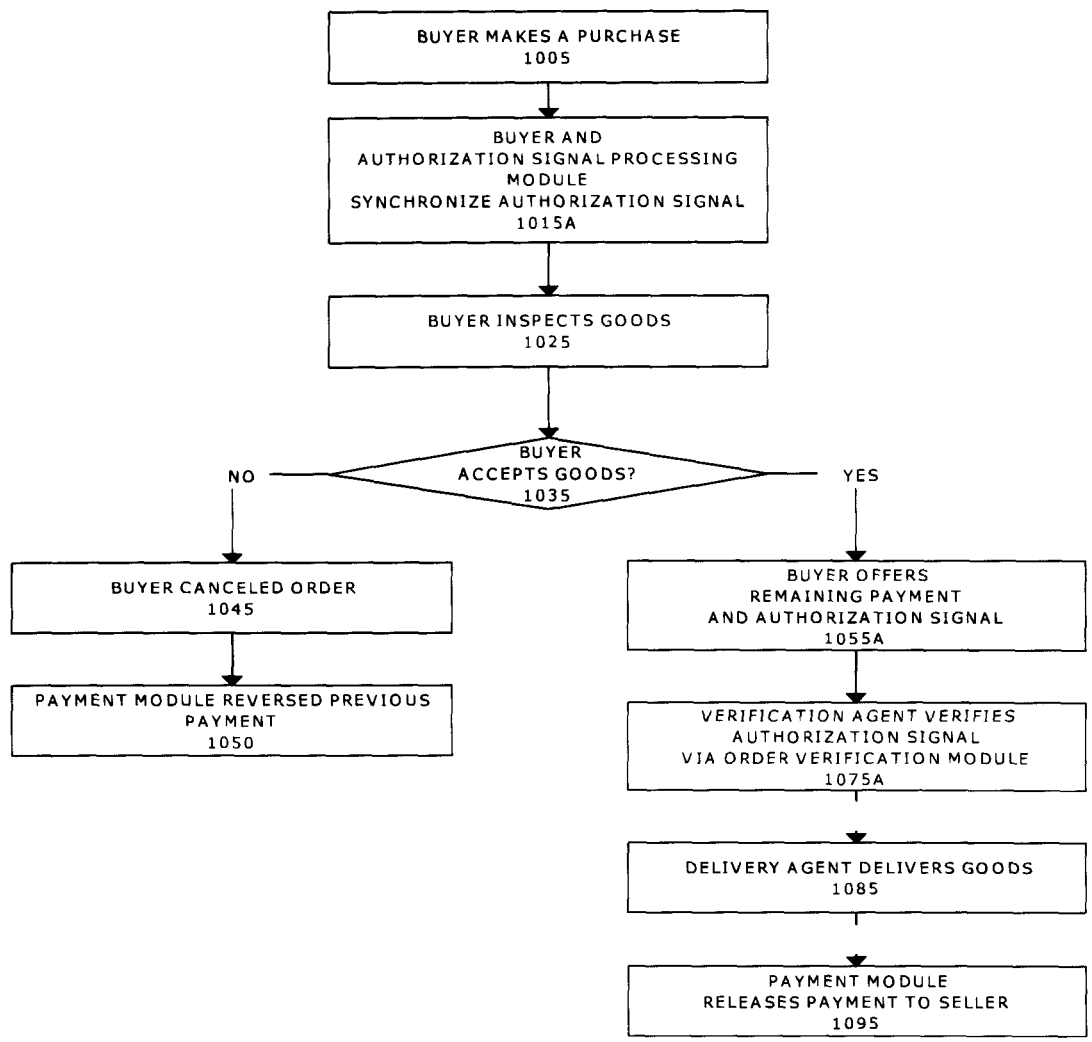
FIG. 10A is a flowchart illustrating the process wherein a buyer authorizes a transaction with a previously synchronized authorization signal in accordance with an embodiment of the present invention.
Figure 10B:
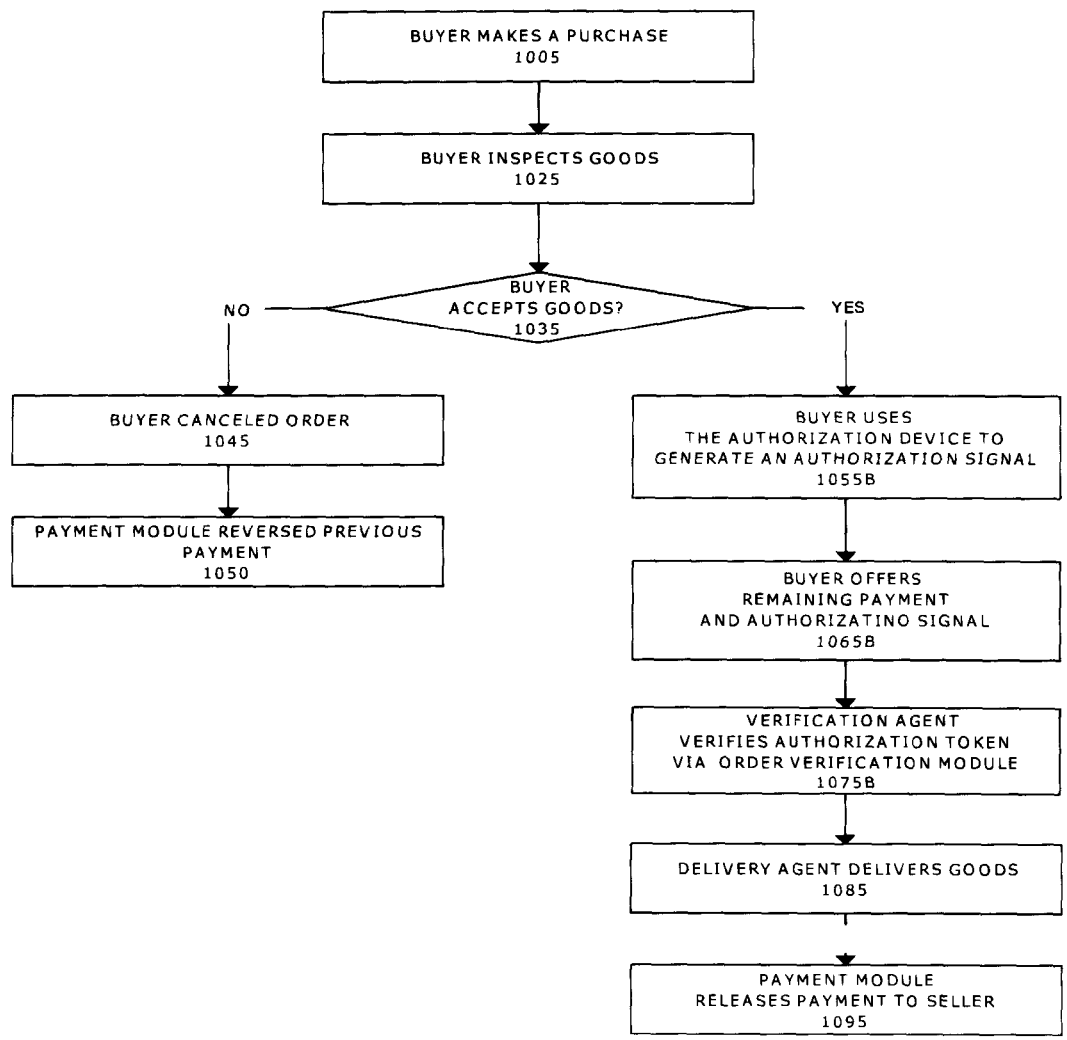
FIG. 10B is a flowchart illustrating the process wherein a buyer authorizes a transaction with an authorization signal generated by a previously synchronized authorization algorithm in accordance with an embodiment of the present invention.
Figure 10C:
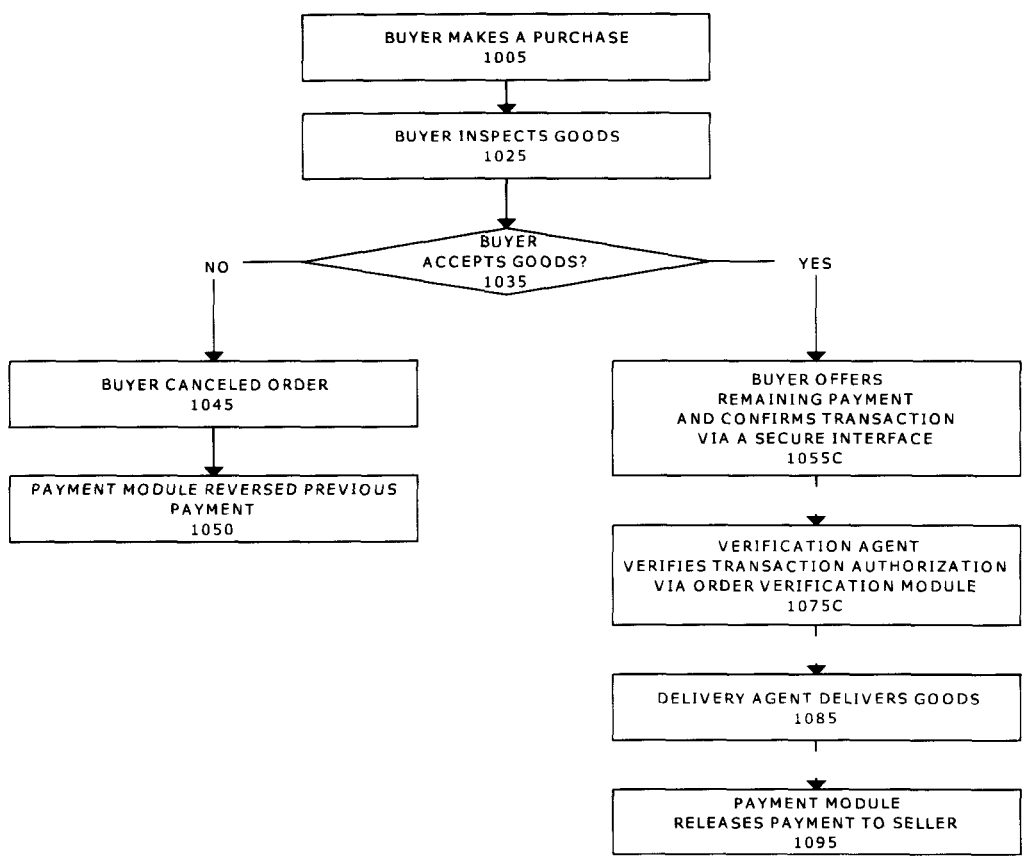
FIG. 10C is a flowchart illustrating the process wherein a buyer authorizes a transaction with an authorization signal embedded with certain identification information in accordance with an embodiment of the present invention.

In steps 1005 and 1025 of FIG. 10A, buyer 210 may place an order and inspect the goods during pick up or delivery. If buyer 210 decides the goods are not in an acceptable condition, buyer 210 may decide to cancel the order in step 1045, by way of non-limiting example, within a predetermined time frame from pick up or delivery. If the order is cancelled, previous payment is preferably refunded according to the policy of e-commerce system 300 in step 1050.

Alternatively, if buyer 210 accepts the goods/services, buyer 210 may offer the remaining payment, if applicable, and tender the authorization signal to verification agent 870 upon satisfactory acceptance of goods or services ordered in step 1055A. Upon receipt of the signal, in step 1075A, verification agent 870 preferably verifies and acquires transaction authorization through order verification module 363.

Upon the request of delivery authorization from verification agent 870, order verification module 363 may delegate the verification process to authorization signal processing module 910, specifically to authorization manager 911, which verifies the submitted signal by comparing the provided authorization signal with the previously synchronized authorization signal stored in authorization signal database 916.

An embodiment of the present invention may require the submitted signal to be the same as the previously synchronized signal, different, or different and in accordance with a pre-determined mathematical formula. The submitted signal may also be any transformed representation of the previously synchronized signal or vice versa.

In accordance with an embodiment of the invention, if the submitted signal is determined not to be valid based on the pre-determined rule, verification module 363 returns a negative result from authorization signal processing module 910 and increases a counter for unsuccessful authorization by 1 or other unit as a matter of application specific design choice. For security, order verification module 363 may allow only a predetermined number of attempts for requesting authorization before authorization for the transaction becomes suspended. For example, the transaction may be suspended if the counter value for unsuccessful authorizations is greater than a predetermined number. The suspended order may be canceled after a predetermined period, and order verification module 363 may trigger payment sub module 366 to issue refund to buyer 210 afterwards.

The verification result is preferably sent back to order verification module 363 in step 1075A. Preferably, if the provided authorization signal is the same as the previously synchronized signal or other acceptable predetermined value, order verification module 363 authorizes delivery agent 860 to deliver goods to buyer 210 in step 1085. Otherwise, buyer 210 may re-submit the authorization signal to verification agent 870.

Order verification module 363 may also notify payment sub module 366 to release payment available to seller 230 within a predetermined time period in step 1095. The disbursement may be automatic or manual upon seller's request.

2. Authorization Algorithm Processing Module 920: An embodiment of this module involves the use of a secret authorization algorithm and parameters that allows the system and the buyer to synchronize and independently generate an authorization signal for verification. Authorization algorithm processing module may include an algorithm manager 921, an algorithm database 926, a device attributes database 927 and a digital clock 922.

After buyer 210 places an order and before the pickup or delivery of such order, buyer 210 may activate an authorization device. The activation procedure preferably includes the synchronization of authorization algorithm and parameters between an authorization device 1710 and authorization algorithm processing module 921. The synchronization procedures may allow both authorization device 1710 and algorithm manager 921 to have the same algorithm and parameters, which may allow both to independently generate an authorization signal in real time. The synchronized algorithm and associated device parameters may be stored in algorithm dataset 926 and device attributes database 927. In one embodiment, synchronization conducted anytime before authorization device 1710 is first used. Afterwards, the synchronization process may take place regularly which may enhance the overall security of the device. Authorization device 1710 may not necessarily require synchronization after every purchase.

In steps 1005 and 1025, buyer 210 may place an order and inspects the goods during the pick up or delivery. If buyer 210 decides the goods are not in an acceptable condition, buyer 210 may decide to cancel the order in step 1045. If order is cancelled, previous payment is preferably refunded according to the policy of e-commerce system 300 in step 1050.

If buyer 210 accepts the goods, buyer 210 may tender the remaining payment required and use authorization device 1710 to generate and submit an authorization signal to verification agent 870 in step 1065B. Verification agent 870 may submit the authorization signal to order verification module 363 for transaction authorization. Order verification module 363 may delegate verification to algorithm processing module 920, more specifically to algorithm processing manager 921.

Preferably, upon receiving the verification request, algorithm manager 921 retrieves the previously synchronized algorithm from algorithm database 926 and other associated parameters from device attributes database 927 to independently generate an authorization signal for comparison. In one aspect of the present invention, algorithm manager 921 and authorization device 1710 uses time and transaction information to generate the authorization signal and thus create an authorization signal specific to transaction and point in time. Authorization algorithm processing module 920 may compare the submitted signal with the generated authorization signal.

One embodiment of the invention may require the submitted signal to be the same as the previously synchronized signal. Alternatively, it may be required for the submitted signal and the previously synchronized signal to be in accordance with a pre-determined mathematical formula (e.g. submitted signal=previously synchronized signal+offset). In accordance with an exemplary embodiment, the submitted signal may be a transformed representation of the previously synchronized signal or vice versa. If the submitted signal is not valid based on the pre-determined rule, verification module 363 may return a negative result from authorization algorithm processing module 920 and increase a counter for unsuccessful authorization by 1 or other unit as a matter of application specific design choice. It may be beneficial for security purposes for order verification module 363 to allow only a predetermined number of attempts for requesting for authorization before authorization for the transaction is suspended. More specifically, the transaction may be suspended if the counter for unsuccessful authorization is greater than a predetermined value. The suspended order may be canceled after a predetermined period, and order verification module 363 may trigger payment sub module 366 to subsequently issue refund to buyer 210.

The verification result is preferably sent back to order verification module 363 in step 1075B. If the provided authorization signal matches the previously synchronized signal or other acceptable predetermined value, order verification module 363 may authorize delivery agent 860 to deliver goods to buyer 210 in step 1085. Otherwise, buyer 210 may re-submit the authorization signal to verification agent 870.

Order verification module 363 may also notify payment sub module 366 to release payment available to seller 230 within a predetermined time period in step 1095. The disbursement may be automatic or manual upon seller's request.

3. User Identification Processing module 930: An embodiment of this module involves the use of an authorization signal associated with the identity of the user. For security reasons, it may be preferable for the authorization signal to be difficult to replicate, so that it will be difficult to be used by an unauthorized entity. The authorization signal may embed certain identification information, such as password or biometric characteristics, such as fingerprints and face reorganization.

Figure 25:
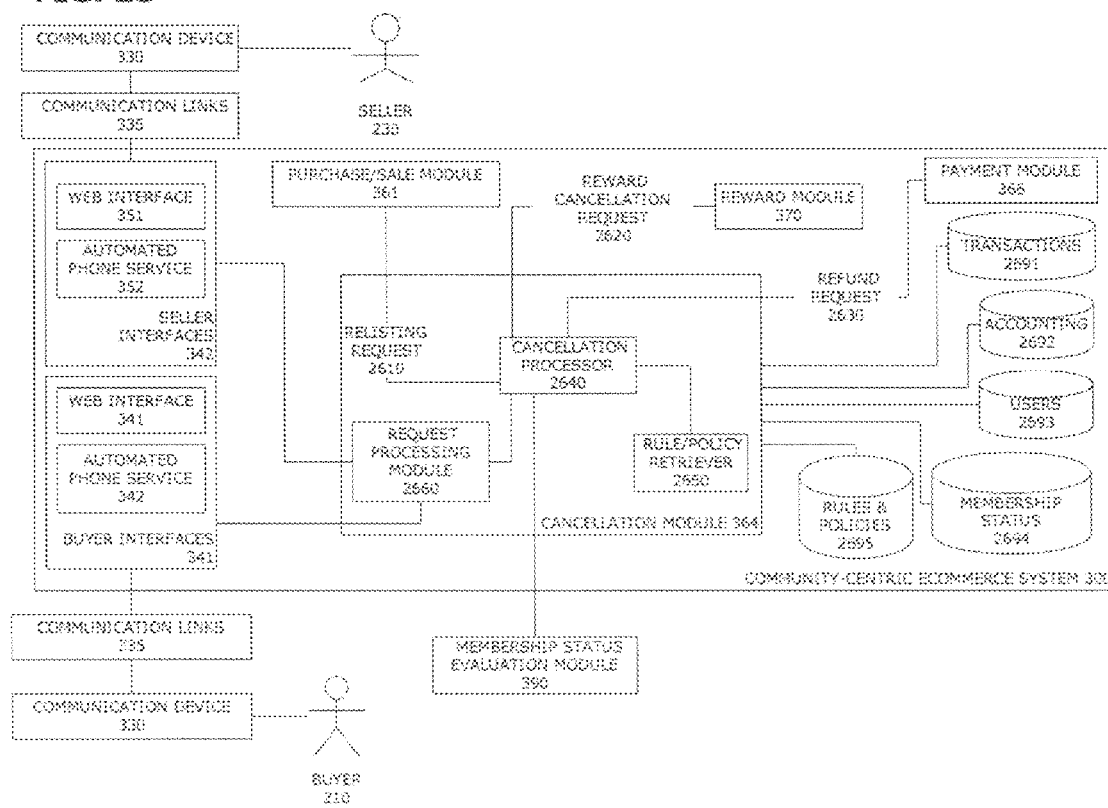
FIG. 25 illustrates the architecture of a dynamic cancellation system in an e-commerce system in accordance with an embodiment of the present invention.

User identification processing module 930 may include an identification manager 931 and identification information database 936. Preferably, identification manager 931 accepts user authorization signal securely and stores the authorization signal in identification information database 936 during the initialization process in step 810. A special device, as shown in FIG. 25, may be used to collect this authorization signal from buyer 210 upon buyer's satisfactory acceptance of goods or services.

In steps 1005 and 1025, buyer 210 may place an order and inspect the goods during the pick up or delivery. If buyer 210 decides the goods are not in an acceptable condition, buyer 210 may decide to cancel the order in step 1045. If order is cancelled, previous payment is preferably refunded according to the policy of e-commerce system 300 in step 1050.

Alternatively, if buyer 210 accepts the goods or services, buyer 210 may offer the remaining payment, if applicable, and tender the authorization signal to verification agent 870 upon satisfactory acceptance of goods or services ordered in step 1055C. Verification agent 870 may be a telephone or other audio communication system or device allowing buyer 210 to establish a link with order verification module 363 via an audio interface, wherein buyer 210 may identify himself by entering certain credential information. Alternatively, buyer 210 may log into e-commerce platform 300 via a portable communication device, such as a smart phone with internet access, and interact with the platform to authorize the transaction. Although phones are discussed above as examples, any communication device capable of establishing a connection with order verification module 363 and allowing buyer 210 to submit order identifying information are contemplated within the scope of the invention. A non-exclusive list of such devices includes a pager, PDA, fax and portable computer.

Figure 24:
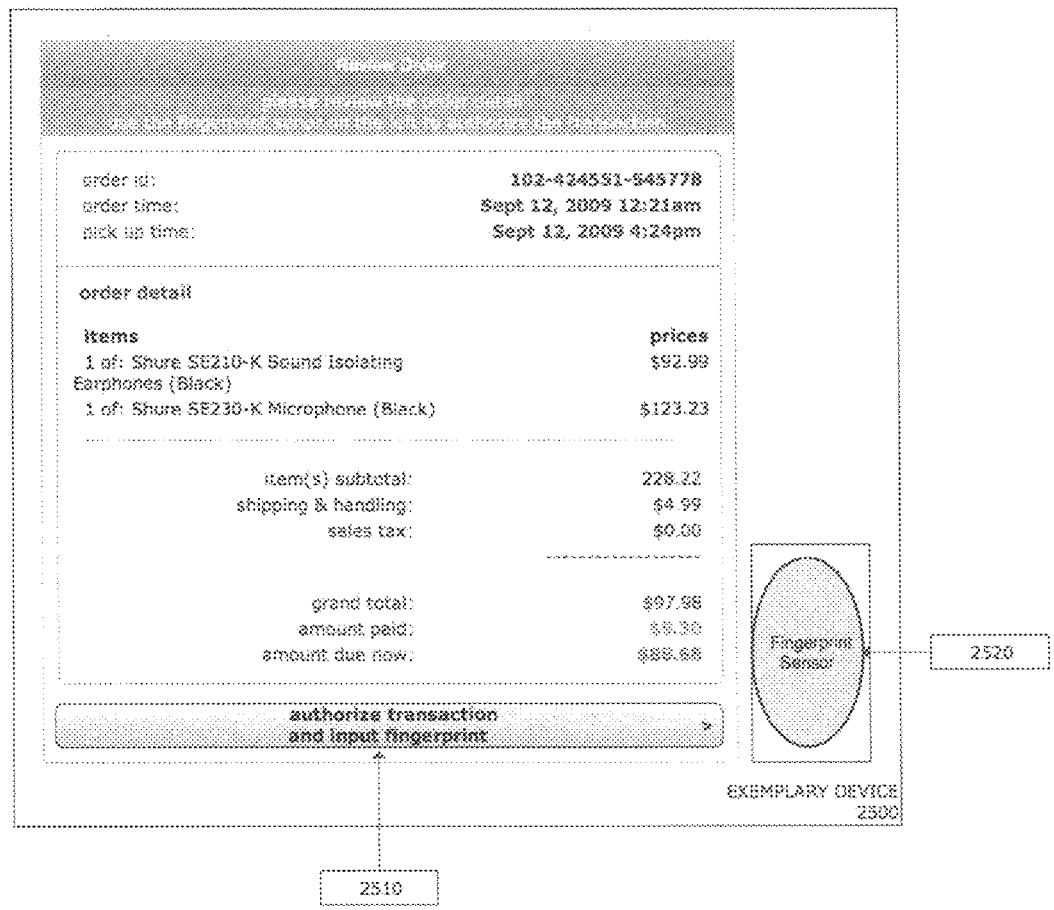
FIG. 24 is a drawing illustrating a sample device that allows the user to view the order detail through a display panel and authorize the transaction through a fingerprint sensor in accordance with the third authorization methodology of an embodiment of the present invention.

In yet another embodiment, verification agent 870 may be a display panel with an identification information input component which accepts identification information from buyer 210. A non-exclusive list of identification information input components includes a numeric key pad allowing buyer 210 to enter a numeric passcode, an alphanumeric key pad for entering an alphanumeric passcode, biometric readers for reading fingerprints, detecting voice or other biometric identifiers. An exemplary device is illustrated in FIG. 24 When this device is presented to buyer 210, buyer 210 may review the order detail through the display panel and authorize the transaction using any compatible input.

In yet another aspect of the present invention, verification agent 870 may be a smart-card reader or token reader. Upon buyer's satisfaction with the goods, buyer 210 may present the smart-card or token to the reader for authorization. Upon submission of smart-card or token information, verification agent 870 may communicate with order verification module 363 to authorize the transaction.

Upon receipt of the signal, in step 1075C, verification agent 870 may submit the signal to order verification module 363 for transaction authorization. Order verification module 363 may forward the authorization signal to identification module 930, more specifically identification manager 931. Identification manager 931 preferably compares the provided authorization signal with the previously synchronized authorization signal stored in identification information database 936.

Preferably, if the submitted signal is determined not to be valid based on the pre-determined rule, verification module 363 returns a negative result from user identification processing module and increases a counter for unsuccessful authorization by 1.

In the interest of providing security, order verification module 363 may allow only a predetermined number of attempts for requesting for authorization by verification agent 870 before authorization for the transaction is suspended. More specifically, the transaction may be suspended if the counter for unsuccessful authorization is greater than a predetermined value. The suspended order may be canceled after a predetermined period, and order verification module 363 may trigger payment sub module 366 to issue a subsequent refund to buyer 210.

The verification result is preferably sent back to order verification module 363 in step 1075B. If the provided authorization signal matches the previously synchronized signal or other acceptable predetermined value, order verification module 363 may authorize delivery agent 860 to deliver goods to buyer 210 in step 1085. Otherwise, buyer 210 may re-submit the authorization signal to verification agent 870.

Order verification module 363 may also notify payment sub module 366 to release payment available to seller 230 within a predetermined time period in step 1095. The disbursement may happen automatically or manually upon seller's request.

Authorization of Transaction Using User Identification Method

Reference is made to FIG. 24, wherein a graphical interface of an embodiment of an authorization device 2500 is shown, the device allowing the user to view order details and to authorize the transaction via a fingerprint sensor 2520. In the embodiment illustrated, authorization device 2500 includes a display panel 2510 capable of displaying information regarding the order and fingerprint sensor 2520 capable of reading the user's fingerprint when the finger is placed in contact with fingerprint sensor 2500. Upon the buyer's inspection of the goods/services, authorization device 2500 may be presented to buyer 210. If buyer 210 is satisfied with the goods/services, buyer 210 may review the order detail on display panel 2510, pay the remaining balance (if any) to delivery agent 860 and authorize the transaction using fingerprint sensor 2520.

Upon submission of the fingerprint to authorization device 2500, buyer's identification information may be submitted to order verification module 363. Order verification module 363, in turn, may delegate the verification process to identification manager 931 of user identification processing module 930. The identification information may be verified with a pre-registered fingerprint in identification information database 936. If the verification is positive, delivery agent 860 is preferably authorized to deliver the goods to buyer 210.

Figure 11:
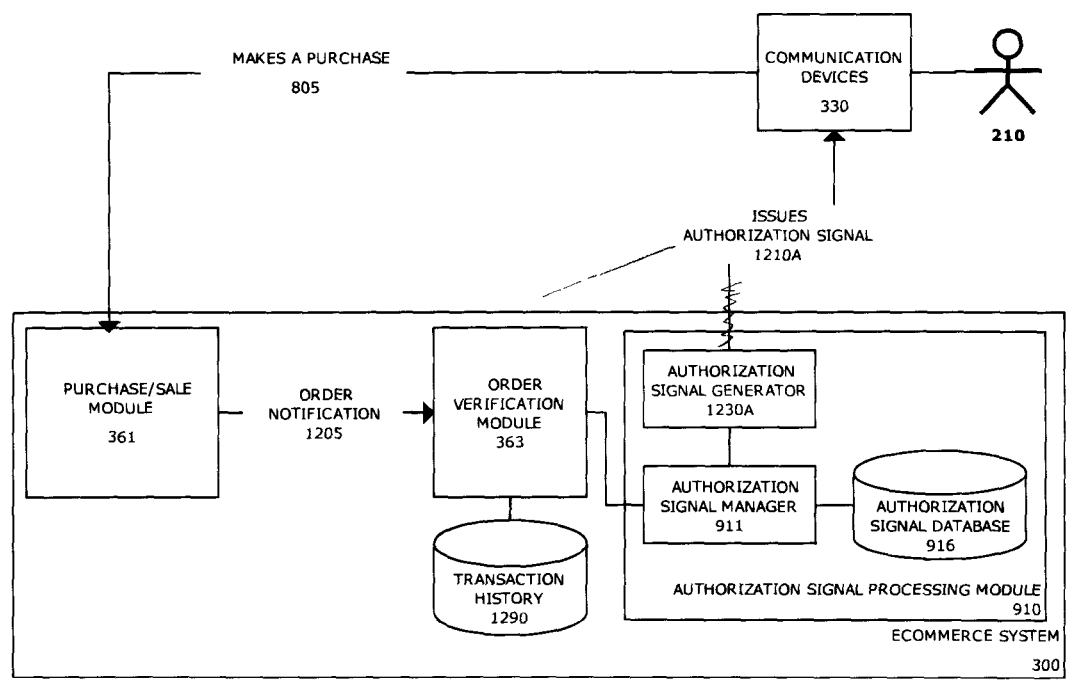
FIG. 11A is a block diagram illustrating an exemplary procedure for the authorization signal processing module to generate an authorization signal and communicate such signal to the buyer in accordance with the first authorization methodology of an embodiment of the present invention.
FIG. 11B is a block diagram illustrating an exemplary procedure for the user to generate an authorization signal and communicate such signal to the authorization signal processing module in accordance with the first authorization methodology of an embodiment of the present invention.
Figure 11B:
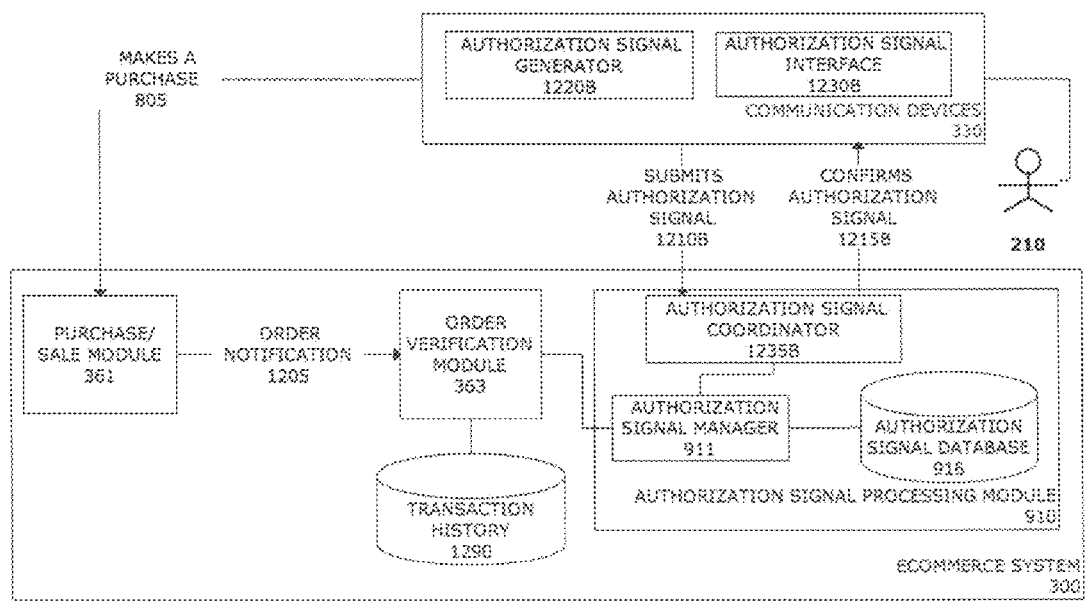

Generation of Authorization Signal Using Synchronized Authorization Signal Method There are many possible ways for generating an authorization signal. Authorization signal processing module 910 may issue an authorization signal to buyer 210, as illustrated in FIG. 11A. Alternatively, buyer 210 may randomly or arbitrarily create an authorization signal as illustrated in FIG. 11B.

In one aspect of the invention, authorization signal may be required to comply with a set of rules. For example, the authorization signal may be a collection of random or pseudo-random characters; the authorization signal may also be unique among all the authorization signals for a specific user. These rules may be enforced by authorization signal manager 911 of authorization signal processing module 910.

Buyer 210 begins by making a purchase via interaction with purchase/sale module 361. Preferably, purchase/sale module 361 notifies order verification module 363 about the purchase and order verification module 363 delegates the authorization signal synchronization process to authorization signal manager 911 of authorization signal processing module 910. Authorization signal manager 911 may use an authorization signal generator 1230A to generate an authorization signal and compare the newly generated authorization signal against all previous authorization signals in authorization signal database 916 to avoid duplications. In addition, order verification module 363 may also check previous transactions using a transaction history database 1290 directly as shown in FIG. 11A or indirectly through authorization signal processing module. Order verification module 363, either directly or indirectly via authorization signal processing module, may associate the newly generated signal with the new transaction and informs buyer 210 about this newly generated authorization signal in step 1210A.

Figure 12B:
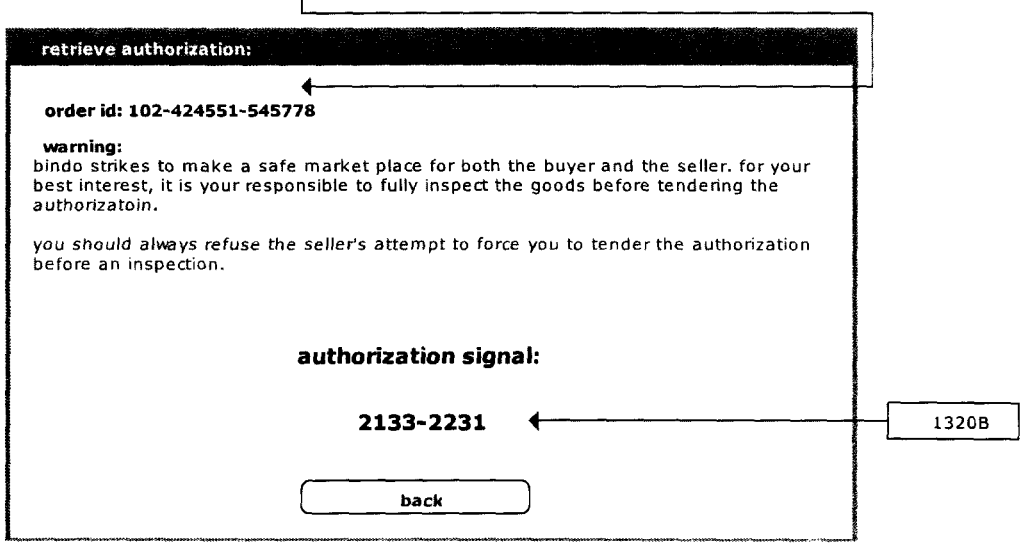
FIG. 12B illustrates an exemplary graphical user interface for displaying the authorization signal of a particular order in accordance with the first authorization methodology of an embodiment of the present invention.

Alternatively, as seen in FIG. 12B, a signal may be generated by a user regardless of the user's active participation. In one embodiment, communication device 330 includes an authorization signal generator 1220B and an authorization signal interface 1230B. Authorization signal generator 1220B may automatically generate an authorization signal without any interaction with buyer 210. Authorization signal generator 1220B may be, without limitation, software or hardware-based. It may be a stand-alone device or application, or embedded in another devices or application. For example, it may be an embedded JavaScript application in the purchase interface and executed by the browser. In another embodiment, the authorization signal may also be generated by buyer 210's manual input of a desirable authorization signal through authorization signal input interface 1230B. Preferably, as soon as an authorization signal is generated, communication device 330 submits the authorization signal to authorization signal coordinator 1235B of authorization signal processing module 910 for approval in step 1210B.

Authorization signal coordinator 1235B may check whether the submitted authorization signal complies with the rules, if any, enforced by authorization signal manager 911. In one embodiment, authorization signal coordinator 1235B directly checks transaction history database 1290 and compares the newly generated signal against all previous authorization signals in authorization signal database 916 to avoid duplication. Alternatively, authorization signal coordinator may go through order verification module 363 to access transaction history database 1290.

When the submitted authorization signal fulfills the requirements, if any, preferably authorization signal manager 911 associates the authorization signal with the transaction and confirms the authorization signal with the user in step 1215B. Otherwise, authorization signal coordinator 1235B rejects the authorization signal and requests the authorization signal to be regenerated.

Steps 1210B and 1215B preferably take place between buyer 210 and authorization signal processing module 910 to generate and synchronize an authorization signal. These steps may take place before, after, during or concurrently with order notification of step 1205. Steps 1210B and 1215B may be reiterated until an authorization signal is successfully generated.

An authorization signal may also be generated in a hybrid manner. In one embodiment, order verification module 363 may allow a predetermined number of attempts from buyer to set the authorization signal. Upon successive failure, order verification module 363 may generate an authorization signal for the buyer.

It is to be appreciated that the authorization signal may be a picture, video, text or anything that may be presented by buyer 210. Devices used by buyer 210 may be used as a substitution for the authorization signal in the aforementioned example.

Graphical User Interfaces for Using Synchronized Authorization Signal Method

FIG. 12A shows an embodiment of an interface that includes a unique order ID 1310A, a retrieve authorization signal button 1320A, a request cancellation button 1330A, and a confirm delivery button 1340A. Buyer 210 may identify the order by order ID 1310A and retrieve its authorization signal by pressing retrieve authorization signal button 1320A. Buyer 210 may also request cancellation of the order by pressing request cancellation button 1330A and confirm the delivery of the order by pressing confirm delivery button 1340A.

Preferably, after buyer 210 presses retrieve authorization signal button 1320A, buyer 210 is brought to another interface shown in FIG. 12B, which illustrates a system message showing an order ID 1310B and an authorization signal 1320B. Although an 8-digit code is shown as the authorization signal in the example shown, authorization signal 1320B may be any signal, preferably a transferable signal that may be sent to the server for verification. The interface shown in FIG. 12B may also include a message reminding buyer 210 to do a complete inspection and warning the implication of offering the authorization signal to seller 230.

Figure 13:
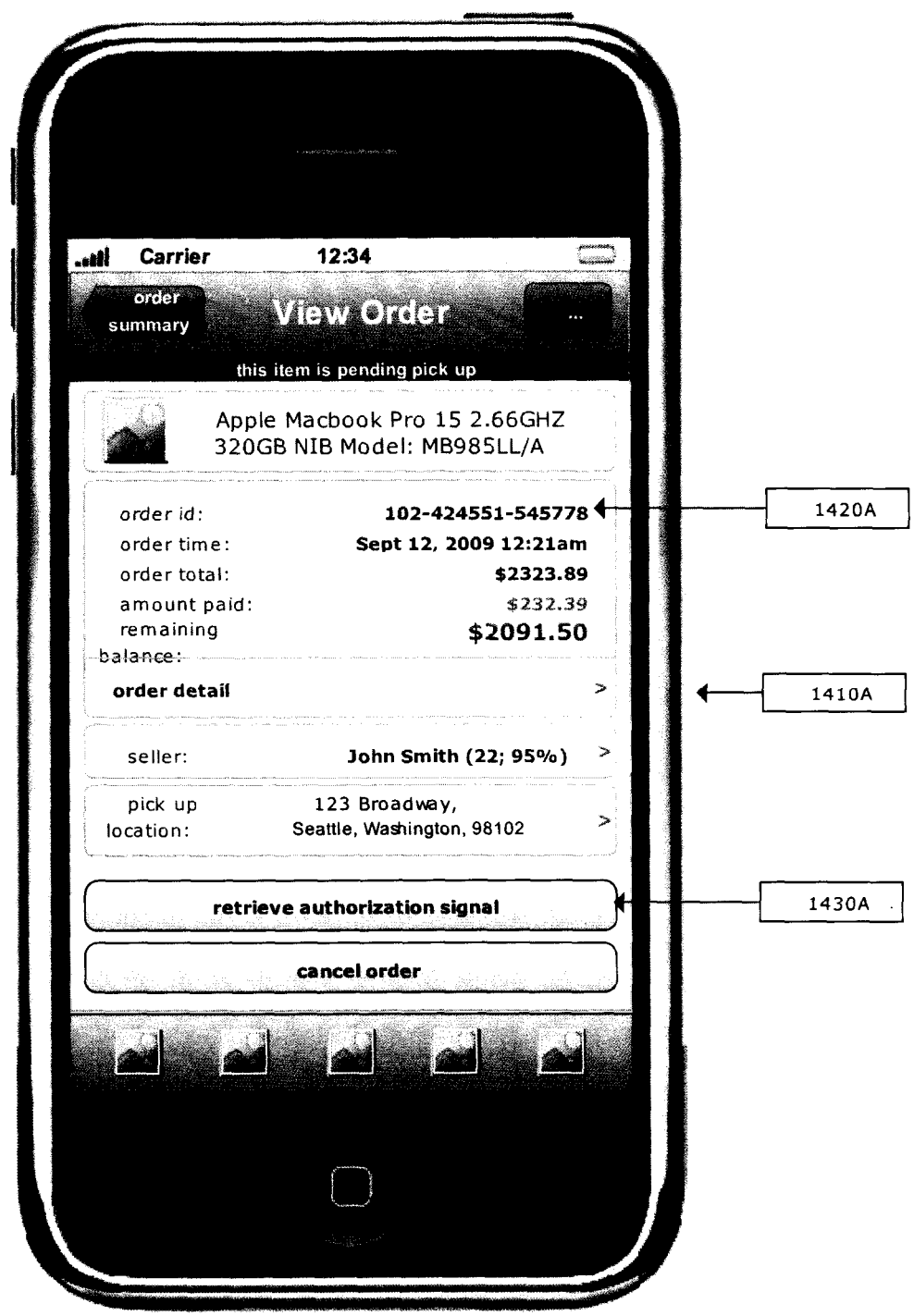
FIG. 13A illustrates an exemplary graphical user interface for retrieving an authorization signal on a portable device 1310A in accordance with the first authorization methodology of an embodiment of the present invention.
FIG. 13B illustrates an exemplary graphical user interface for displaying the authorization signal of an order in accordance with the first authorization methodology of the preferred embodiment of the present invention.
Figure 13:
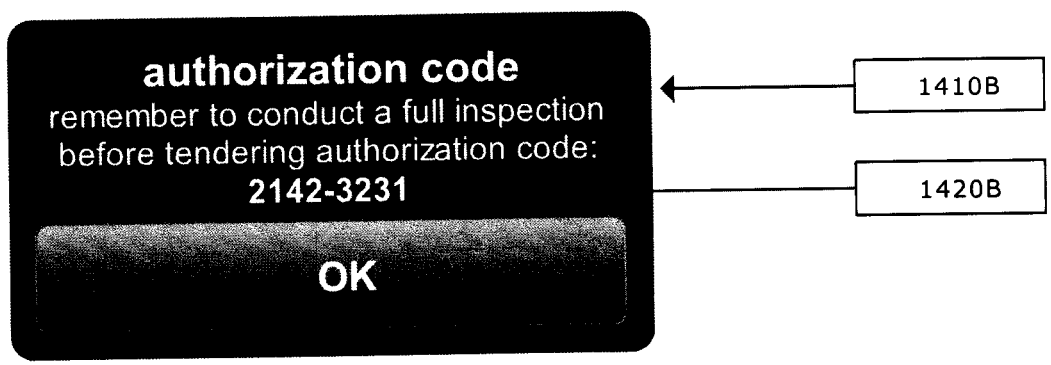

FIG. 13A illustrates yet another an exemplary graphical user interface for retrieving an authorization signal on portable device 1410A in accordance with the first authorization methodology of generating an authorizing signal of the preferred embodiment of the present invention. As illustrated, buyer 210 may identify the order by its unique order ID 1420A and retrieve its authorization signal by pressing retrieve authorization signal button 1430A. After buyer 210 presses retrieve authorization signal button 1430A, a dialog box 1410B as illustrated in FIG. 14B may be presented to buyer 210. Authorization may be presented in a simple dialog box, such as dialog box 1410B or in other forms.

Dialog box 1410B may display an authorization signal 1420B. Although an 8-digit code is shown as the authorization signal in the example shown, authorization signal 1420B may be any signal, preferably transferable to the server for verification. In addition, dialog box 1410B may warn buyer 210 the implication of offering the authorization signal and remind buyer 210 to do a complete inspection.

Figure 14A:
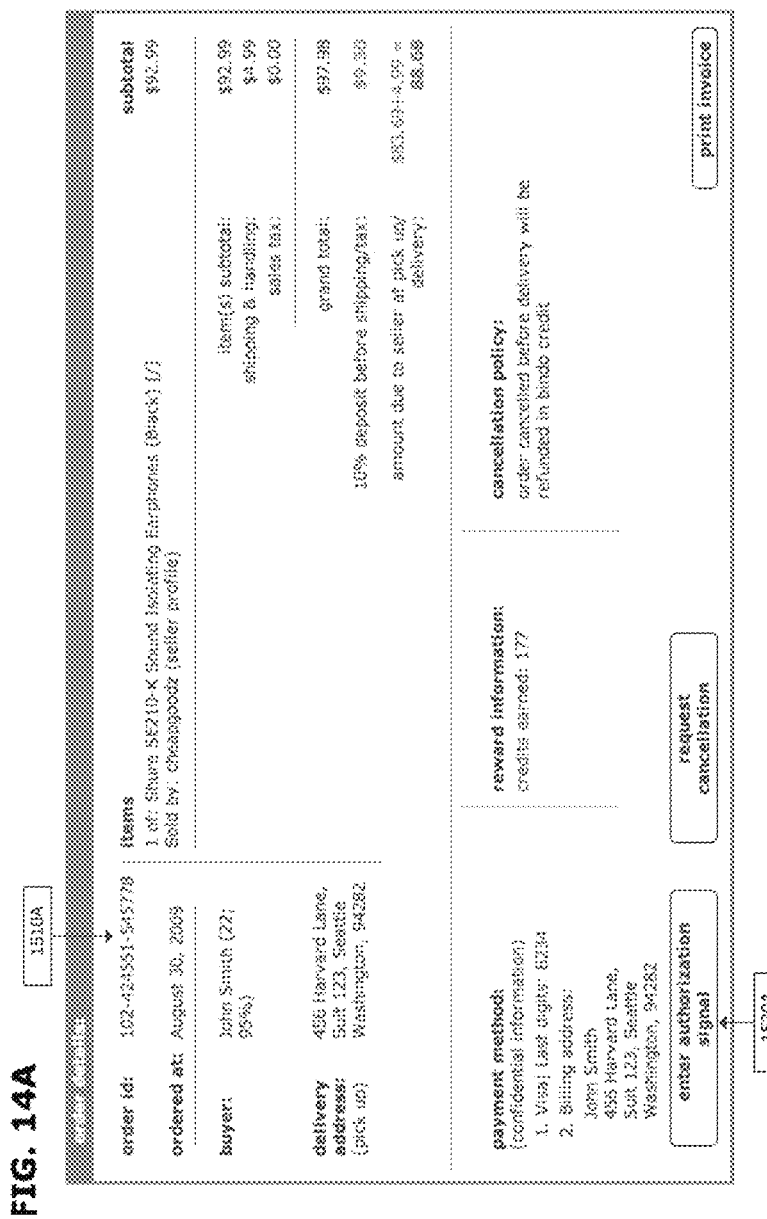
FIG. 14A illustrates an exemplary graphical user interface presenting order information and a button that allows seller to enter authorization signal in accordance with the first authorization methodology of an embodiment of the present invention.
Figure 14B:
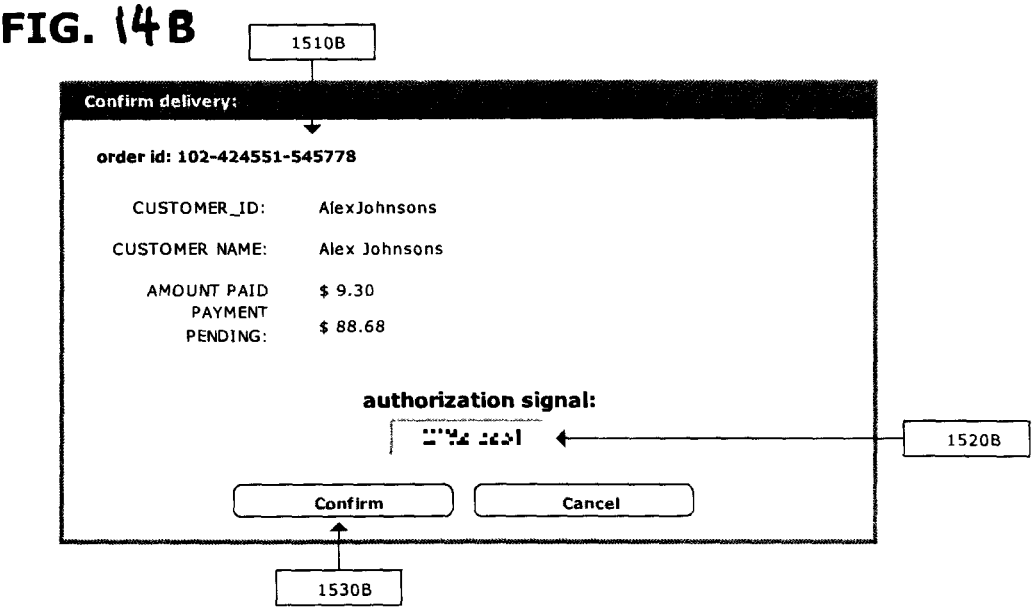
FIG. 14B illustrates an exemplary graphical user interface with an input for authorization signal in accordance with the first authorization methodology of an embodiment of the present invention.

Yet another exemplary graphical user interface is illustrated in FIG. 14A. Seller 230 may identify the order by its unique order ID 1510A and enter its authorization signal by pressing enter authorization signal button 1520A. After buyer 210 presses enter authorization signal button 1520A in FIG. 14A, seller 230 is preferably brought to another interface illustrated in FIG. 14B, which shows order ID 1510B and text box 1520B for entering authorization signal.

It is to be appreciated that although the exemplary interfaces illustrated in FIGS. 14A and 14B are geared toward seller 230, detailed sensitive information may be trimmed down so that special user 310, such as delivery agent 860 and the like, may use a similar interface to input authorization on behalf of seller 230 or track the status of the order. In addition, although an 8-digit code is shown as the authorization signal in the examples illustrated, the authorization signal can be any signal preferably transferable to the server for verification.

Figure 15:
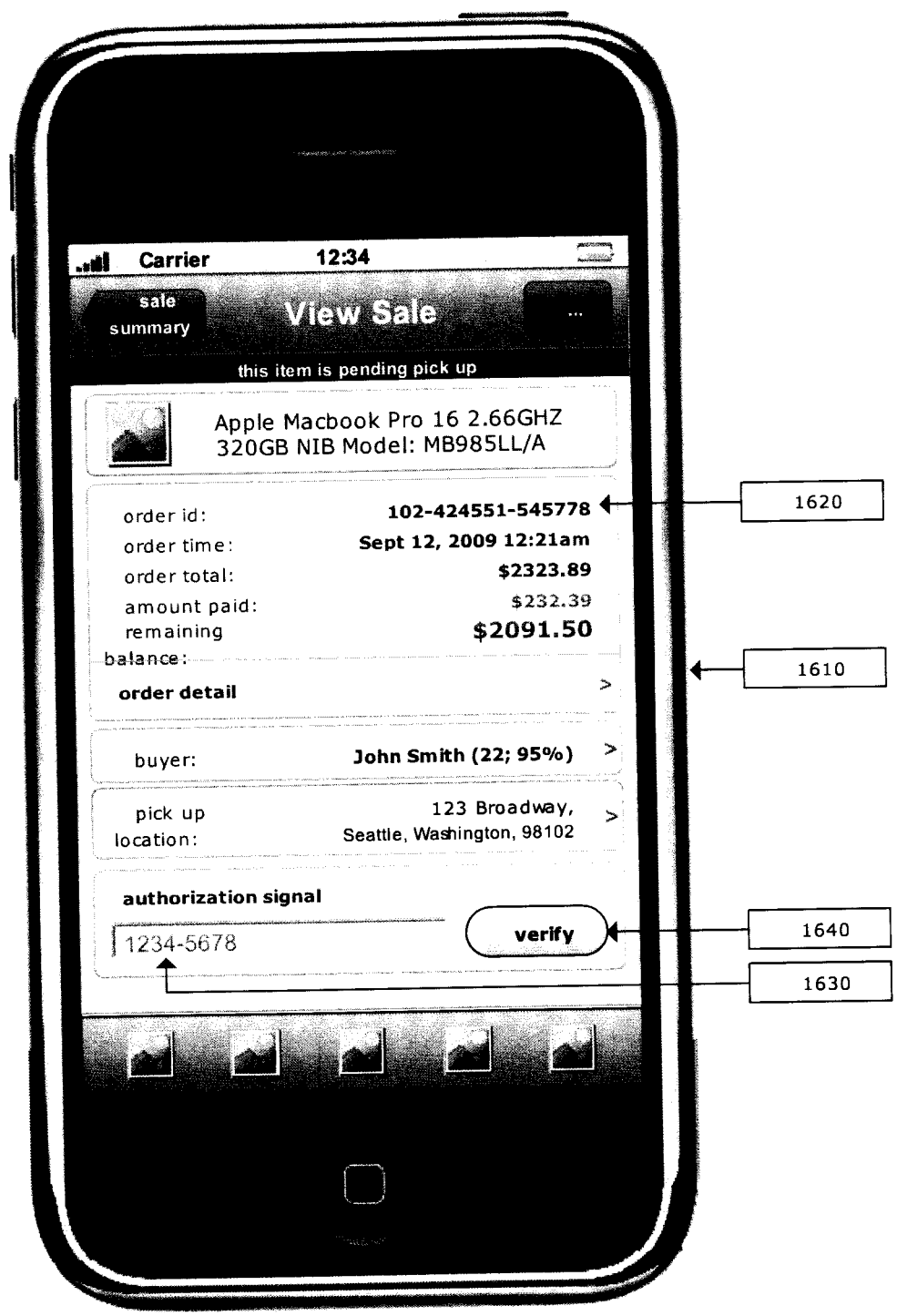
FIG. 15 illustrates an exemplary graphical user interface with an input for authorization signal on a portable device in accordance with the first authorization methodology of an embodiment of the present invention.
Figure 16:
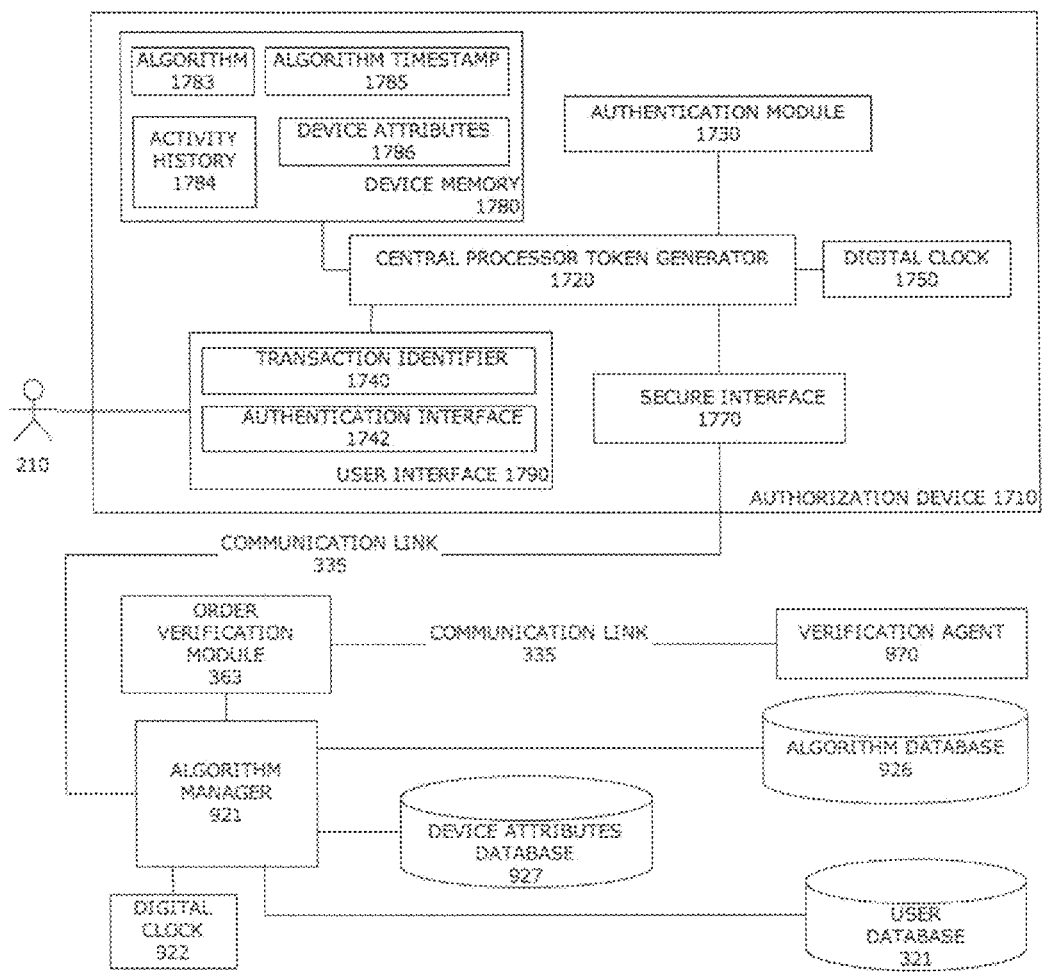
FIG. 16 is a block diagram illustrating an exemplary implementation of an authorization device that generates an authorization signal at real time without communication with the e-commerce platform in accordance with the second authorization methodology of an embodiment of the present invention.

FIG. 15 shows an exemplary interface for displaying order information and entering the authorization signal. As illustrated, seller 230 may identify the order by a unique order ID 1620, enter the authorization signal in a text box 1630 and submit the authorization signal by pressing a verify button 1640. It is to be appreciated that although the exemplary interface illustrated in FIG. 16 is geared toward seller 230, detailed sensitive information may be trimmed down so that special user 310, such as delivery agent 860 and the like, may use a similar interface to input authorization on behalf of seller 230 or track the status of the order. In addition, although an 8-digit code is shown as the authorization signal in the example illustrated, the authorization signal can be any signal preferably transferable to the server for verification.

Generation of Authorization Signal Using an Authorization Device

In accordance with the embodiment of the invention illustrated in FIG. 16, authorization device 1710 generates an authorization signal in real time without communication with ecommerce platform 300 in accordance with the second authorization methodology of the present invention described above. Authorization device 1710 may include a user interface 1790, an authentication module 1730, a digital clock 1750, a device memory 1780, a secure interface 1770 and a central processor 1720. Preferably, user interface 1790 further includes a transaction identifier 1740, which allows buyer 210 to choose the desired transaction for authorization, and an authentication interface 1742, which allows buyer 210 to authenticate himself.

The embodiment of authentication module 1730 as illustrated is an optional module that adds another layer of security to prevent unauthorized use of authorization device 1710. Buyer 210 may present his credential to authorization device 1710 via authentication interface 1742. The credentials may then be passed to authentication module 1730 for authentication. The credentials may be a password or biometrics such as fingerprint and voice. In accordance with an exemplary embodiment, buyer 210 is granted the authority to use authorization device 1710 if and only if authentication module 1730 validates the credentials presented.

Digital clock 1750 is preferably an internal timing device that allows other parts of the device to retrieve the current time or a value related to the current time.

Preferably, device memory 1780 is a central storage that contains information useful for authorization signal generation, diagnosis or other purposes. In one aspect of the present invention, device memory 1780 includes an algorithm 1783, an algorithm timestamp 1785, an activity history 1784 and other device attributes 1786 such as a device serial number.

Secure interface 1770 may be responsible for establishing a communication link 335 between central processor 1710 and algorithm manager 921. Preferably, algorithm manager 921 manages algorithms associated with each authorization device 1710 and is capable of generating the correct authorization signal independently to validate authorization signals from buyers 210. In accordance with an embodiment of the present invention, authorization device 1710 communicates with algorithm manager 921 and exchanges sensitive information such as algorithm, activity history and other information.

Preferably, upon successful authentication with the authentication module 1730, central processor 1720 proceeds to collect the transaction number and processes buyer 210's request to generate an authorization signal. Central processor 1720 preferably retrieves algorithm 1783 from device memory 1780 and other necessary parameters, which may or may not reside in device memory 1780, to generate the official authorization for comparison. In one embodiment, central processor 1720 collects the transaction number from the user, the current time from digital clock 1750, device attributes 1786 from device memory 1780 and other information that is known to algorithm manager 921. Central processor 1720 may then generate an authorization signal based on these attributes and certain rule of transformation. It is to be appreciated that the parameters may be removed or added to alter the security level of the device.

Although authorization device 1710 has been illustrated with respect to a particular sample module organization and architecture, it is to be appreciated that various module organization and/or architecture suitable for carrying out the present disclosure may be employed and are intended to fall within the scope of the hereto-appended claims. It is to be appreciated that different components of the present implementation may be regrouped, and the order of the steps may be varied to achieve the same purpose without deviating from the scope of the invention. It is also to be appreciated that the authorization device can be implemented, by non-limiting example, with hardware, software or any combination of software and hardware.

In one embodiment of the present invention, algorithm manager 921 is connected to algorithm database 926, device attributes database 927 as well as user database 321. Algorithm manager 921 preferably keeps track of the ownership of each authorization device, device algorithm, as well as all the attributes for the authorization signal generation. Therefore, algorithm manager 921 is preferably capable of generating the authorization signals independently and validating the provided token against the official ones.

Furthermore, order verification module 363 may be connected to algorithm manager 921. When order verification module 363 receives a token for validation, order verification module 363 may delegate this task to algorithm manager 921. Upon validation, algorithm manager 921 may return the result to order verification module 363.

Activation and Updating the Authorization Device

Figure 17:
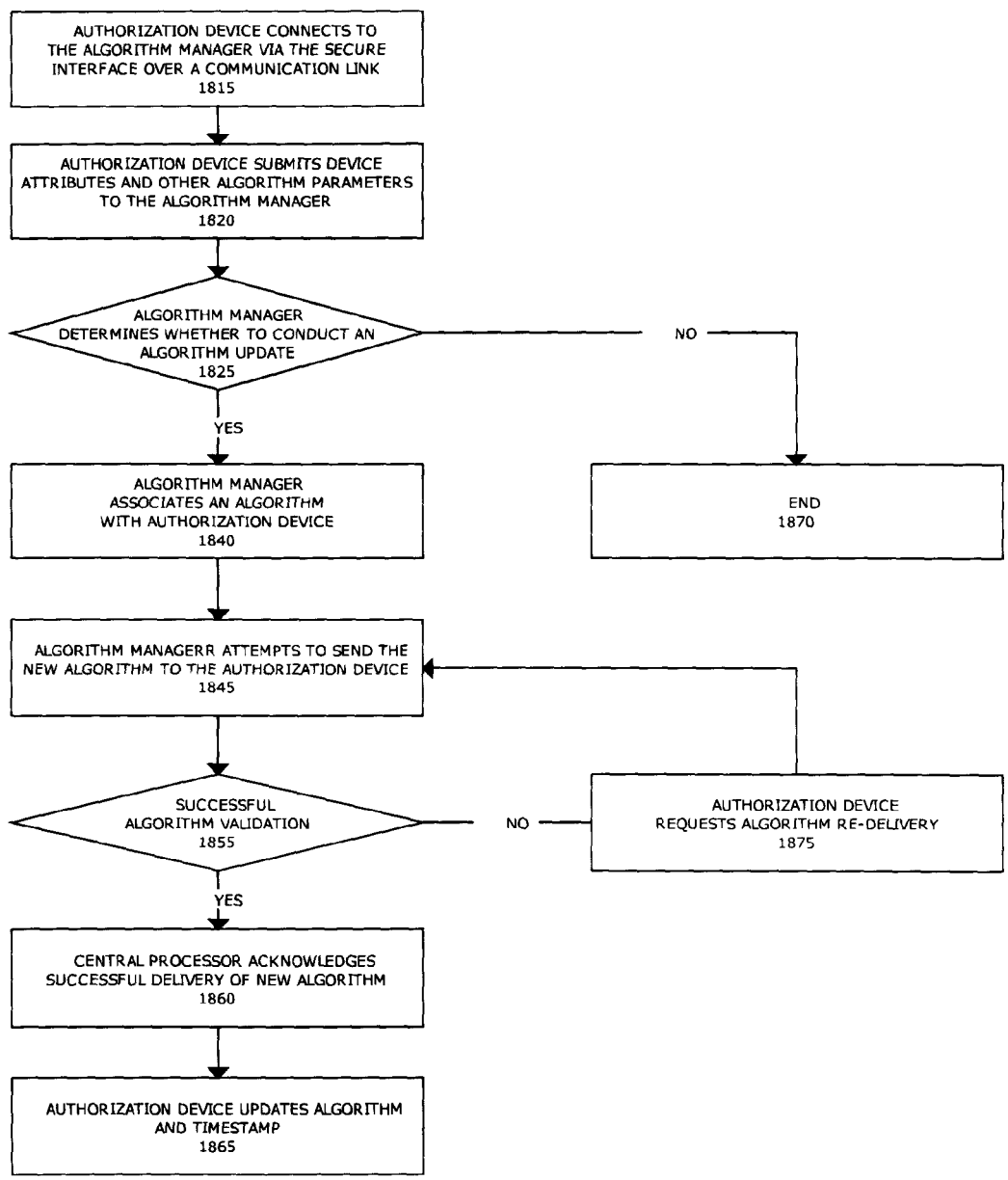
FIG. 17 is a flowchart illustrating an exemplary procedure of activating and updating the authorization device in accordance with the second authorization methodology of an embodiment of the present invention.

In accordance with the embodiment shown in FIG. 17, in step 1815, authorization device 1710 connects to algorithm manager 921 via the secure interface over communication links 335. Authorization device 1710 may be connected to algorithm manager 921 manually or automatically. Communication link 335 may be any medium that allows direct or indirect communication between authorization device 1710 and algorithm manager 921.

In step 1820, authorization device 1710 may submit device attributes and other algorithm parameters to the algorithm manger. Information transmitted may include device information such as device attributes 1786, digital clock time, activity history and any other information. Some of this information may be useful to the authorization signal generation process while some may be used for future diagnosis and research. This step may be conducted the first time authorization device 1710 is connected to algorithm manager 921 and periodically thereafter.

In step 1825, algorithm manager 921 preferably makes a determination whether to conduct an algorithm update based on the information receive, such as timestamps and activity history of the device memory, from authorization device 1710. Algorithm manager 921 may automatically check authorization device 1710 when it is connected and conduct an update periodically at a predetermined time interval. If algorithm manager 921 decides to conduct an algorithm update, the routine may proceed to step 1840. Otherwise, the routine may proceed to the step 1870, which may end the entire procedure.

In accordance with the embodiment illustrated, in step 1840, algorithm manager 921 selects an algorithm from a pool of algorithms and associates authorization device 1710 with the selected algorithm. Alternatively, algorithm manager 921 may also dynamically create a new algorithm for authorization device 1710. In step 1845, algorithm manager 921 may send the new algorithm to authorization device 1710. In step 1855, central processor 1720 may test the integrity of the algorithm received by authorization device 1710 from algorithm manager 921. For example, check sum verifications, such as Message-Digest Algorithm, a widely used cryptographic hash function, may be conducted to determine if the entire algorithm is received without any error. Preferably, upon successful algorithm validation by central processor 1720, the routine proceeds to step 1860 where central processor 1720 acknowledges successful algorithm delivery by sending a message to algorithm manager 921. Upon validation failure in step 1855, the routine may proceed to step 1875 where authorization device 1710 may request algorithm redelivery from algorithm manager 921 and the algorithm delivery procedure may start over. In step 1865, authorization device 1710 updates authorization device 1710 with new algorithm 1783 and algorithm timestamp 1785.

Generation of Authorization Signal

Figure 20A:
FIG. 20A illustrates an exemplary graphical user interface for user authentication on an authorization device implemented on a portable device in accordance with the second authorization methodology of an embodiment of the present invention.

Authorization device 1710 may require a user to authenticate oneself before using authorization device 1710. As illustrated in step 1915, buyer 210 may verify his identity with his authorization device 1710 by providing his credential to authorization device 1710, wherein the credential may include a password or a biometric sample, such as a fingerprint. Such authentication may be done through the graphical interface shown in FIG. 20A, wherein boxes 2110A allow the user to enter his passcode, and an enter button 2120A, for submission of such passcode. It is to be appreciated that although the passcode authentication is illustrated as an example, there are many other authentication methods that may be used without deviating from the scope of the invention.

Figure 18:
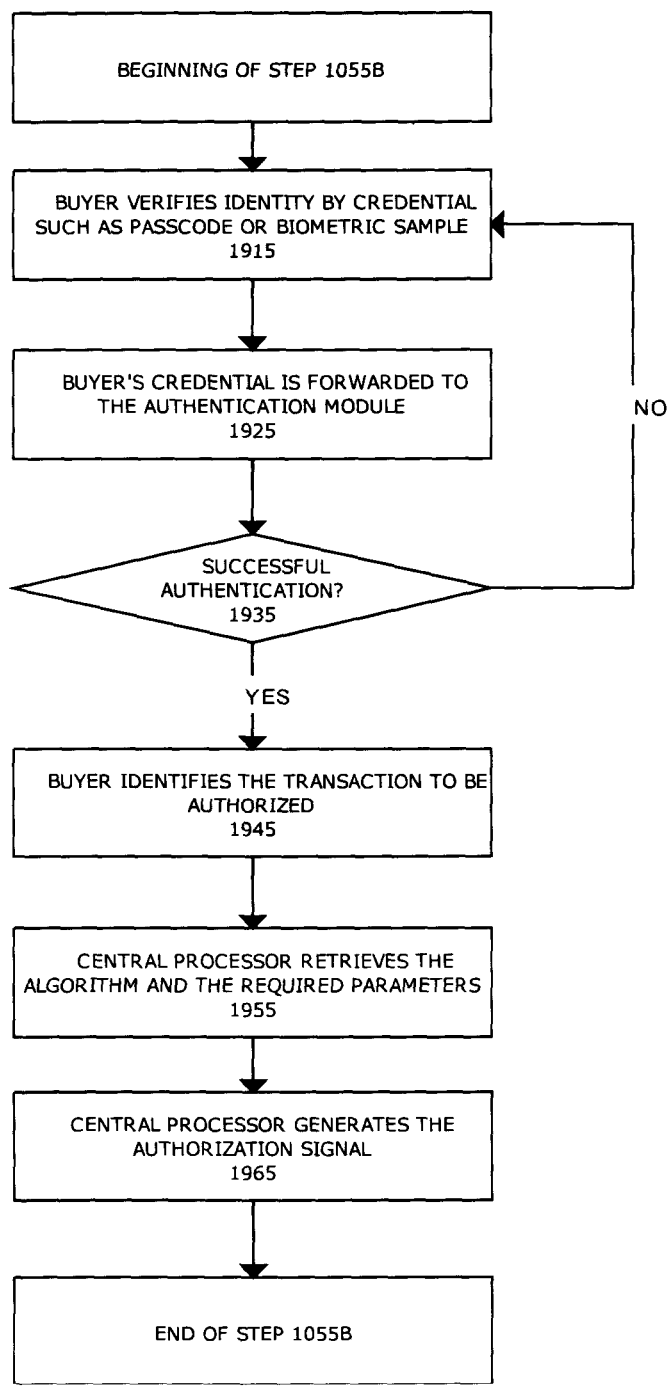
FIG. 18 is a flowchart illustrating how an authorization signal is generated on an authorization device in accordance with the second authorization methodology of an embodiment of the present invention.

The provided credential is preferably forwarded to authentication module 1730 for verification. If authentication fails, the routine may proceed back to step 1915 where buyer 210 may re-enter the credential. In accordance with an embodiment of the present invention, a limit on the number of attempts may be enforced to reduce false authentication due to numerous attempt. If authentication succeeds, the routine may proceed to step 1945 illustrated in FIG. 18.

In step 1945, buyer 210 may specify a transaction to authorize. Buyer 210 may choose the desired transaction among other existing transactions or manually enter a transaction number. It is to be appreciated that this step may be optional if transaction information is not a parameter to the authorization algorithm.

Figure 20B:
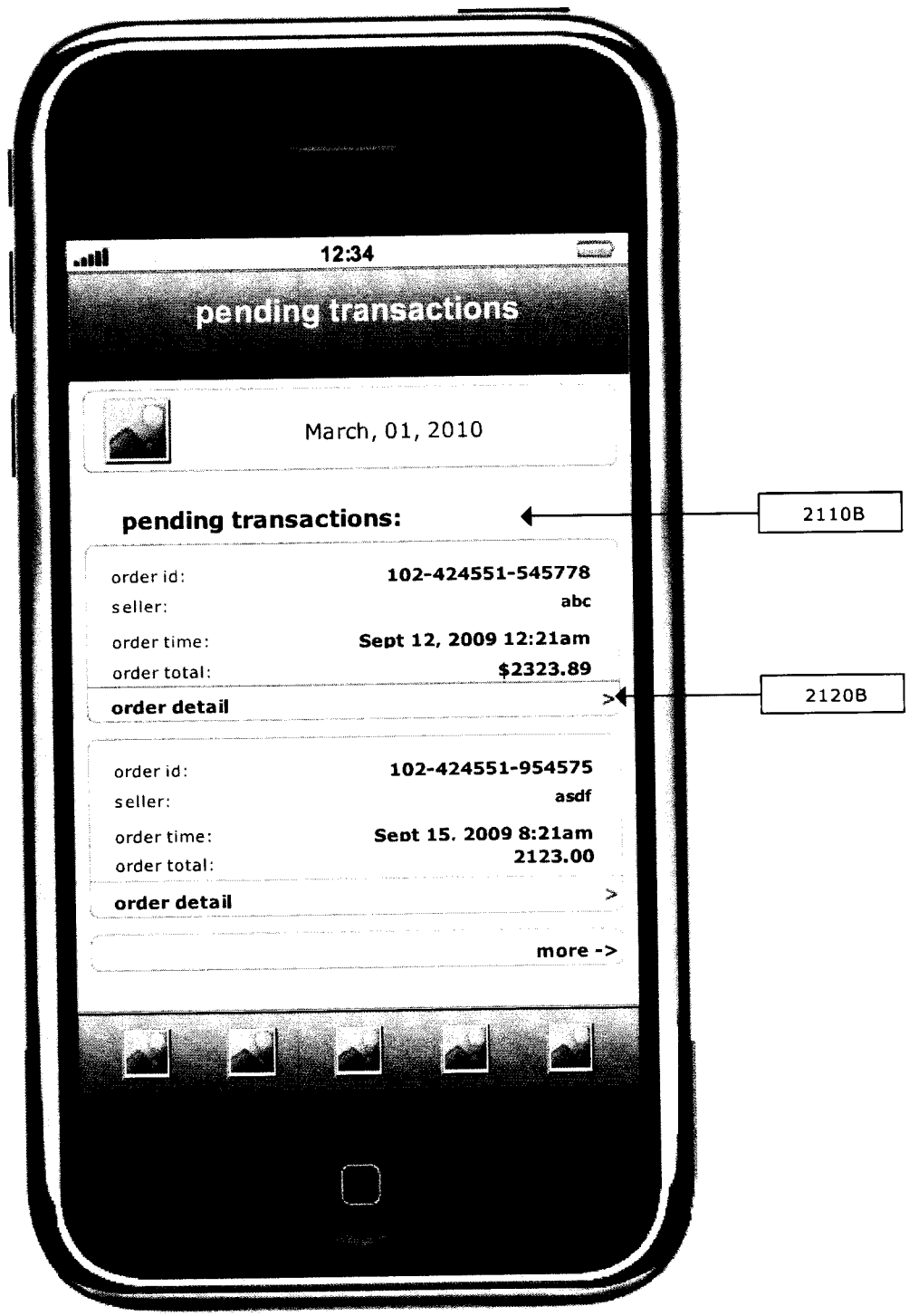
FIG. 20B illustrates an exemplary graphical user interface for the user to identify the desired transaction on an authorization device implemented on a portable device in accordance with the second authorization methodology of an embodiment of the present invention.

An example of a user interface for user's identification of the desired transaction is shown in FIG. 20B. As illustrated, buyer 210 may choose the desired transaction from a list of pending transactions 2110B. An item 2120B within list of pending transactions 2110B may be a link allowing buyer 210 to retrieve more information about the transaction and/or execute different actions on the transaction. Pressing button 2120B may direct the user to FIG. 20C where buyer 210 may further request the authorization signal corresponding to the transaction.

Figure 21A:
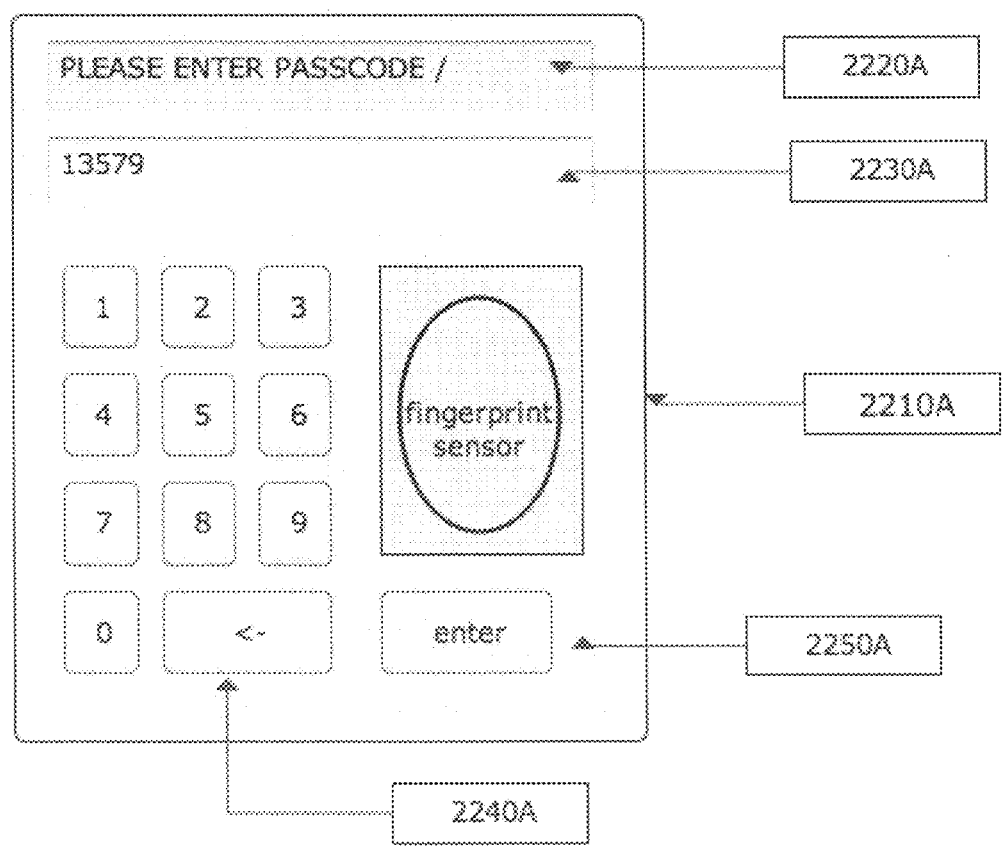
FIG. 21A shows a sample stand-alone authorization device and an user authentication interface in accordance with the second authorization methodology of an embodiment of the present invention.

Another example of the authentication interface is shown in FIG. 21A, including a displaying area 2220A with instruction directing user to either to enter a numeric passcode or fingerprint for authentication, a display showing the values that the user has entered 2230A, a backspace button 2240A allowing the user to delete the value entered previously, and an enter button 2250A leading authorization device to proceed to the next step.

Figure 21B:
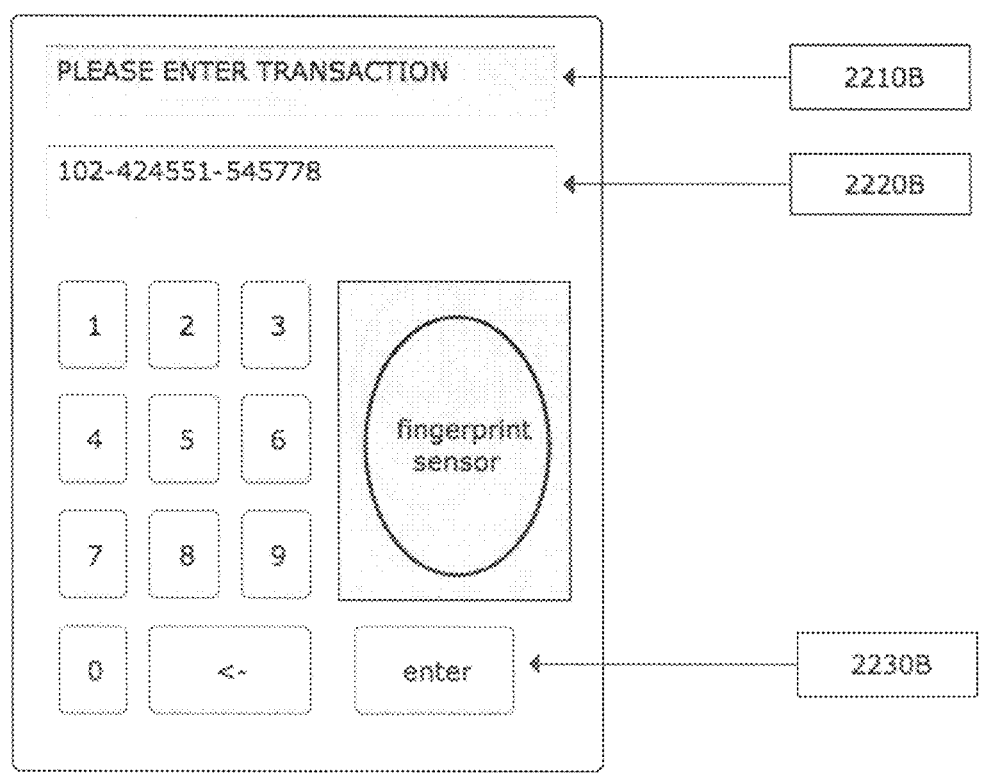
FIG. 21B shows a sample stand-alone authorization device and a transaction identification interface in accordance with the second authorization methodology of an embodiment of the present invention.

FIG. 21B shows yet another example of the transaction identification interface having a display 2210B, instructing buyer 210 to enter the transaction number, a display 2220B showing the values that the user has entered and an enter button 2230B that instructs the authorization device to proceed to the next step.

Preferably, once buyer 210 identifies the transaction to be authorized, central processor 1720 retrieves stored algorithm 1783, device attributes 1786 and other information, if any, (such as time from digital clock 1750) required for authorization signal generation. Based on the algorithm and parameters retrieved in step 1955, central processor 1720 may generate an authorization signal.

Figure 20C:
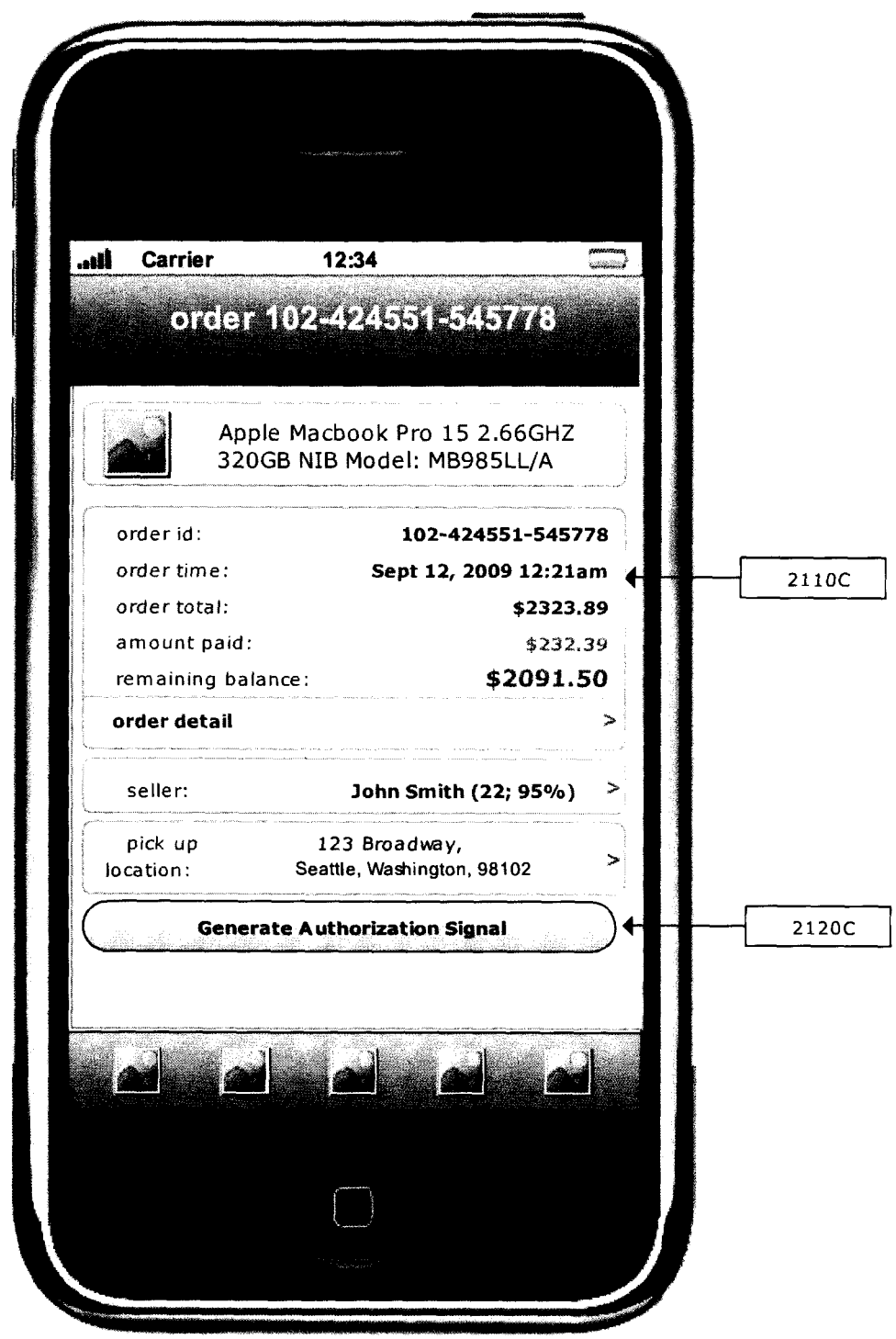
FIG. 20C illustrates an exemplary graphical user interface for the user to generate an authorization signal on an authorization device implemented on a portable device in accordance with the second authorization methodology of an embodiment of the present invention.
Figure 20D:
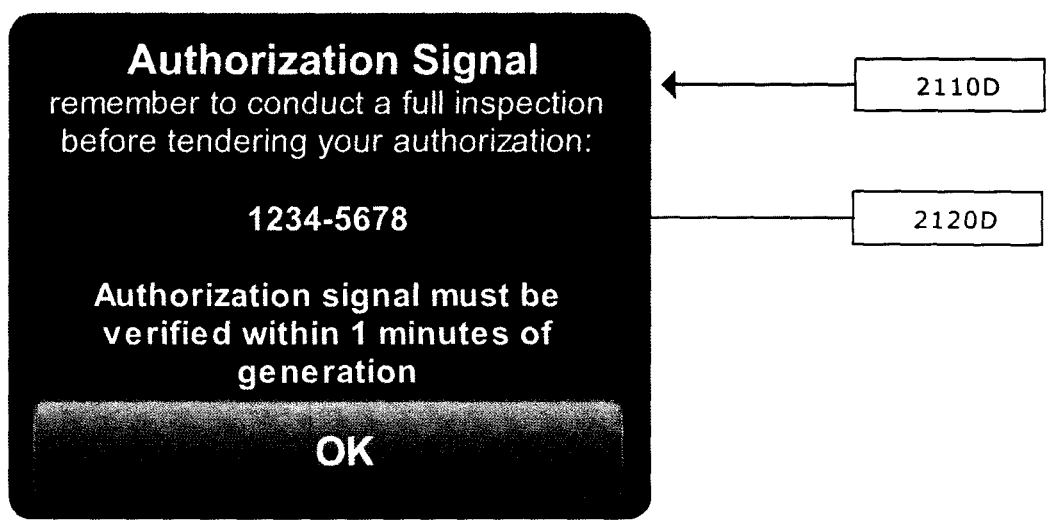
FIG. 20D illustrates an exemplary graphical user interface showing an authorization signal on an authorization device implemented on a portable device in accordance with the second authorization methodology of an embodiment of the present invention.

FIG. 20C is an exemplary graphical interface that includes an order summary area 2110C and a generate authorization signal button 2120C. By pressing generate authorization signal button 2120C, buyer 210 may generate an authorization signal specific to this transaction, leading the user to a dialog box 2110D as shown in FIG. 20D. Dialog box 2110D may remind buyer 210 to conduct an inspection before tendering the authorization. 2120D may also show a code that represents the authorization signal. Although an 8-digit code is shown as the authorization signal in the example illustrated, the authorization signal may be any signal, preferably transferable to the server for verification.

Figure 21C:
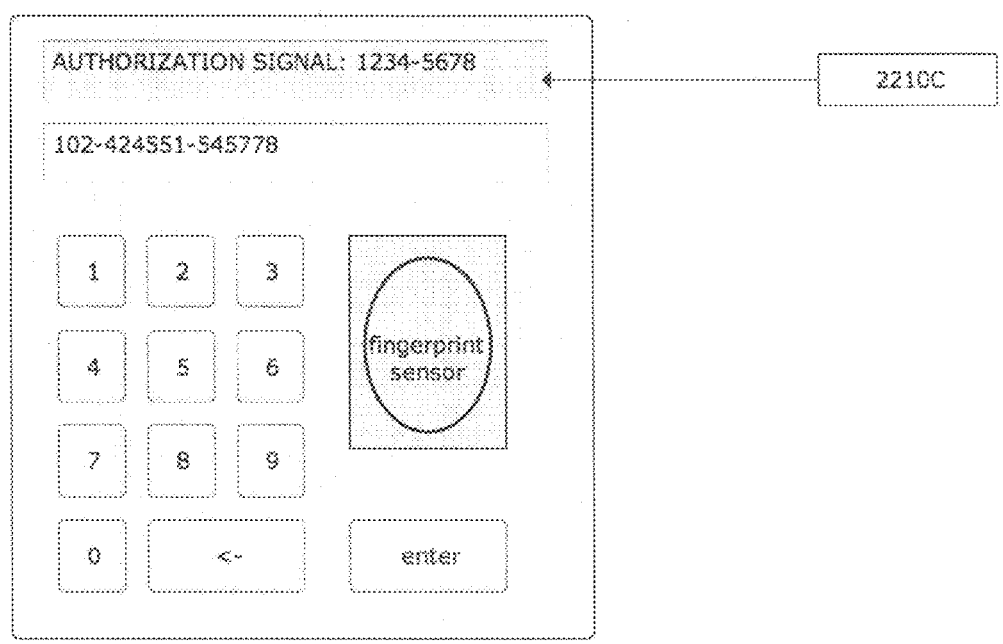
FIG. 21C shows a sample stand-alone authorization device and an interface that output an authorization signal in accordance with the second authorization methodology of an embodiment of the present invention.

FIG. 21C shows yet another interface that outputs an authorization signal. The interface may include a display 2210C showing a code that represents the authorization signal. In addition, although an 8-digit code is shown as the authorization signal in the example illustrated, the authorization signal can be anything transferable to the server for verification.

Verification of an Authorization Signal by an Authorization Device 1710

Figure 19:
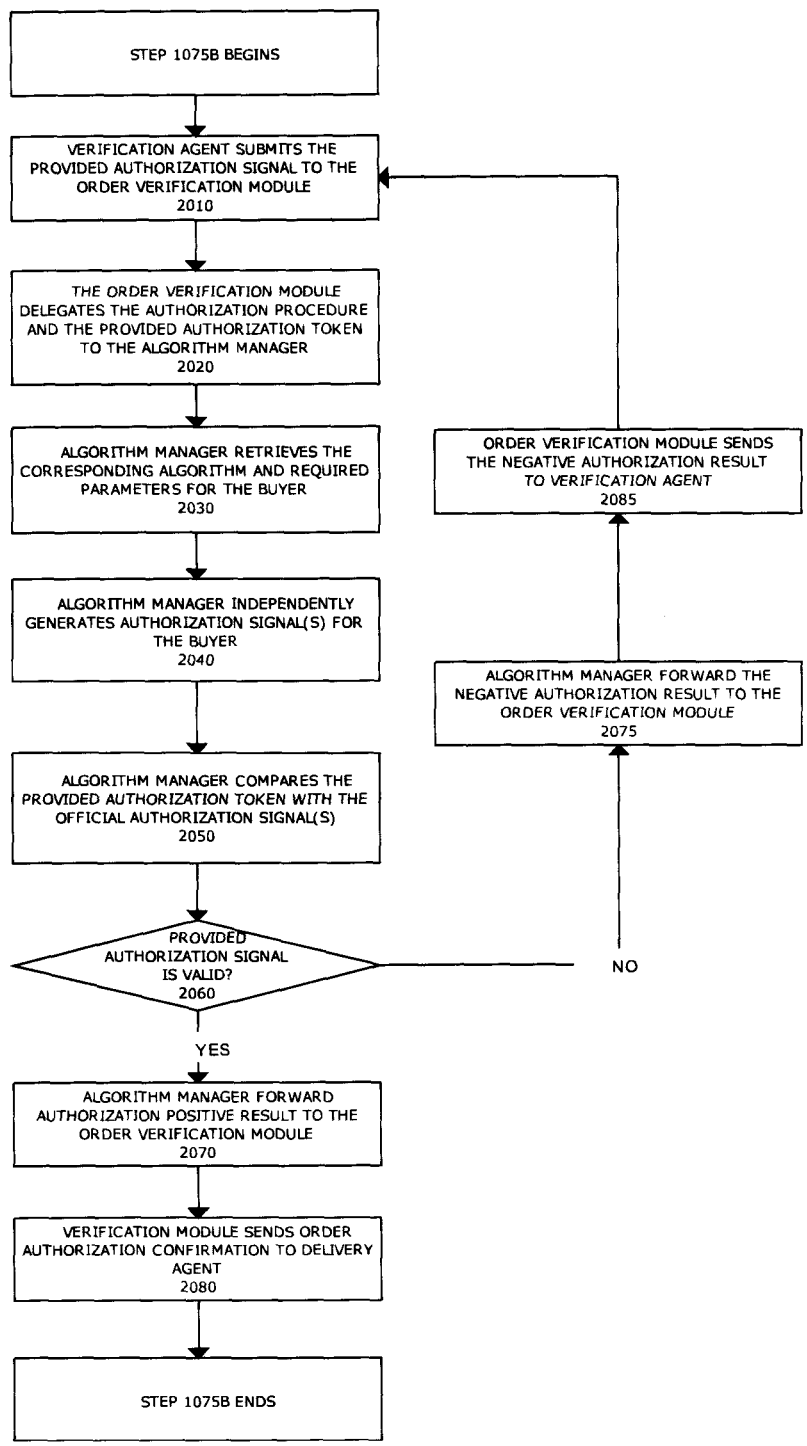
FIG. 19 is a flowchart illustrating how an authorization signal generated by an authorization device is verified in accordance with the second authorization methodology of an embodiment of the present invention.

In accordance with the embodiment shown in FIG. 19, in step 2010, verification agent 870 receives an authorization signal for a specific transaction from buyer 210 and submits the authorization signal to order verification module 363. Preferably, order verification module 363 delegates the authorization procedure and the authorization signal to algorithm manager 921, which retrieves the current algorithm from algorithm database 926 and collects other parameters from device attributes database 927, digital clock 922 and other source. These parameters may include the transaction number, certain device attributes as well as a value related to the clock reading. In step 2040, algorithm manager 921 may generate one or more correct authorization signals specific to the transaction pending buyer's authorization based on the information collected and compare them to the authorization signal provided by buyer 210. If the authorization signal fails to verify positively, the route may proceed to step 2075, wherein. In step 2075, algorithm manager 921 may forward the negative authorization result to the order verification module 363. In step 2085, order verification module 363 preferably sends the negative authorization result to verification agent 870, which in turn takes buyer 210 back to step 2010.

Alternatively, if the authorization signal is valid, the routine may proceed to step 2070, where algorithm manager 921 forwards the positive authorization result to order verification module 363. In step 2080, order verification module 363 preferably authorizes the transaction and notifies verification agent 870 for order authorization.

Graphical Interfaces for Sellers

Figure 22A:
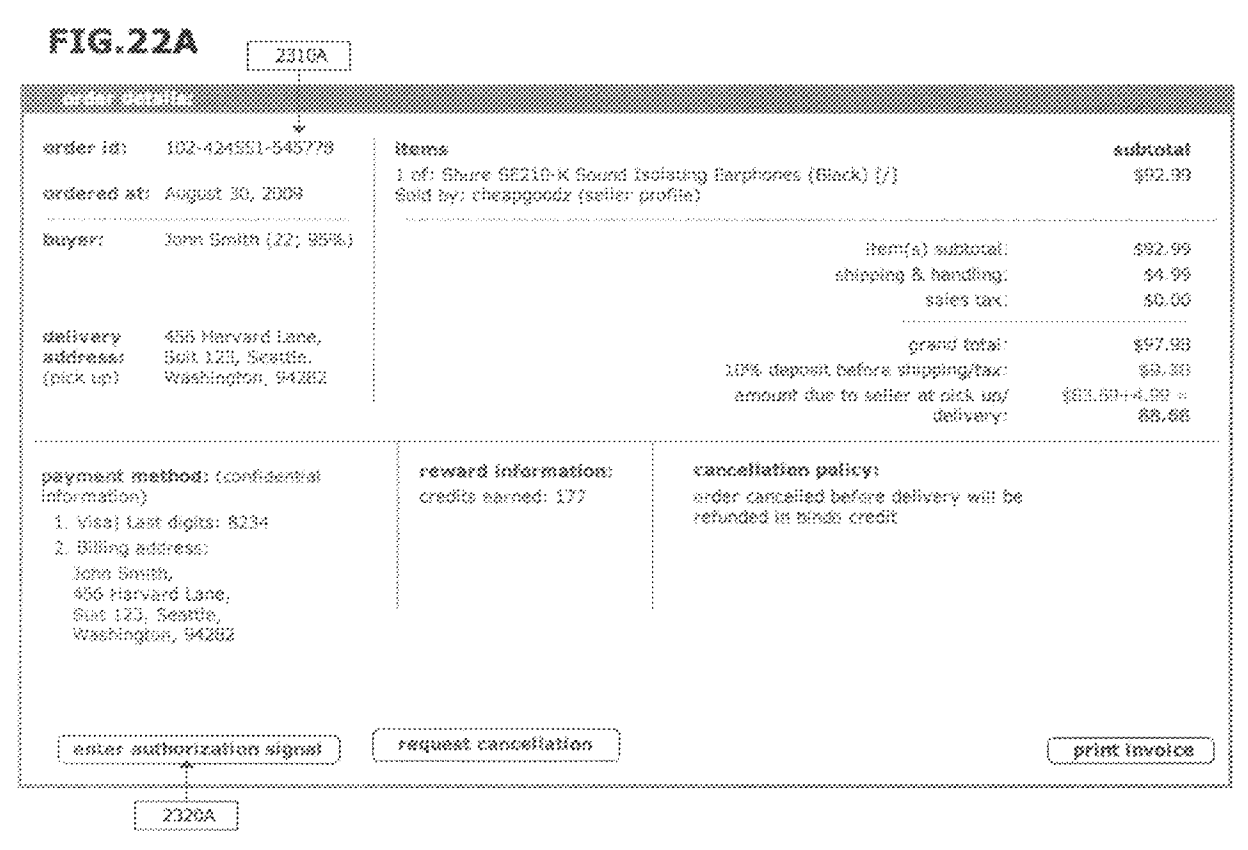

FIG. 22A shows an exemplary graphical user interface showing order information and a button that triggers the input of an authorization signal in accordance with the second authorization methodology of the preferred embodiment of the present invention. As illustrated, seller 230 may identify the order by a unique order ID 2310A and enter its authorization signal by pressing an enter authorization signal button 2320A.

Figure 22B:
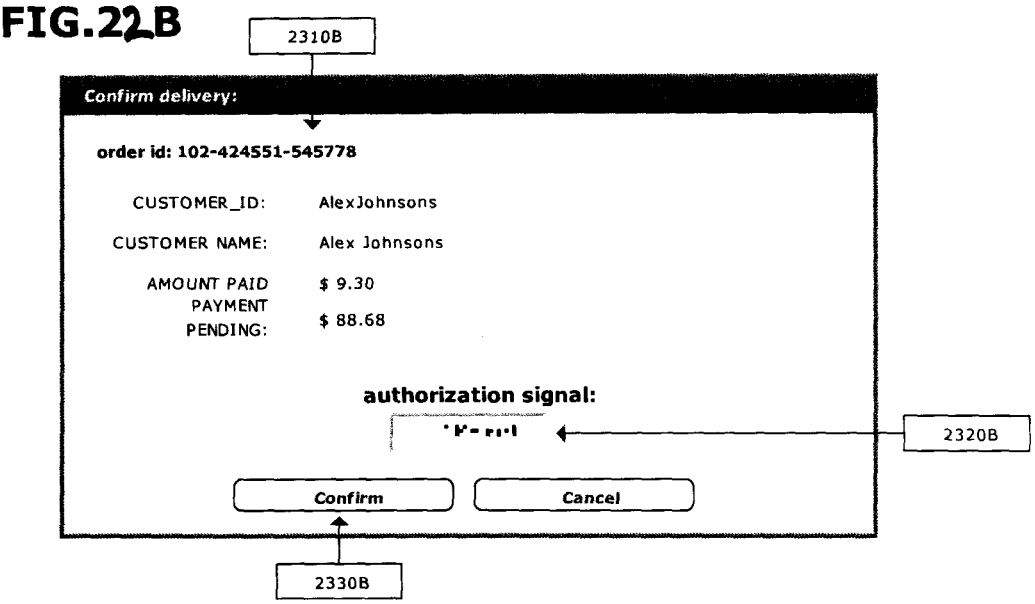
FIG. 22B is an exemplary graphical user interface with an input for authorization signal in accordance with the second authorization methodology of an embodiment of the present invention.

FIG. 22B is an exemplary graphical user interface with an input for authorization signal in accordance with the second authorization methodology of an embodiment of the present invention. Preferably, after the buyer presses the enter authorization signal button 2320A in FIG. 22A, seller 230 is brought to the next interface, shown in FIG. 22B, which includes a display of order ID 2310B and a text box 2320B for entering authorization signal. The authorization signal may be submitted to order verification module 363 for verification after the user clicks on a confirm button 2330B.

Figure 23:
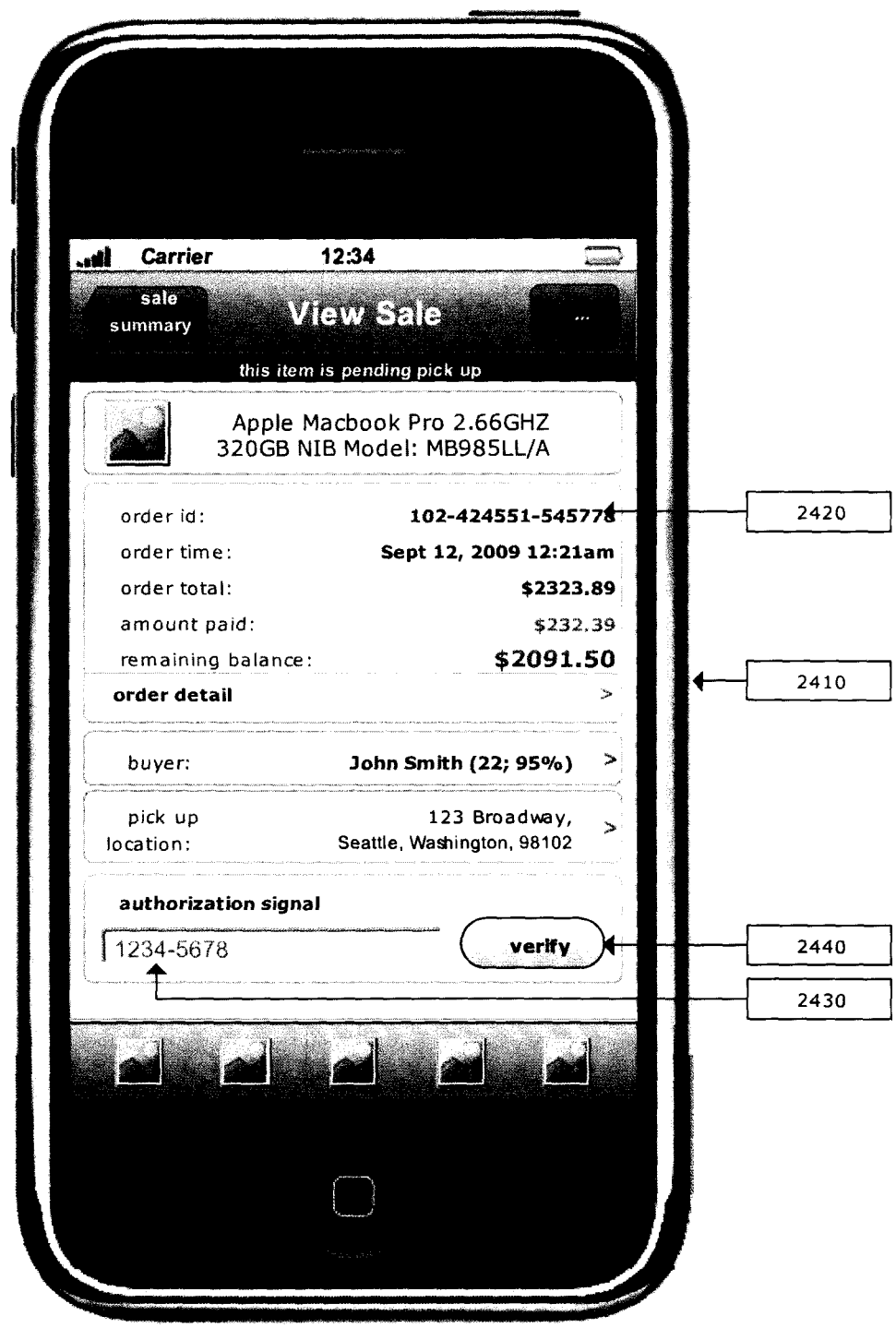
FIG. 23 is an exemplary graphical user interface with an input for authorization signal on a portable device in accordance with the second authorization methodology of an embodiment of the present invention.

FIG. 23 shows yet another embodiment of a graphic interface for seller 230 having a display of order ID 2420 to identify the order, a text box 2430 suitable for entering the authorization signal and a verify button 2440 suitable for submitting the authorization signal.

It is to be appreciated that although the exemplary interfaces illustrated in FIGS. 22A, 22B, and 23 are shown to display information for seller 230, detailed sensitive information may be trimmed down so that special user 310, such as delivery agent 860 and the like, may use a similar interface to input authorization on behalf of seller 230 or track the status of the order. Although an 8-digit code is shown as the authorization signal in the example illustrated, the authorization signal can be anything transferable to the server for verification.

Cancellation System

Another embodiment of the present invention includes a dynamic cancellation system. Such dynamic cancellation policy may optimize customer satisfaction while reducing costly abusive or excessive cancellation. Cancellation may be triggered by both buyer 210 and seller.

Preferably, as illustrated in FIG. 25, the dynamic cancellation system includes a cancellation module 364, which includes a cancellation processor 2640, a rule/policy retriever 2650, and a request processing module 2660. Furthermore, cancellation module 364 may be networked to various resources including but not limited to transactions database 2691, accounting database 2692, user database 2693, membership status database 2694, and rules & policies database 2695. Rules and policies are defined in a rules & policies database 2695. These rules and policies may be static and defined arbitrarily. They may also change dynamically based on different parameters. In addition, they may be a hybrid or combination of both.

Buyer 210 and/or seller 230 may use communication devices 330 to establish communication links 335 to interact with e-commerce system 300. Buyer interfaces 340 and seller interfaces 350 are preferably connected to different modules of the system 300, allowing buyer 210 and seller 230 options to modify different aspects of existing orders. Through cancellation module 364, buyer 210 and seller 230 may request a cancellation of an existing order. As buyer 210 or seller 230 initiates a cancellation request, the cancellation request is forwarded to request processing module 2660.

In the first stage of the cancellation procedure, request processing module 2660 may determine if the order can be canceled based on rules that are static across different membership statuses. For example, request processing module 2660 may be programmed to allow cancellation of orders placed within 24 hours. Afterward, module 2660 may forward the cancellation request to the cancellation processor 2640, which may use rule/policies retriever 2650 to look up rules and policies specific to the subject order, membership status and any parameter related to the cancellation in rules and policies 2695 database.

Based on the information queried by rule/policies retriever 2650, cancellation processor 2640 may process the cancellation. At this stage, a cancellation request may still be rejected based on rules/policies retriever 2650.

Cancellation processor 2640 may also determine the follow-up actions to be carried out upon cancellation. These follow-up actions may also depend on rules and policies defined in the database. For example, cancellation processor 2640 may determine if a relisting should take place after an order cancellation. This decision may be based on the membership status of the seller, the reason for cancellation and also other user/transaction attributes.

Another example of follow-up actions may be reward cancellation. Given that a reward may be issued when a transaction takes place, the reverse of reward may follow an order cancellation. Cancellation processor 2640 may send a reward cancellation request 2620 to reward module 370. Both cancellation process 2640 and reward module 370 may determine how the reward should be reversed.

Yet another example of the follow-up actions may be a refund request 2630. Cancellation processor 2640 may determine how the refund should be executed based on rules and policies. For example, buyer 210 may qualify for full refund in the original form of payment instrument if buyer 210 is in certain membership statuses; otherwise, buyer 210 may receive refund in the form of credits.

After the execution of the cancellation, cancellation processor 2640 may update networked databases to reflect the cancellation and associated changes. Finally, cancellation processor 2640 may notify membership status evaluation module 390 of the change of parameters attributable to the membership status evaluation. Thus, membership status evaluation module 390 may then re-evaluate the membership status for buyer 210 and seller 230 involved in the transaction.

It is to be appreciated that the roles of the cancellation processor and the external module are inter-changeable. For example, the amount of fund, the instruments of the refund and how the refund should be executed may be determined either in cancellation processor 2640 or payment sub module 366 or both.

Membership Statuses and Corresponding Prerequisites

Figure 26:
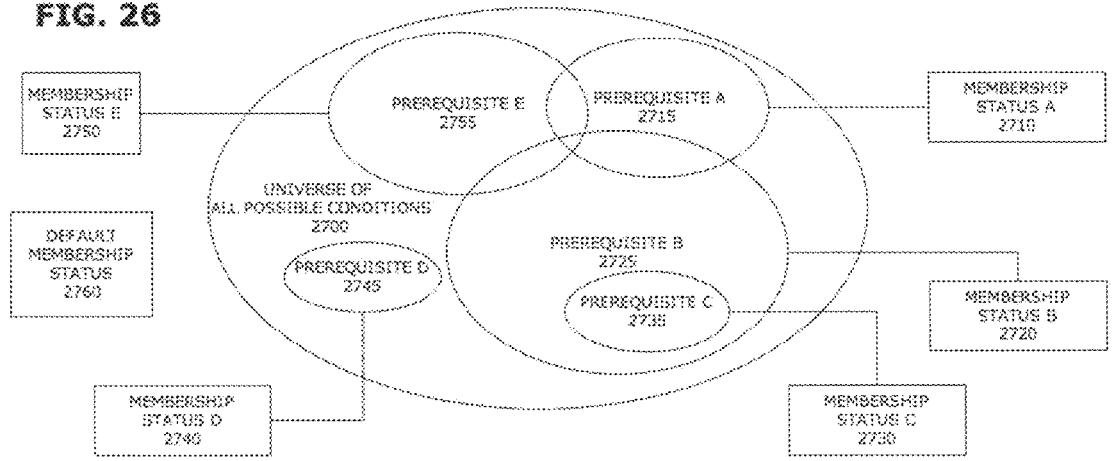
FIG. 26 is a diagram illustrating the relationship between membership status and its corresponding prerequisite in accordance to an embodiment of the present invention.

As illustrated in FIG. 26, in accordance with an embodiment of the invention, six membership statuses are included, which are default membership status 2760 and membership status A-E. Each membership status, other than a default membership status 2760, may be associated with a corresponding prerequisite, preferably a set of non-conflicting conditions.

The universe of membership prerequisite condition 2700 is preferably a collection of possible mutually exclusive conditions, more preferably all possible mutually exclusive conditions. A condition may be anything that a member may achieve. A list of exemplary conditions includes but is not limited to: membership registration, 5 lifetime purchases, 3 sales within the last 10 days, cancellation rate of 20% or less, and composition of 3 product reviews with a helpfulness rate of 90% or above.

Inside this universe, there are preferably 5 prerequisites, namely prerequisites A-E, each being associated to one membership status. More specifically, in accordance with an embodiment, prerequisite A is associated with membership status A, prerequisite B is associated with membership status B, prerequisite C is associated with membership status C, prerequisite D is associated with membership status D, and prerequisite E is associated with membership status E. If one member fulfills a specific prerequisite exclusively, said member may be assigned to the membership status associated with the prerequisite. For example, if a member fulfills the prerequisite A exclusively, it will be assigned the membership status A. If a member does not fulfill any of the membership prerequisite A through E, it may be assigned the default membership status 2760. It is to be appreciated that there is no limit to the number of prerequisites, membership statuses and conditions in implementation, For simple illustration of the relationship between prerequisites and conditions, the following exemplary conditions and prerequisites are defined. This embodiment of universe of conditions includes 9 mutually exclusive conditions defined numerically as 1, 2, 3, 4, 5, 6, 7, 8 and 9, and five prerequisites A, B, C, D and E, as discussed above. The elements are showed as followed:

UNIVERSE OF CONDITIONS: [1, 2, 3, 4, 5, 6, 7, 8, 9]
PREREQUISITE A: [1, 2, 4, 5]
PREREQUISITE B: [1, 2, 3, 6]
PREREQUISITE C: [1, 2, 3, 6, 8]
PREREQUISITE D: [9]
PREREQUISITE E: [1, 3, 4, 7]

If the prerequisite is a set of non-conflicting conditions, it is possible that a member fulfils multiple prerequisites if the union of the conditions of the said prerequisites are non-conflicting. For example, if a member fulfills non-conflicting conditions [1, 2, 3, 4, 5, 6, 7], then this member may fulfill prerequisite A, B and E at the same time. Should this situation occur, it may be preferred to have a rule to correctly determine the membership status of the said member. In accordance with an embodiment of the present invention, a priority system is introduced to ensure deterministic assignment of unique membership status to a member. More specifically, each membership status may contain a priority attribute to resolve the possible overlap of multiple prerequisites at the same time. For example, membership status A has a priority higher than those of membership statuses B and E while membership status B may have a priority higher than that of membership status E. If a member fulfills the conditions [1, 2, 3, 4, 5, 6, 7], this member may be assigned the membership status A because membership status A has a priority higher than those of membership statuses B and E. If a prerequisite B is a subset of prerequisite C, prerequisite C may be more restrictive than prerequisite B. Should the described situation occurs, the member may not be assigned the membership status C unless the membership status C has a priority higher than that of the membership status B.

In an embodiment of the present invention, each membership with non-conflicting prerequisite may have a unique priority to ensure predictable membership status assignment. As a prerequisite is merely a set of conditions, a member's membership status may shift from one to another as the set of conditions the member fulfills changes. For example, member will change from membership status B to membership status C if the member fulfills the new condition A.

Figure 27:
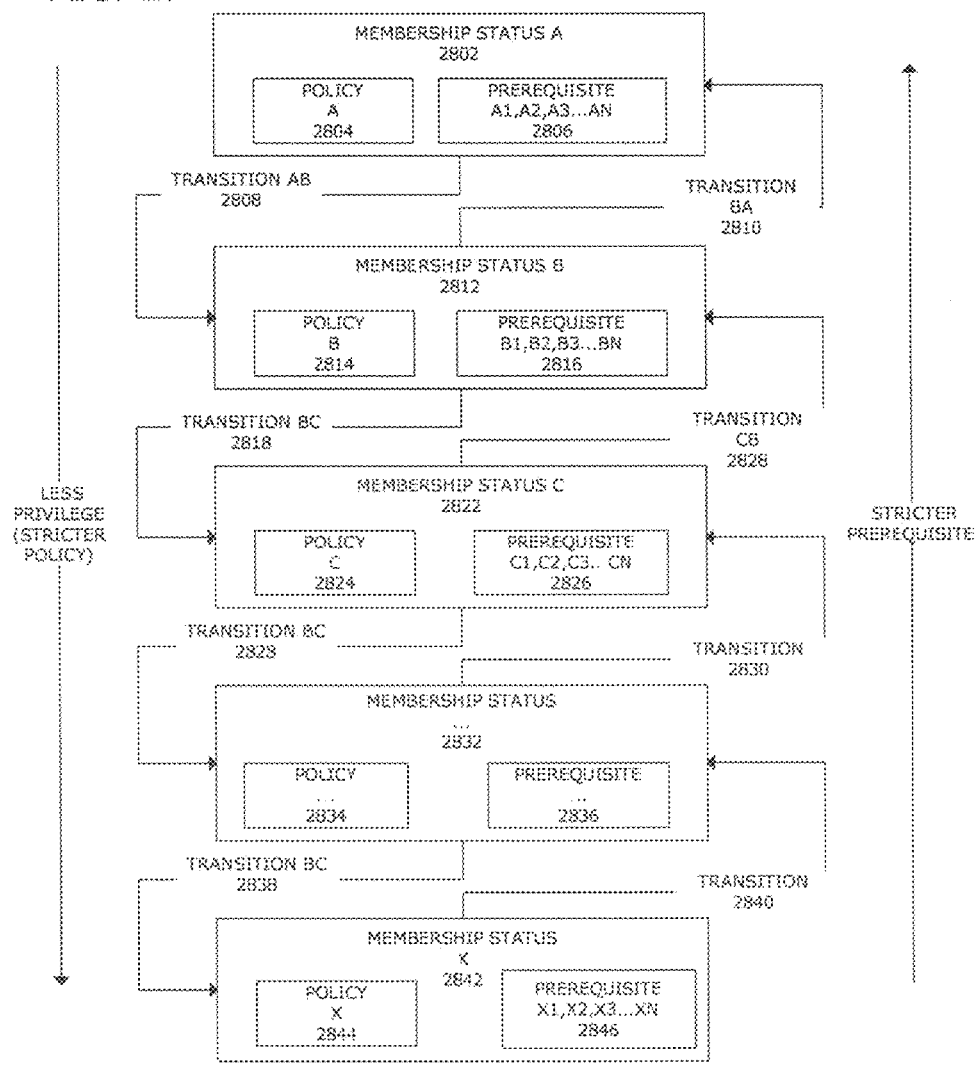
FIG. 27 illustrates a dynamic policy switching mechanism in accordance with an embodiment of the present invention.

FIG. 27 illustrates a dynamic policy switching mechanism in accordance with an embodiment of the present invention. For the purpose of simple illustration, a linear and reversible membership status structure is illustrated. Throughout the description, the cancellation policies may be used as an example to emphasize the benefit of a dynamic policy system. However, it is to be appreciated that the dynamic policy is not restricted to just the cancellation policy but to any policy that potentially affects the system user.

According to FIG. 27, there may be infinite number of membership statuses, including a membership status A 2802, a membership status B 2812, a membership status C 2822 and so on. There is a prerequisite associated with each membership status. Upon fulfilling a specific set of prerequisite, the member is assigned the corresponding membership status of said prerequisite. E-commerce system 300 preferably treats the member according to the membership policies. For example, for membership status A 2802, the prerequisite may include requirements A1, A2, A3 . . . AN. If a member fulfills all the requirements and reaches the membership status A, e-commerce system 300 treats the member according to a policy A 2804. The policy may be a combination of predetermined and dynamic terms and benefits.

In accordance with an embodiment of the invention, the highest membership status (membership status A) has the strictest prerequisite but holds the most privileged policy. Using the cancellation policy as an example, membership status A may have a prerequisite of lifetime and recurring fulfillment rate of 95% or less and may hold a policy that allows unconditional cancellation/return with full refund guarantee.

Membership status C may be a default status, which members begin from this level of membership once they sign up for services. In reality, there may be multiple default statuses in order to separate members into different from the very beginning. The default membership status C may have a stricter prerequisite and holds a less privileged policy. Using the cancellation policies as an example again, it may have a prerequisite of lifetime fulfillment rate of 70% or more and may hold a policy that allows cancellation within 24 hours with full refund.

In order to encourage constructive participation and discourage destructive members, a membership status X may be created for abusive or non-cooperative members. The membership status X may have the least strict prerequisite and hold the strictest policy. For example, using the cancellation policies as an example, a member with a lifetime fulfillment rate of 30% or less may qualify for membership status X. With the strictest policy enforced in this membership status category, policies for the members may include cancellation of orders only within 24 hours from placing the order and payment refunds only as credit for future purchase. This cancellation system may resemble a negative feedback control system, in which seller's cancellation and order fulfillment resemble a negative and a positive signal respectively. Each membership status may represent a state in which a seller can reside. As buyer 210 cancels an order (negative signal), his or her membership status is driven to a state with stricter policy and less privilege. With a stricter policy and less privilege, buyer 210's likelihood to abuse the e-commerce platform or the seller attenuates, and thus may lead to a lower order cancellation rate. Should this occurs, buyer 210 may be inclined to complete more orders with fewer cancellations and drive the membership status up. Thus, cancellation module 364 preferably attenuates/discourages buyer 210's abusive cancellation.

In yet another example, buyer 210 starts with the membership status C. Due to the order cancellations, buyer 210's may not qualify for the minimum requirement for membership status C anymore. In transition 2828, membership status evaluation module 390 may re-assign buyer 210 to an inferior membership status 2832. As buyer 210 completes more orders (positive signal), buyer 210's membership status may be driven to a state with less strict policy and more privileges. For example, while buyer 210 may start with membership status C, after buyer 210 completes more orders, membership status evaluation module 390 may detect change of parameters that govern the membership status and new membership status may be assigned to buyer 210.

Relisting after Cancellation

A relisting mechanism may be incorporated into cancellation module 363 and purchase/sale module 361. Upon cancellation, a listing may be relisted automatically or manually under predetermined rules. These rules may reside in rule/policy database 1695 and/or defined elsewhere.

Figure 28:
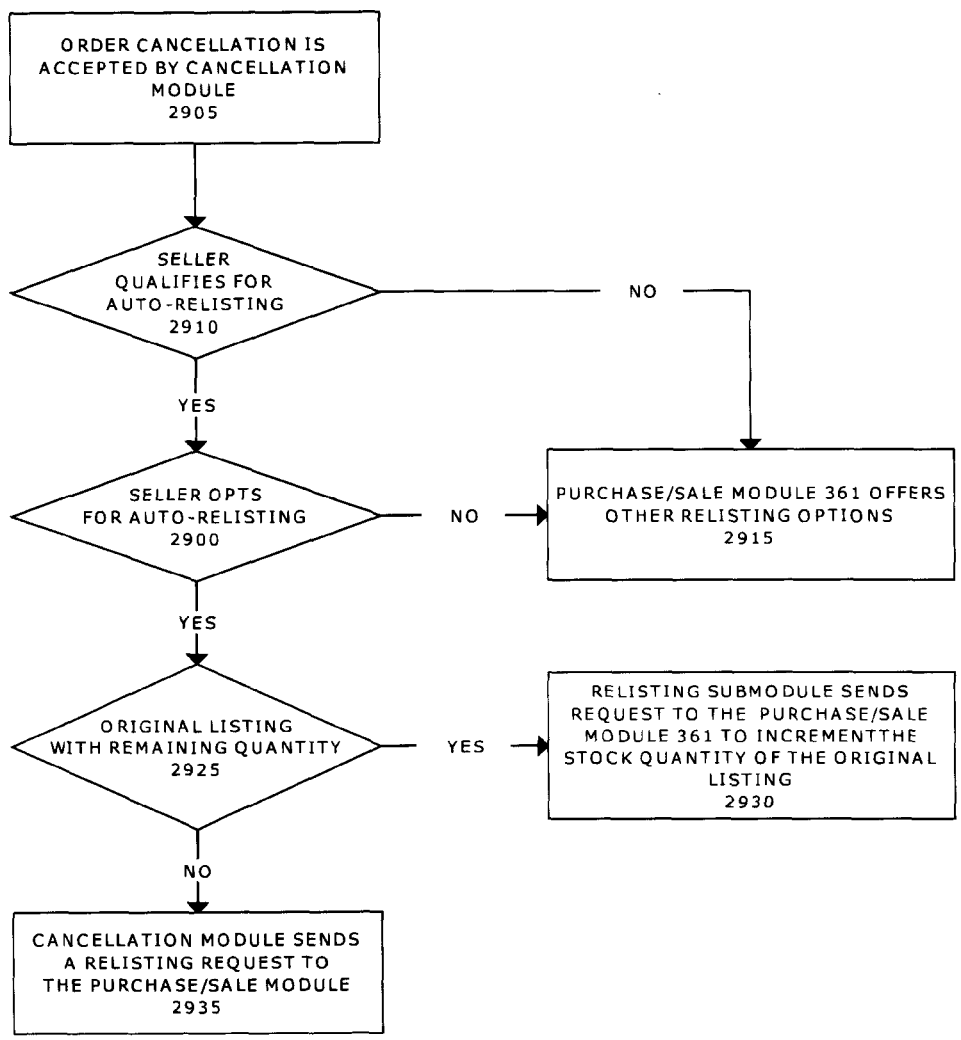
FIG. 28 is a flowchart illustrating an exemplary re-listing mechanism upon cancellation of a transaction in accordance with an embodiment of the present invention.

As illustrated in FIG. 28, in step 2905, an order cancellation is accepted by the cancellation module 364. The routine proceeds to step 2910, where cancellation module 364 determines where seller 230 meets the requirements for auto-relisting. This requirement may be based on seller's membership status, reason of cancellation or any other factors that cancellation module 364 may retrieve. If seller 230 qualifies for auto-relisting, the branch "YES" may be followed to step 2920 and the branch "NO" may be followed to step 2915 otherwise.

In step 2920, cancellation module 364 may further determine if seller 230 opts for the auto-relisting feature. If seller 230 does not opt for auto-relisting, the branch "NO" may be followed to step 2915, or alternatively, the branch "YES" may be followed to step 2925. In step 2915, purchase/sale module 361 may offer different relisting options, such as discounts.

In step 2925, purchase/sale module 361 preferably checks if the original listing has a remaining quantity for sale at the moment of the order cancellation. If the listing still has a remaining quantity for sell, the "YES" branch may be followed to step 2930 where the inventory may be updated with the new quantity. If step 2925 does not have any remaining inventory from original listing, the branch "NO" may be followed to step 2935 where the cancellation module sends a relisting request to purchase/sale module 361.

Buyer Triggered Cancellation

An order includes a mutual agreement between buyer 210 and seller 230 to exchange goods or service for financial return, regardless of whether it was actually fulfilled or canceled. A canceled order may be an order that is terminated either by buyer 210 or seller 230.

The fulfillment count and the non-fulfillment count may be the number of orders completed and the number of the order canceled by a user, respectively. The total order count may be the number of orders associated with the user. However, an order can be ignored and taken out of the calculation of fulfillment count, non-fulfillment count, total order count, etc. It is to be appreciated that an order can be taken out of the calculation towards one user's fulfillment rate while remaining in another user's fulfillment rate. For example, a canceled order may be ignored in calculating the seller's fulfillment count and total order count while taken into account of the buyer's fulfillment count and total order count.

The fulfillment rate may be the ratio of fulfillment count to total order count. The non-fulfillment rate or cancellation rate may be the ratio of non-fulfillment count to number of orders placed.

It is to be appreciated that the definition of fulfillment and nonfulfillment can be defined arbitrarily with a specific set of rules. In one aspect of an embodiment of the present invention, the nonfulfillment count attributes only to the party that causes the cancellation. For example, if buyer 210 canceled the order because he had changed his mind, this canceled order will be counted toward the buyer's nonfulfillment count but not the seller's. Should this situation occurs, the fulfillment rate and non-fulfillment rate will not be add up to 1 but a number smaller than 1. The missing portion attributes to the number of orders that is taken out of the equation.

Figure 29A:
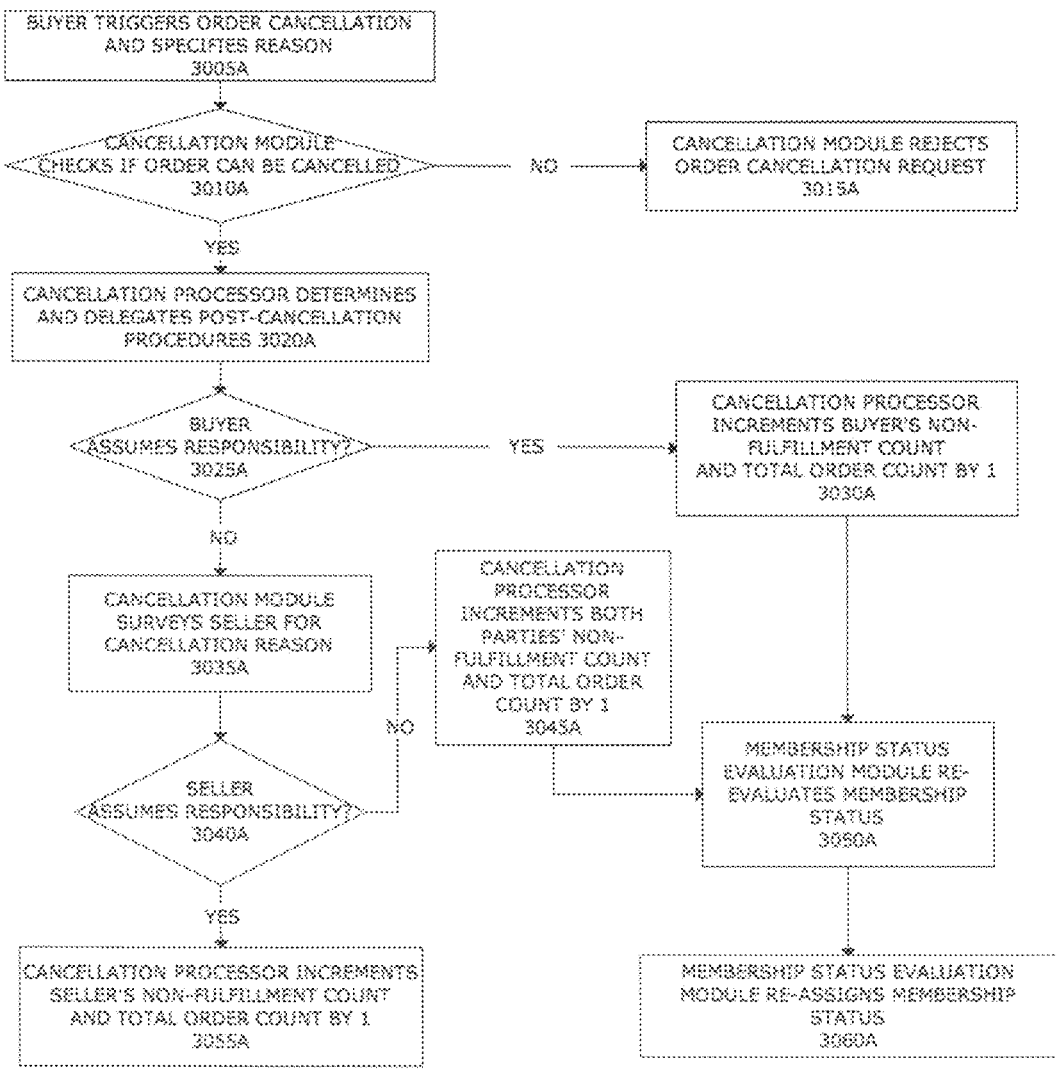
FIG. 29A is a flowchart illustrates one particular methodology of a flexible cancellation policy based on the buyer's historical fulfillment rate in accordance with an embodiment of the present invention.
Figure 29B:
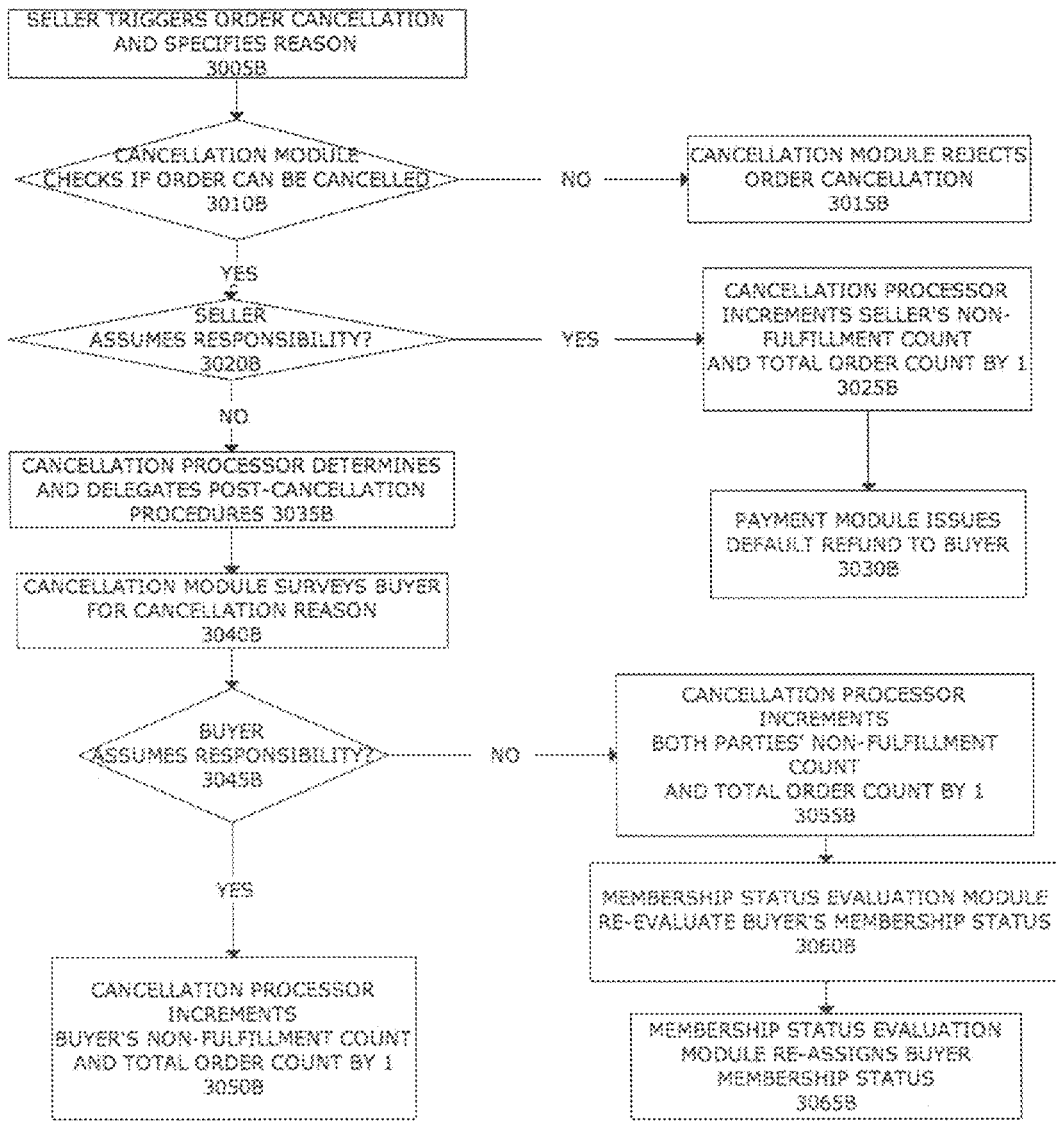
FIG. 29B is a flowchart illustrates one particular methodology of a flexible cancellation policy based on the seller's historical fulfillment rate in accordance with an embodiment of the present invention.

FIG. 29A illustrates an embodiment of a methodology of a flexible cancellation policy based on the buyer's historical fulfillment rate in accordance with an embodiment of the present invention. In the embodiment shown, the routine begins at step 3005A where buyer 210 requests a cancellation, after which in step 3010A, the cancellation request is first tested by request processing module 2660 to determine if request may be granted based on some predetermined requirements. If the request is not rejected by request processing module 2660, it may be tested again by cancellation processor 2640 based on rules and policies defined in rules & policies database 2695.

If cancellation request is rejected by any of these two modules, the "NO" branch is followed to step 3015A where request processing module 2660 rejects the cancellation request by buyer 210. If the cancellation request is granted, the "YES" branch is followed to step 3020A where cancellation processor 2640 processes the cancellation.

During request for cancellation, buyer may specify the reason of cancellation. Buyer 210 may be presented with a survey inquiring the reason of cancellation. Based on the answer provided, cancellation processor 2640 may analyze buyer's cancellation reasons to determine if buyer 210 should assumes the responsibility of canceling the order. Specifically, if the reason for cancellation is because he changed his mind, cancellation processor 2640 may conclude that buyer 210 is responsible for the cancellation. Alternatively, if seller 230 states that the goods are out of stock, buyer 210 does not assume any responsibility.

If buyer 210 assumes the responsibility, the "YES" branch may be followed to step 3030A where cancellation processor 2640 may increase the buyer's non-fulfillment count and total order count by 1. Upon the change of the non-fulfillment count, membership status evaluation module 390 may re-evaluate buyer 210's membership status based on the new fulfillment rate. Membership status evaluation module 390 may assign a new membership status to buyer 210 if a membership status change occurs.

Referring again to step 3025A, if buyer 210 does not assume the responsibility, the "NO" branch is followed to step 3035A where cancellation module 364 may survey seller 230 about the cancellation reasons. Upon receiving the cancellation reasons from seller 230, the routine may proceed from step 3035A to step 3040A where cancellation processor 2640 may determine if seller 230 assumes responsibility for the cancellation. If seller 230 assumes the responsibility, the "YES" branch may be followed to step 3055A where cancellation processor 2640 increments seller's non-fulfillment count and total order count by 1.

Referring again to step 3040A, if seller 230 does not assume the responsibility, the "NO" branch may be followed to step 3045A where cancellation processor 2640 increments both parties' nonfulfillment count and total order count by 1. In step 3050A, membership status evaluation module 390 may re-evaluate the membership statuses of both parties based on the new fulfillment rates. In step 3060A, membership status evaluation module 390 may re-assign membership statuses if any change occurs.

Seller Triggered Cancellation

Preferably, the routine begins at step 3005B where seller 230 specifies the reason of cancellation and requests a cancellation. Seller 230 may be presented a survey inquiring the reason of cancellation. Based on the answer provided, cancellation processor 2640 determines the party to which the cancellation is attributed.

Preferably, in step 3010B, cancellation request is first tested by request processing module 2660 to determine if the request should be granted based on some predetermined requirements. If the request is not rejected by request processing module 2660, it may be tested again by cancellation processor 2640 based on rules and policies defined in rules & policies database 2695. If the cancellation request is rejected by any of these two modules, the "NO" branch may be followed to step 3015B where request processing module 2660 rejects the cancellation request by seller 230.

Referring again to step 3010B, if the cancellation request can be granted, the "YES" branch may be followed to step 3020B where request processing module 2660 analyzes seller's cancellation reasons to determine if seller 230 assumes the responsibility for order cancellation. More specifically, if the reason for cancellation is because the seller runs out of stock, request processing module 2660 may attribute the responsibility to seller 230. Alternatively, if seller 230 claims that buyer 210 does not want to proceed with the completion of the order, seller 230 may not assume any responsibility. If seller 230 assumes the responsibility, the "YES" branch may be followed to step 3025B where request processing module 2660 increments the seller's non-fulfillment count and total order count by 1. If seller 230 does not assume the responsibility, the "NO" branch may be followed to step 3035B where cancellation processor 2640 processes the cancellation. Cancellation processor 2640 may also determine and delegate any of the following post-cancellation procedures (e.g. re-listing, reward reverse, payment refund and the like) according to seller's membership status at the moment the order was made.

In step 3040B, cancellation module 364 may survey buyer 210 about the cancellation reasons. Upon receiving the cancellation reasons from buyer 210, the routine may proceed to step 3045B where cancellation processor 2640 determines if buyer 210 assumes that the responsibility of cancellation. If buyer 210 assumes the responsibility, the "YES" branch may be followed to step 3050B where cancellation processor 2640 increments buyer's non-fulfillment count and total order count by 1.

Referring again to step 3045B, if buyer 210 does not assume the responsibility, the "NO" branch may be followed to step 3055B where cancellation processor 2640 increments both parties' nonfulfillment count and total order count by 1. In step 3060B, membership status evaluation module 390 may re-evaluate the membership statuses of both parties based on the new fulfillment rate. In step 3065B, membership status evaluation module 390 may re-assign membership statuses if any change occurs.

Whereas the fulfillment rate and the non-fulfillment rate may be assumed to be the ratio of the fulfillment count and non-fulfillment count to the total order count, respectively. It is to be appreciated that the fulfillment rate and the non-fulfillment rate could be any rate that is positively related to the number of order completed and canceled with respect to the number of all order placed.

Preferably, in this dynamic cancellation policy, both buyer 210 and seller 230 have nothing to gain by changing only his or her own strategy unilaterally because neither buyer 210 nor seller 230 benefits by not assuming his or her responsibility for cancellation without the counter-party's confirmation.

Figure 30:
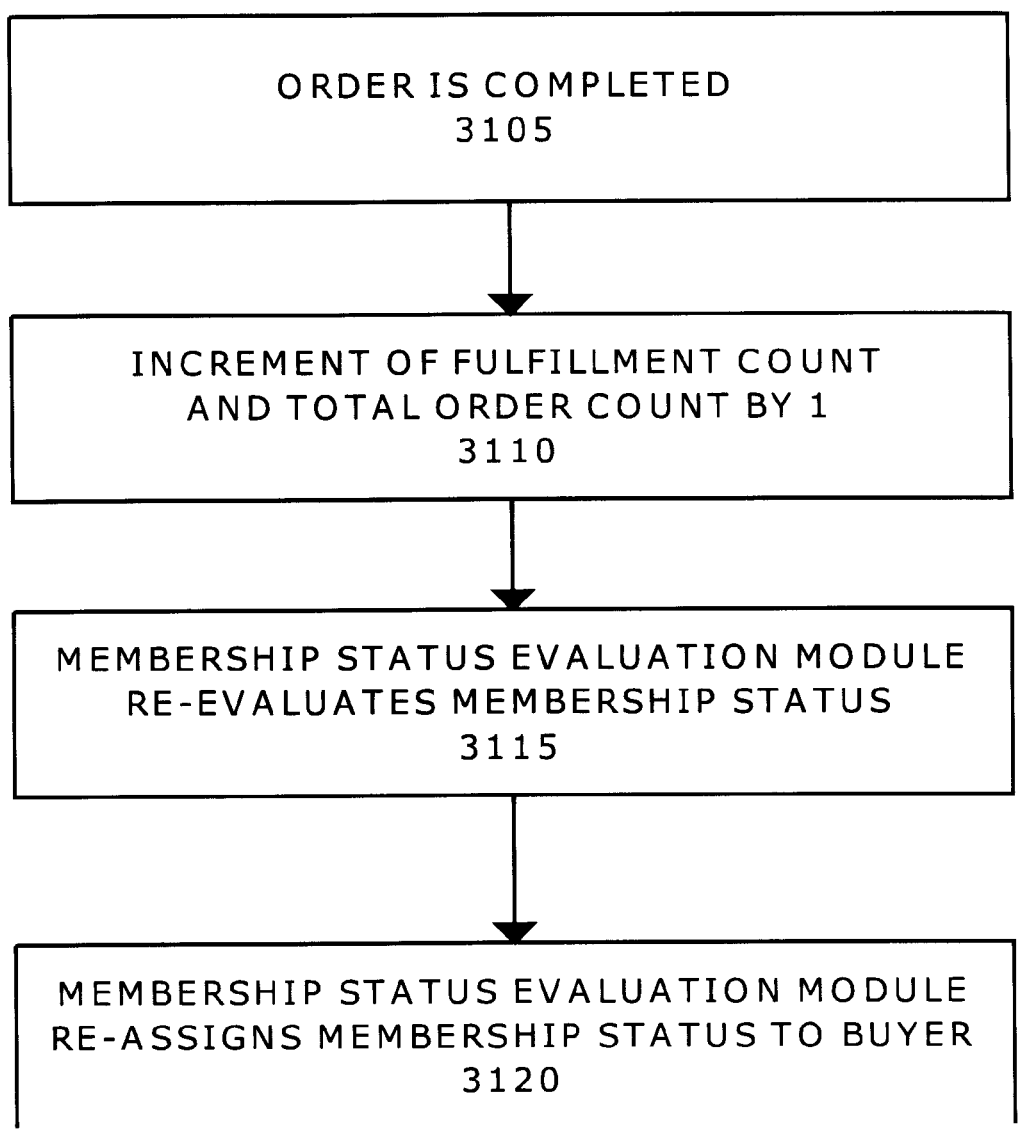
FIG. 30 is a flowchart illustrating one particular scenario in which fulfillment rate and membership status evaluation takes place in accordance with an embodiment of the present invention.

In general, after an order is completed in step 3105 of FIG. 30, both the buyer's and the seller's fulfillment counts and total order count may be incremented by one. At step 3115, membership status evaluation module 390 may re-evaluate the membership statuses of buyer 210 and seller 230 and new membership statuses may be assigned to both parties if they were changed upon evaluation. It is to be appreciated that although fulfillment count is described herein as the sole parameter to determine the membership status, membership status can be based on various types and number of parameters and re-evaluated anytime any parameter is changed.

It is also to be appreciated that the definition of order completion may vary. In one embodiment, an order may be considered completed upon successful establishment of an agreement between buyer 210 and seller 230 to trade an item. In another embodiment, the order may not be considered completed until a predetermined amount of time has passed after the delivery of goods.

Figure 31A:
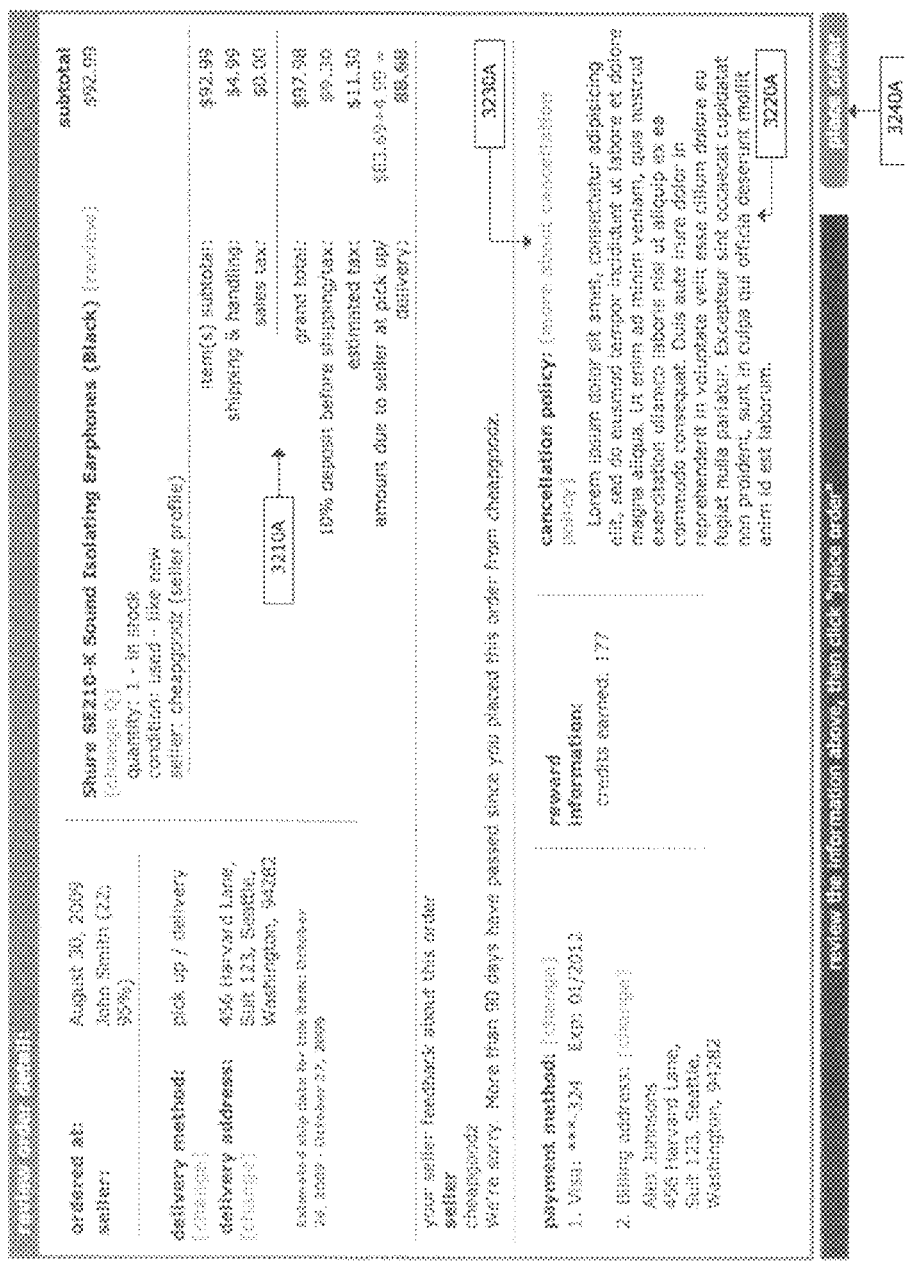
FIG. 31A is an exemplary graphical user interface showing order review information along with information about the current cancellation policy in accordance with the present invention.

FIG. 31A is an exemplary graphical user interface showing order review information along with information about the current cancellation policy in accordance with the present invention. The exemplary interface shown includes a display area 3210A showing order details, a display areas 3220A showing the cancellation policy, a "more about cancellation policy" button for buyer 210 to obtain more information about the cancellation policy and a place order button 3240A.

Figure 31B:
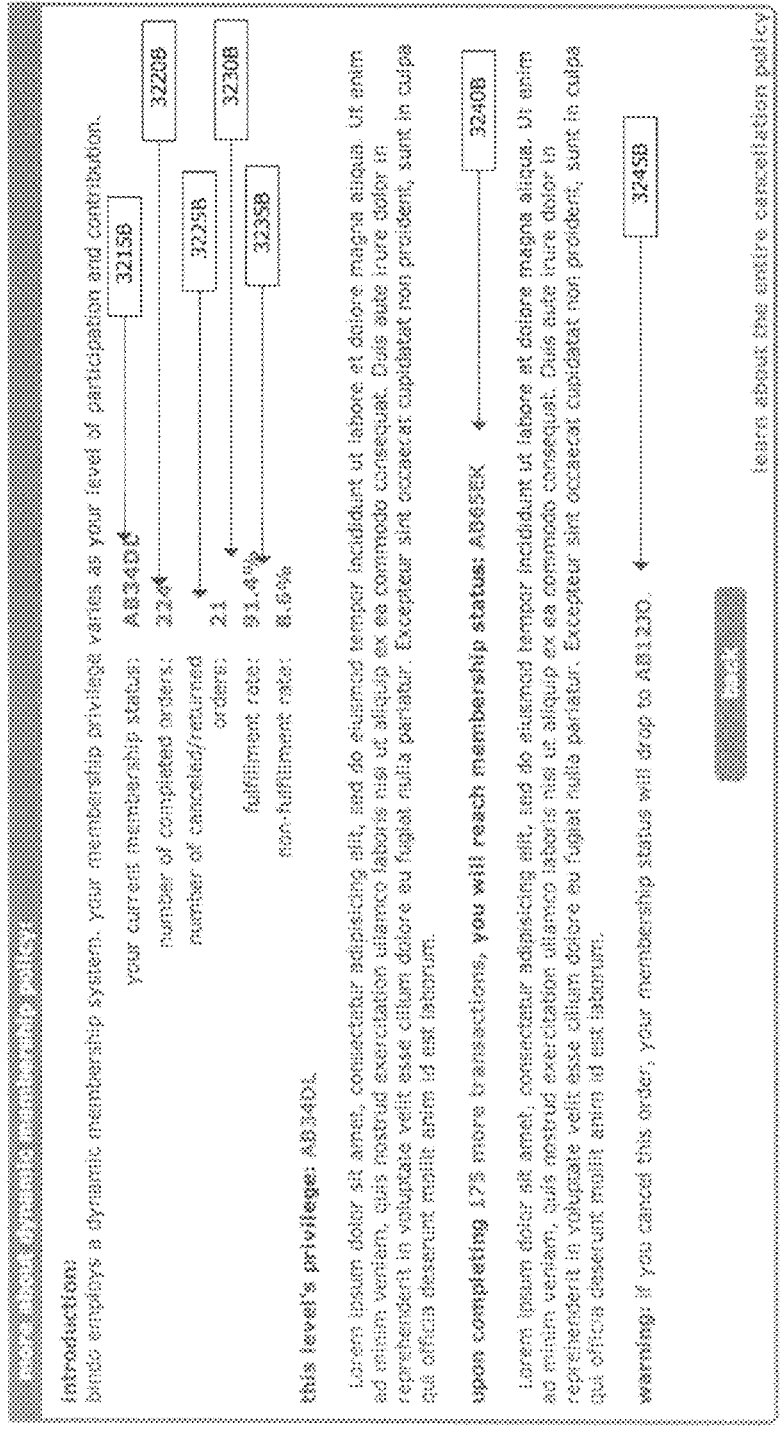
FIG. 31B is an exemplary graphical user interface displaying current membership status and various metrics related to the membership status in accordance with an embodiment of the present invention.

FIG. 31B shows an example of a graphical user interface displaying current membership status and various metrics related to the membership status in accordance with one aspect of the present invention. The user interface may include display areas showing various parameters, including current membership status 3215B, number of completed orders 3220B, number of canceled orders 3225B, fulfillment rate 3230B and non-fulfillment rate 3235B. It may also include a reference (i.e. AB34DL) to the policies and benefits associated with the subject membership status. In addition, it may describe how to achieve the next membership status (i.e. AB65EK) 3240B and a link to the corresponding policies and benefits. The interface may also show a warning message about a potential membership status downgrade 3245B.

FIG. 32 illustrates an example of a graphical user interface displaying current membership status, including a display of current membership status 3310, a display for other membership statuses 3320, fulfillment requirement 3330, benefits display 3340, and remark display 3350. Although a 6-character combination is used to identify the membership status in the example, it is to be appreciated that the membership status could be presented in any way that is identifiable to the member and the ecommerce platform. Preferably, requirement 3330 displays the requirements to achieve a specific membership status while benefit display 3340 and 3350 display the benefits and additional information associated with the membership status, respectively.

Figure 33A:
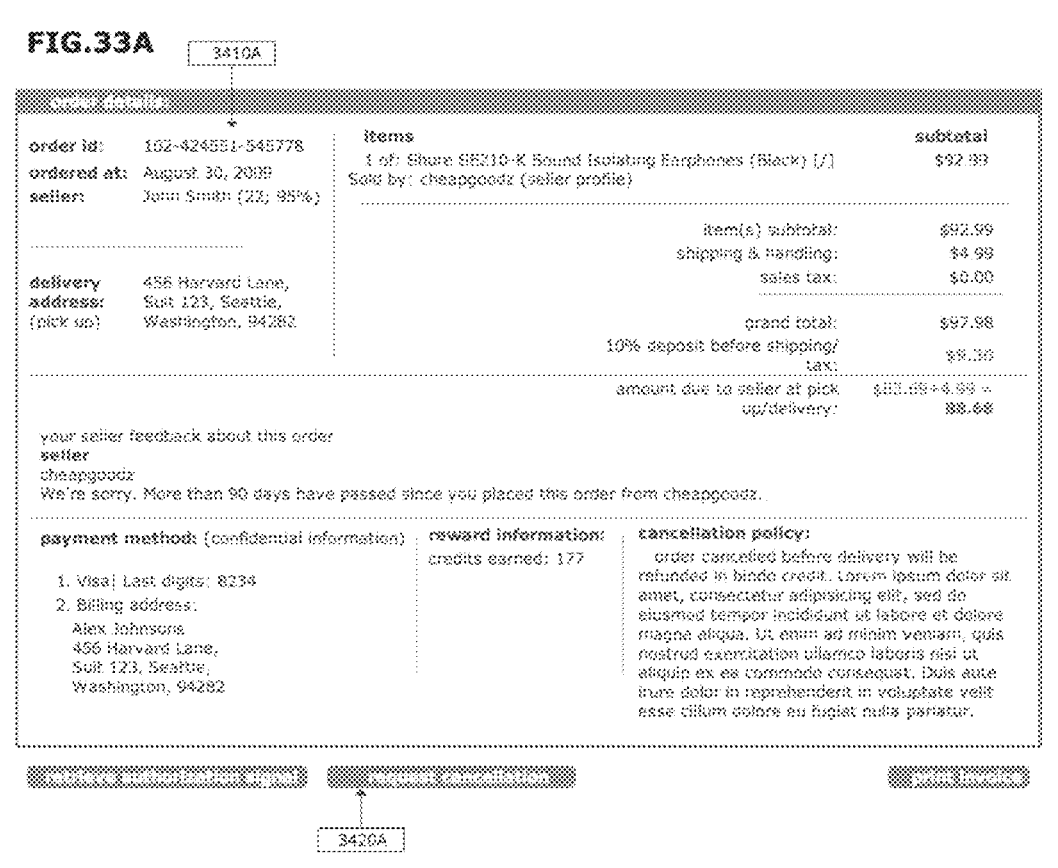
Figure 33:
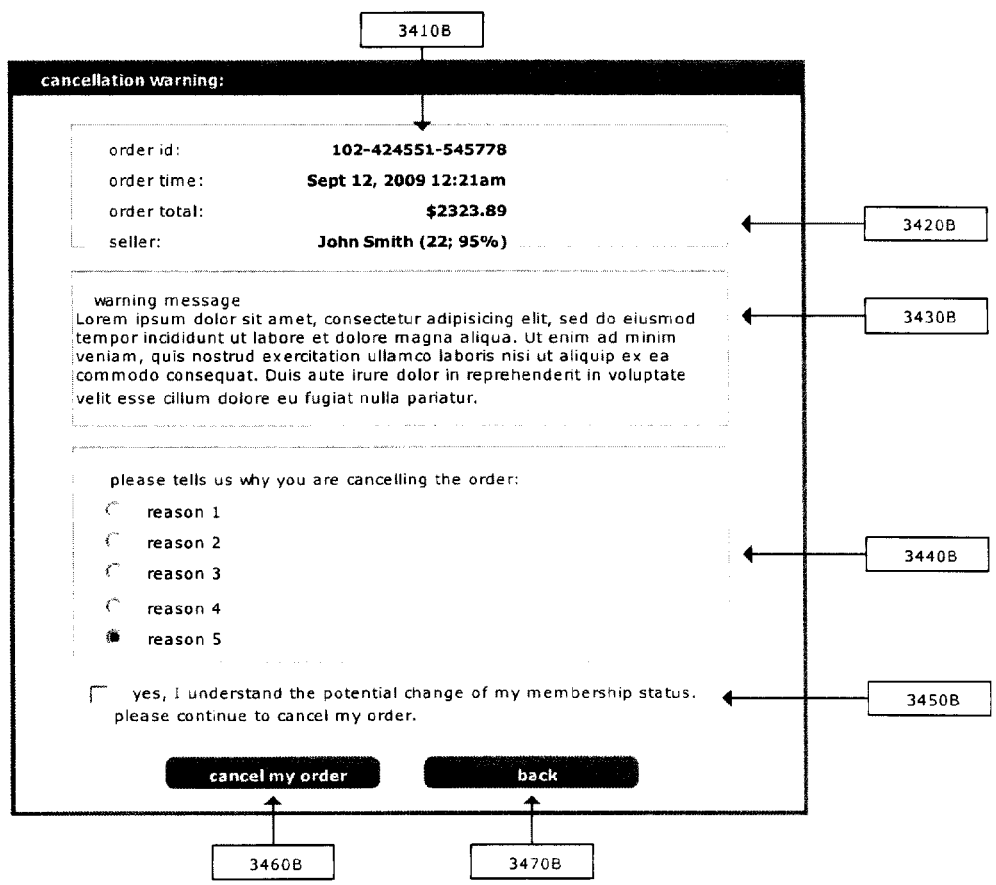
FIG. 33A is an exemplary graphical user interface allowing one party to request cancellation of an existing transaction in accordance with an embodiment of the present invention.
FIG. 33B is an exemplary graphical user interface showing important information about order cancellation and a button to confirm cancellation of a particular transaction in accordance with an embodiment of the present invention.

FIG. 33A shows an example of a graphical user interface allowing one party to request cancellation of an existing transaction in accordance with an aspect of the present invention. The interface may include a unique order ID 3410A and a request order cancellation button 3420A. When request order cancellation button is pressed, the user is preferably brought to the next interface FIG. 33B.

An embodiment of a graphical user interface is shown in FIG. 33B having a display area 3420B for displaying order information, display area 3420B including order ID 3410B, a display area 3430B showing a warning to the user about the potential consequence of cancellation and additional information, a display area 3440B showing a list of reasons of cancellation for the user to choose from, a confirmation check box 3450B to make sure that the user understands important information about the order cancellation, a cancel my order button 3460B to confirm the cancellation and a back button 3470B to cancel the cancellation request.

Figure 34:
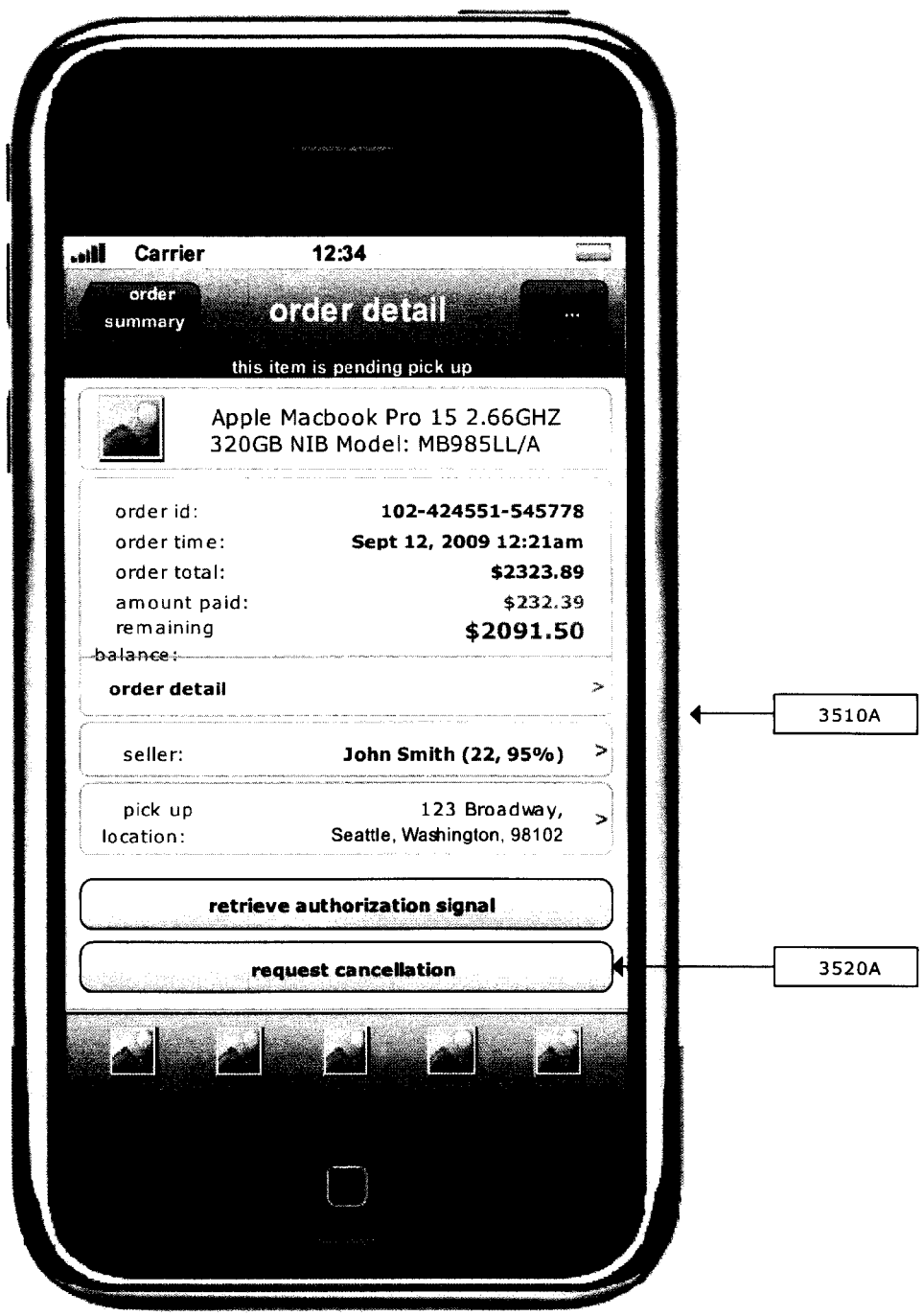
FIG. 34A is an exemplary graphical user interface allowing one party to request cancellation of an existing transaction on a portable device in accordance with an embodiment of the present invention.
FIG. 34B is an exemplary graphical user interface showing important information about order cancellation and a button to confirm cancellation of a particular transaction in accordance with an embodiment of the present invention.

Yet another exemplary graphical user interface is shown in FIG. 34A. As illustrated, the user interface may have a display area 3510A showing order details and a request cancellation button 3520 A. By pressing request cancellation button 3520A, the user is preferably brought to another graphical interface shown in FIG. 34B.

Figure 34B:
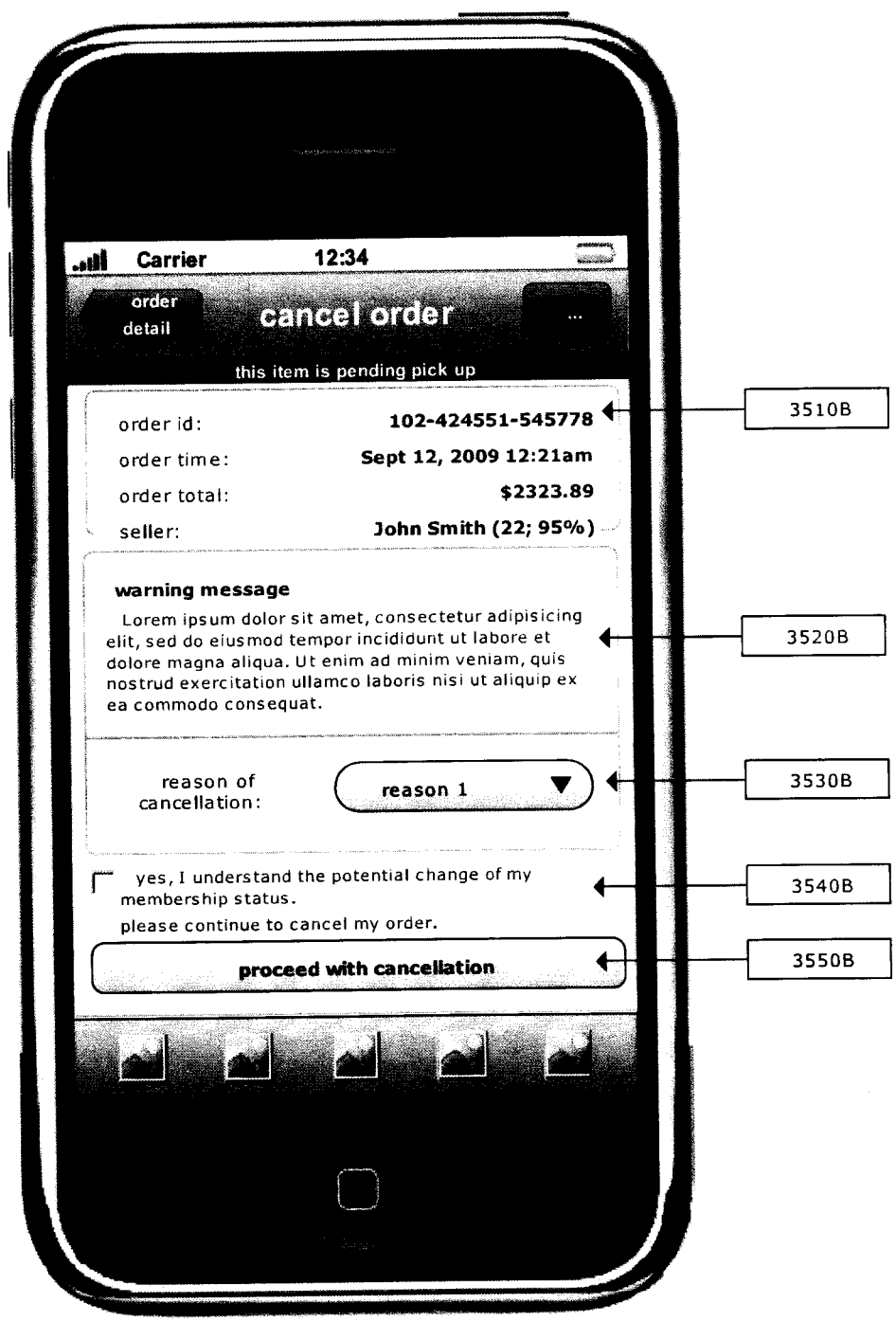

The embodiment of the interface shown in FIG. 34B includes a display area 3510B for showing order details, including order ID, a warning message display area 3520 B, a reason of cancellation 3530B, a confirmation checkbox 3540B and a proceed with cancellation button 3550 B. Display area 3510B may show the order ID with brief order information to help the user identify the order to be canceled and reduce the risk of canceling the wrong order. Warning message display area 3520B preferably shows a warning to the user about the potential consequence of cancellation and additional information. Reason for cancellation 3530B may show a list of reasons of cancellation for the user to choose from. Confirmation checkbox 3540B preferably ensures that the user understands the important information about the order cancellation. A button 3550B preferably confirms the cancellation.

The examples provided are merely exemplary, as a matter of application specific to design choice, and should not be construed to limit the scope of the invention in any way.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, the user interfaces on the portable devices for order verification, payment and placing orders can be changed without deviating from the scope of the invention as a matter of application specific to design choice. Additionally, other alterations can be made, as a way of non-limiting example, network setup, database connections, buyer inspection process, etc. as a matter of application specific to design choice, without deviating from the scope of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. A method for managing an e-commerce system comprising:
   accepting, by a processor of an intermediary device, via a network, a transaction request between a seller device of a seller and a buyer device of a buyer for one or more goods or services;
   charging, by the processor of the intermediary device, the buyer of the buyer device an amount according to the transaction request;
   holding, by the processor of the intermediary device, the amount in the intermediary;
   receiving, by the processor of the intermediary device, a request for a first signal corresponding to the transaction;
   generating, by the processor of the intermediary device, the first signal responsive to receiving the request;
   providing, by the processor of the intermediary device, the first signal unique to the transaction request to the buyer device via the network;
   receiving, by the processor of the intermediary device, a second signal generated by and transmitted from the seller device via the network upon the seller's indication of delivery of said one or more goods or services via input to the seller's device, the second signal corresponding to the transaction request;
   determining, by the processor of the intermediary device, that the second signal satisfies a predetermined relationship with the first signal; and
   making, by the processor of the intermediary device, at least a portion of the amount available to the seller responsive to determining that the first signal and the second signal satisfy a predetermined relationship.

2. The method according to claim 1, wherein the predetermined relationship is a mathematical formula.

3. The method according to claim 1, further comprising:
   generating, by the processor, the first signal in response to receiving the transaction request; and
   sending, by the processor, the first signal to the buyer device to provide to the seller upon the seller's delivery of the one or more goods or services.

4. The method according to claim 1, wherein the second signal is generated by an authorization device of the buyer.

5. The method according to claim 1, wherein the first and second signals are generated by a synchronized algorithm.

6. The method according to claim 1, wherein
determining, by the processor, that the second signal satisfies a predetermined relationship with the first signal includes determining that the second signal matches the first signal.

7. The method according to claim 1, wherein receiving a second signal upon the seller's delivery of said one or more goods or services includes receiving, by the processor, the second signal from the seller device.

8. The method of claim 1, further comprising:
identifying, by the processor, a second transaction between the seller device and the buyer device;
charging the buyer of the buyer device a second amount according to the transaction;
holding the second amount in the intermediary device;
receiving, by the processor, a request from the buyer to cancel the transaction;
determining, by the processor, a number of cancellations requested by the buyer over a predetermined time period;
determining, by the processor, a number of transactions placed by the buyer over a predetermined time period;
determining, by the processor, a cancellation ratio of the buyer based on a ratio of the number of cancellations and a total number of transactions placed by the buyer; and
determining, based on the cancellation ratio of the buyer, a refund policy according to which to return the amount held in the intermediary; and
refunding, by the processor, the second amount to the buyer according to the refund policy.

9. The method of claim 8, further comprising:
determining, by the processor, a number of product reviews submitted by the buyer; and
wherein determining, based on the cancellation ratio of the buyer, a refund policy according to which to return the amount held in the intermediary includes determining, based on the cancellation ratio of the buyer and the number of product reviews submitted by the buyer, the refund policy according to which to refund the amount held in the intermediary.

10. The method of claim 8, further comprising:
determining, by the processor, a number of product reviews submitted by the buyer that satisfy a threshold helpfulness rating, the helpfulness rating corresponding to a level of helpfulness the rating provides; and
wherein determining, based on the cancellation ratio of the buyer, a refund policy according to which to return the amount held in the intermediary includes determining, based on the cancellation ratio of the buyer and the number of product reviews submitted by the buyer that satisfy the threshold helpfulness rating, the refund policy according to which to refund the amount held in the intermediary.

11. A computer system for managing an e-commerce system, the computer system comprising:
a data processor;
a memory storage device comprising processor-executable instructions, which when executed by the data processor, cause the processor to:
accept a transaction request between a seller device of a seller and a buyer device of a buyer for one or more goods or services from the seller to the buyer;
charge the buyer of the buyer device an amount according to the transaction request;
hold the amount in an intermediary to the buyer and seller;
receive a request for a first signal corresponding to the transaction;
generate the first signal responsive to receiving the request;
provide the first signal unique to the transaction request to the buyer device via the network;
receive a second signal generated by and transmitted from the seller device via the network upon the seller's indication of delivery of said one or more goods or services via input to the seller's device, the second signal corresponding to the transaction request;
determine that the second signal satisfies a predetermined relationship with the first signal; and
make at least a portion of the amount available to the seller responsive to determining that the first signal and the second signal satisfy a predetermined relationship.

12. The computer system according to claim 11, wherein the predetermined relationship is a mathematical formula.

13. The computer system according to claim 11, wherein the memory storage device comprising further processor-executable instructions, which when executed by the data processor, cause the processor to:
generate the first signal in response to receiving the transaction request; and
send the first signal to the buyer device to provide to the seller upon the seller's delivery of the one or more goods or services.

14. The computer system according to claim 11, wherein the first signal is generated by an authorization device of the buyer.

15. The computer system according to claim 11, wherein the first and second signals are generated by a synchronized algorithm.

16. The computer system according to claim 11, wherein
to determine that the second signal satisfies a predetermined relationship with the first signal includes determining that the second signal matches the first signal.

17. The computer system according to claim 11, wherein to receive a second signal upon the seller's delivery of said one or more goods or services includes receiving, by the processor, the second signal from the seller device.

18. A computer-readable storage medium having computer-executable instructions, which when executed by a computer, cause the computer to:
accept, via a network, a transaction request between a seller device of a seller and a buyer device of a buyer for one or more goods or services;
charge the buyer of the buyer device an amount according to the transaction request;
hold the amount in an intermediary to the buyer and the seller;
receive a request for a first signal corresponding to the transaction;
generate the first signal responsive to receiving the request;
provide the first signal to the buyer device via the network, the first signal unique to the transaction request and including a first authorization code;
receive, from the seller device via the network, a second signal generated by and transmitted from the seller device via the network upon the seller's indication of delivery of said one or more goods or services via input to the seller's device, the second signal corresponding to the transaction request and including a second authorization code;

determine that the second authorization code matches the first authorization code provided to the buyer; and make at least a portion of the amount available to the seller responsive to determining that the second authorization code matches the first authorization code.

19. The computer-readable storage medium according to claim 18, wherein the authorization code is a data string.

20. The computer-readable storage medium according to claim 18, further comprising further computer-executable instructions, which when executed by the computer, cause the computer to generate the first signal in response to receiving the transaction request.

21. The computer-readable storage medium according to claim 18, wherein the second authorization code is received from the buyer device.

* * * * *

UNITED STATES PATENT AND TRADEMARK OFFICE
CERTIFICATE OF CORRECTION

PATENT NO. : 9,082,122 B2  
APPLICATION NO. : 13/090351  
DATED : July 14, 2015  
INVENTOR(S) : Lam Yam Ngan Page 1 of 1

It is certified that error appears in the above-identified patent and that said Letters Patent is hereby corrected as shown below:

On the title page, item (54) and in the specification, column 1, line 3, in the title, please update Memberhips with Memberships.

Signed and Sealed this
Twenty-first Day of June, 2016

Michelle K. Lee
*Director of the United States Patent and Trademark Office*